United States Patent [19]
Kanai et al.

[11] Patent Number: 5,164,882
[45] Date of Patent: Nov. 17, 1992

[54] CERAMIC CAPACITOR

[75] Inventors: Hideyuki Kanai, Kawasaki; Yohachi Yamashita, Yokohama; Osamu Furukawa, Sagamihara; Kumi Okuwada, Kawasaki, all of Japan

[73] Assignee: Kabushiki Kaisha Toshiba, Kawasaki, Japan

[21] Appl. No.: 808,674

[22] Filed: Dec. 17, 1991

[30] Foreign Application Priority Data

| Dec. 17, 1990 | [JP] | Japan | 2-402666 |
| Mar. 19, 1991 | [JP] | Japan | 3-54239 |
| Apr. 8, 1991 | [JP] | Japan | 3-73454 |
| May 13, 1991 | [JP] | Japan | 3-107023 |
| Jun. 28, 1991 | [JP] | Japan | 3-158018 |
| Sep. 30, 1991 | [JP] | Japan | 3-250604 |
| Sep. 30, 1991 | [JP] | Japan | 3-250605 |

[51] Int. Cl.$^5$ .............. H01G 4/10; H01G 7/00; C04B 35/48; H01B 3/12
[52] U.S. Cl. .............. 361/321; 252/63.2; 501/136; 264/65
[58] Field of Search .......... 361/320, 321; 29/25.42; 501/134-139; 264/61, 65; 252/63.2

[56] References Cited

U.S. PATENT DOCUMENTS

| 4,226,735 | 10/1980 | Sakabe | 501/136 |
| 4,700,264 | 10/1987 | Kishi et al. | 361/321 |
| 5,094,987 | 3/1992 | Kagata et al. | 501/136 |

FOREIGN PATENT DOCUMENTS 36-8630 6/1961 Japan.
51-149600 12/1976 Japan.
55-43201 11/1980 Japan.

*Primary Examiner*—Donald A. Griffin
*Attorney, Agent, or Firm*—Oblon, Spivak, McClelland, Maier & Neustadt

[57] ABSTRACT

A ceramic capacitor includes at least two opposing electrodes, and a dielectric ceramic composition arranged between the electrodes, wherein the ceramic composition is represented by a formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca and Sr), and has a composition in which assuming that the total number of moles of elements constituting a site A consisting of Pb and Ae is (A) and that the total number of moles of elements constituting a site B consisting of Zr and Ti is (B), (A)/(B) is 1.00 or less. The site A of the dielectric ceramic composition may be partially substituted with Ba. The dielectric ceramic composition may be obtained by adding Nb, Cu, Bi, Mn, Co, Ag, Si, Ta, Mg, Zn, W and/or Ni to a composition which is represented by a formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less. The dielectric ceramic composition is preferably formed by using a powder synthesized by a hydrothermal synthesis as a material, and its grain size is preferably 3 μm or less.

20 Claims, 11 Drawing Sheets

CERAMIC CAPACITOR

BACKGROUND OF THE INVENTION

1. Field of the Invention

The present invention relates to a ceramic capacitor excellent in various characteristics required for a capacitor.

2. Description of the Related Art

A capacitor composed of a capacitor element in which a dielectric ceramic composition is interposed between electrodes has been conventionally, widely known, and a large number of dielectric materials which can be suitably used in such a capacitor have been developed. The electrical characteristics required for these dielectric materials are, for example, a large dielectric constant, a small temperature coefficient of dielectric constant, a small dielectric loss, a small DC bias voltage voltage electric field dependence of the dielectric constant, a small AC bias voltage voltage electric field dependence of the dielectric loss, and a large insulation resistance. In situations where the capacitor is used in an electronic circuit, it is sometimes required to particularly, stably maintain a capacitance over a wide temperature range. Such a temperature coefficient of a capacitance (to be abbreviated a T.C.C. hereinafter) is defined as, for example, a rate of change of $\pm 10\%$ or less in a capacitance over a temperature range of $-25°$ C. to 85° C. in accordance with the B specification of the EIAJ (Electronic Industries Association of Japan) specifications, and that of $\pm 20\%$ or less over the same temperature range in accordance with their C specification; and a rate of change of $\pm 15\%$ or less in a capacitance over a temperature range of $-55°$ C. to 125° C. in accordance with the X7R specification of the EIA (Electronic Industries Association) specifications, that of $\pm 22\%$ or less over the same temperature range in accordance with their X7S specification, and that of $-33\%$ to $+22\%$ over the same temperature range in accordance with their X7T specification.

In the case of an element of a stacked type, since electrode layers and a dielectric layer are sintered integrally, it is necessary to use an electrode material which is stable even at the sintering temperature of a dielectric material. Therefore, if the sintering temperature of the dielectric material is high, an expensive material such as platinum (Pt) or palladium (Pd) must be used. For this reason, it is required that sintering at a low temperature of, e.g., about 1,150° C. (or less) is possible so that an inexpensive material such as Ag can be used.

An example of a conventionally known dielectric ceramic composition is a solid solution of, e.g., a stannate, zirconate, or titanate in barium titanate ($BaTiO_3$) as a base material.

The sintering temperature, however, of the $BaTiO_3$-based material is as high as 1,300° C. to 1,400° C. Therefore, an expensive material, such as Pt or Pd, which can resist high temperatures, must be inevitably used as the electrode material, and this results in a high cost.

In order to solve this problem with the $BaTiO_3$-based material, studies have been made on various types of compositions. Examples of a composition mainly consisting of lead iron niobate (Published Unexamined Japanese Patent Application No. 57-57204), a composition mainly consisting of lead magnesium niobate (Published Unexamined Japanese Patent Application No. 55-51759), a composition mainly consisting of lead magnesium tungstate (Published Unexamined Japanese Patent Application No. 55-144609), and a composition mainly consisting of lead magnesium iron tungstate (Published Unexamined Japanese Patent Application No. 58-217462).

No dielectric ceramic composition, however, has been obtained yet which has a high dielectric constant and a small change in dielectric constant with temperature changes over a wide temperature range of, e.g., $-55°$ C. to 125° C., which is excellent in electrical characteristics such as an insulation resistance and a breakdown voltage, and which can be sintered at a low temperature.

Independently of these studies, another study has been made to obtain a ceramic composition having a good temperature coefficient by mixing compositions different in the temperature coefficient of dielectric constant. As an example, Published Unexamined Japanese Patent Application No. 59-203759 discloses mixed sintering of a lead composite perovskite material (to be referred to as a relaxor hereinafter). However, that material has a large T.C.C. and is therefore insufficient in temperature coefficient.

As a dielectric material which is excellent in all of the electrical characteristics described above and has extremely good temperature coefficient, there is conventionally provided a dielectric composition obtained by sintering a mixture of a calcined powder of a lead composition perovskite material with a calcined powder of a $BaTiO_3$-based material. For example, Published Unexamined Japanese Patent Application No. 61-250904 discloses a technique by which a dielectric ceramic composition having good temperature coefficient is obtained by sintering a mixture of a calcined powder of a $Pb(Zn_{\frac{1}{3}}Nb_{\frac{2}{3}})O_3$-based material and a calcined powder of a $BaTiO_3$-based material.

In the $BaTiO_3$-based material or the composite form of the relaxor and the $BaTiO_3$-based material, however, the AC bias voltage dependence of the dielectric loss ($\tan\delta$) of $BaTiO_3$ is large. Therefore, when the thickness of a dielectric layer of a capacitor, particularly a multilayered ceramic capacitor (to be abbreviated as an MLC hereinafter) is decreased, the results are not only a reduction in dielectric constant but also a large increase in dielectric loss caused by an increase in AC bias voltage applied per layer. Consequently, it is impossible to satisfy $\tan\delta \leq 2.5\%$ (when evaluated at 1 Vrms as a measurement voltage) which is the B specification of EIAJ and the X7R specification of EIA. Therefore, the large bias voltage dependence of the dielectric loss of the $BaTiO_3$-based material is a serious problem in miniaturizing the MLC, i.e., decreasing the thickness of a dielectric layer.

In addition, the $BaTiO_3$-based material has a large rate (called an aging rate) at which the dielectric constant decreases with time. Therefore, when a capacitor fabricated using this material is used for extended periods, no desired capacitance can be obtained. For example, although Published Unexamined Japanese Patent Application No. 57-62521 discloses a capacitor which satisfies the X7R specification, the aging rate of this capacitor is as very large as 3% or more.

The $BaTiO_3$-based material also has which the dielectric constant decreases upon application of a DC bias voltage. For this reason, if, for example, a voltage of 25 V is applied to an MLC fabricated using this material and having a dielectric layer with a thickness of 12.5

μm, the capacitance of the MLC undesirably decreases by 20% or more.

The relaxor, on the other hand, has a problem of a breakdown voltage lower than that of the $BaTiO_3$-based material. Since it is assumed that the thickness of a dielectric layer of a capacitor will be further decreased in future, it is necessary to use a relaxor having a higher breakdown voltage in order to fabricate a capacitor.

Furthermore, when the above conventional dielectric material is used to fabricate an MLC while an inexpensive material mainly consisting of Ag is used as electrode layers, the Ag diffuses into the dielectric layer upon integral sintering of the electrode layers with the dielectric layer. This results in degradation in reliability such as a humidity load resistance or a reduction in a breakdown voltage. In addition, if the dielectric layer of the fabricated MLC is thin, the above Ag diffusion leads to inconveniences such as a reduction in the insulation resistance of the dielectric layer and a short circuit of the electrodes. This consequently makes it difficult to decrease the thickness of the dielectric layer, that is, to miniaturize the MLC.

SUMMARY OF THE INVENTION

It is an object of the present invention to provide a ceramic capacitor which has a high dielectric constant, which is small in the temperature coefficient of dielectric constant, the DC bias voltage dependence of the dielectric constant, the dielectric loss, the AC bias voltage dependence of the dielectric loss, and the aging rate, and which has a low sintering temperature and a high breakdown voltage.

The ceramic capacitor according to the present invention comprises at least two opposing electrodes, and a dielectric ceramic composition arranged between the electrodes, wherein the ceramic composition is represented by the following formula $$(Pb_{1-x}Ae_x)(Zr_{1-y}Ti_y)O_3$$

wherein x represents 0.15 to 0.90, y represents 0 to 0.80, and Ae represents at least one type of an element selected from the group consisting of Ca and Sr, and has a composition in which assuming that the total number of moles of elements constituting a site A consisting of Pb and Ae is (A) and that the total number of moles of elements constituting a site B consisting of Zr and Ti is (B), (A)/(B) is 1.00 or less. That is, the ceramic capacitor of the present invention is characterized by using a dielectric composition in which Pb of lead zirconate titanate $Pb(Zr, Ti)O_3$ is partially substituted with Ca and/or Sr represented by Ae.

In addition, a ceramic capacitor also falls within the scope of the present invention, which comprises at least two opposing electrodes, and a dielectric ceramic composition arranged between the electrodes, wherein the ceramic composition is represented by the following formula $$(Pb_{1-x}Ae_x)(Zr_{1-y}Ti_y)O_3$$

wherein x represents 0.15 to 0.90, y represents 0 to 0.80, and Ae represents at least one type of an element selected from the group consisting of Ca, Sr, and Ba, has a composition in which assuming that the total number of moles of elements constituting a site A consisting of Pb and Ae is (A) and that the total number of moles of elements constituting a site B consisting of Zr and Ti is (B), (A)/(B) is 1.00 or less, and contains at least one additives selected from the group consisting of Nb, Cu, Bi, Mn, Co, Ag, Si, Ta, La, and Pr.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The present inventors have made extensive studies on a dielectric having a small temperature coefficient of dielectric constant, a high insulation resistance, a small dielectric loss, and a small AC bias voltage dependence of the dielectric loss, and have focused attention on lead zirconate titanate $Pb(Zr, Ti)O_3$ which had been conventionally studied as a piezoelectric material. As a result, the present inventors have found that a dielectric material obtained by optimizing the amounts of Zr and Ti of this lead zirconate titanate $Pb(Zr, Ti)O_3$ and partially substituting Pb with at least one type of an element selected from the group consisting of Ca, Sr, and Ba is suitable.

That is, the ceramic capacitor of the present invention is characterized by using a dielectric composition having a basic composition represented by the following formula $$(Pb_{1-x}Ae_x)(Zr_{1-y}Ti_y)O_3$$

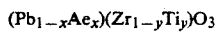

wherein x represents 0.15 to 0.90, y represents 0 to 0.80, and Ae represents at least one type of an element selected from the group consisting of Ca, Sr, and Ba, and in which assuming that the total number of moles of elements constituting a site A consisting of Pb and Ae is (A) and that the total number of moles of elements constituting a site B consisting of Zr and Ti is (B), (A)/(B) is 1.00 or less.

The reason why the composition range of the dielectric ceramic composition of the present invention is limited as defined above will be described below.

In the present invention, the ratio (molar ratio) of Zr to Ti is limited to the range of 100:0 to 20:80 (y=0 to 0.80) because the relative dielectric constant decreases if y is larger than 0.80. Note that y≧0.02 is preferable in consideration of sintering properties.

If, on the other hand, the substituted amount x of the Ae element is less than 0.15, the temperature coefficient of dielectric constant increases, and the piezoelectric properties become strong. Therefore, this value is unpractical. If x is larger than 0.90, the dielectric constant undesirably, conspicuously decreases.

By limiting the ratio to the above range, the present invention can provide a dielectric ceramic composition which has a high dielectric constant, which is small in the DC bias voltage dependence of the dielectric constant, a dielectric loss, the AC bias voltage dependence of the dielectric loss, and an aging rate, which has good temperature coefficients and a high breakdown voltage, and which therefore can be suitably used in a ceramic capacitor.

Figure 1:
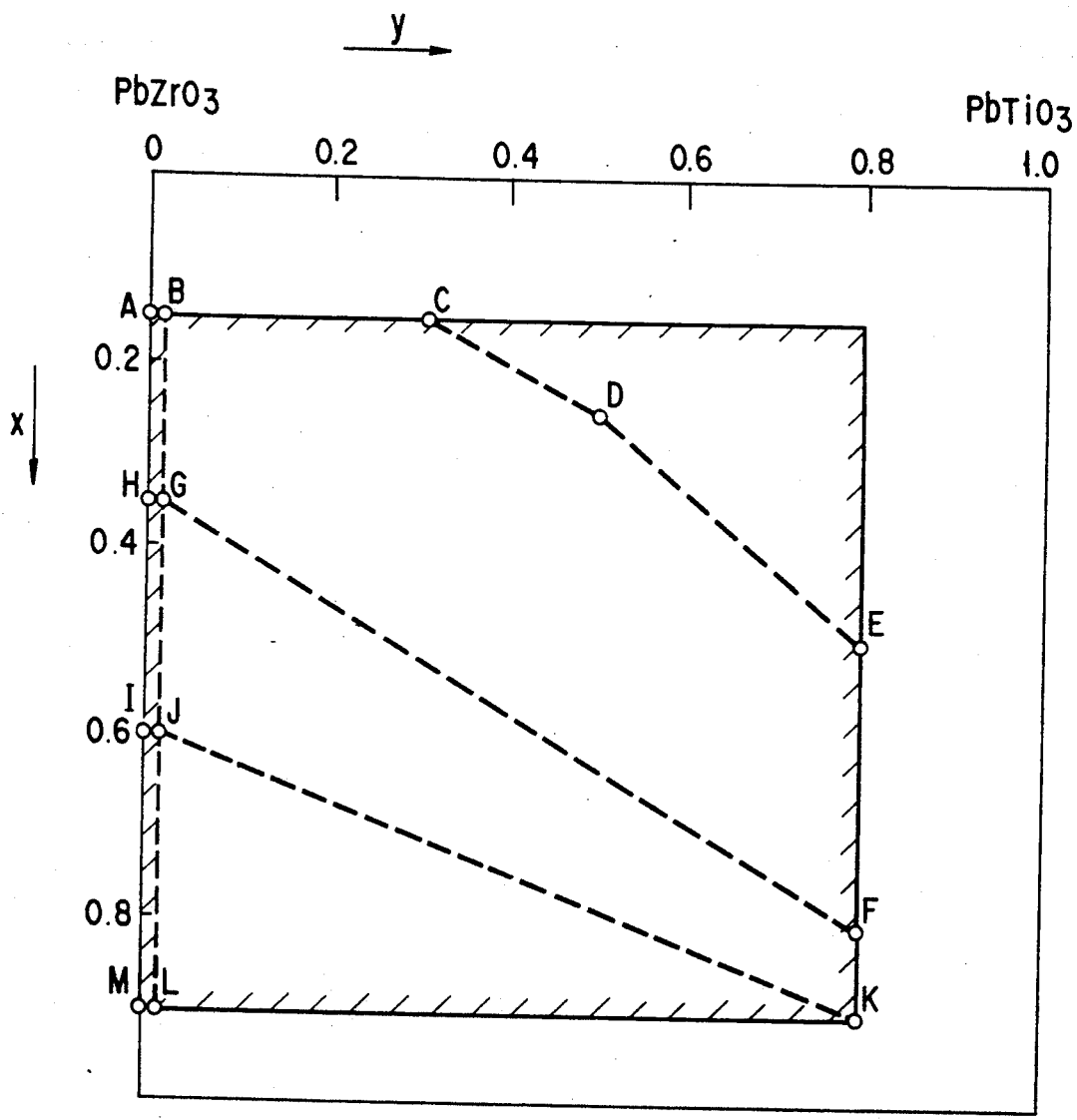
FIG. 1 is a graph showing the range of a composition of a dielectric ceramic composition used in a ceramic capacitor according to the present invention.

The basic composition of the dielectric ceramic composition according to the present invention is represented by the formula described above. As a preferable aspect, compositions on and inside lines connecting points A, C, D, E, K, and M of points A (x=0.15, y=0.0)
B (x=0.15, y=0.02)
C (x=0.15, y=0.30)
D (x=0.25, y=0.50)
E (x=0.50, y=0.80)
F (x=0.80, y=0.80)
G (x=0.35, y=0.02)
H (x=0.35, y=0.0)
I (x=0.60, y=0.0)
J (x=0.60, y=0.02)
K (x=0.90, y=0.80)
L (x=0.90, y=0.02)
M (x=0.90, y=0.0)

shown in FIG. 1 are used as the dielectric material.

Of these compositions, those on a line segment of y=0 are difficult to sinter due to evaporation of PbO. Therefore, it is preferable to use compositions on and inside lines connecting the points B, C, D, E, K, and L as the dielectric material.

Outside lines connecting the points A, C, D, and E, i.e., in a region where the amount of the element represented by Ae is small, the temperature coefficients of dielectric constant decrease and the piezoelectric properties increase. Outside a line segment EK, i.e., in a region where the Ti amount is large, there are tendencies of a decrease in the dielectric constant, an increase in the AC bias voltage dependence of the dielectric loss, a decrease in a product of the capacitance and resistance, and a decrease in the aging rate characteristics.

Outside lines connecting the points F, G, and H, i.e., in a region where the amount of the element represented by Ae is large, the dielectric constant tends to decrease. However, when compositions on and inside lines connecting the points F, G, H, I, J, and K are used, although the dielectric constant slightly decreases, the breakdown voltage and the dielectric loss can further improve. Since it is difficult to sinter compositions on the line segment of y=0 due to evaporation of PbO as described above, compositions on and inside lines connecting the points F, G, J, and K are preferable.

When compositions on and inside lines connecting the points I, J, K, L, and M are used, the breakdown voltage further increases, and the temperature coefficient of dielectric constant and the dielectric loss exceedingly decrease. Therefore, these compositions can be suitably used as the materials for a temperature compensating capacitor or a microwave capacitor. Since it is difficult to sinter compositions on the line segment of y=0 due to evaporation of PbO as described above, compositions on and inside lines connecting the points J, K, and L are preferable.

The above tendencies are particularly notable when the Ae component is Ca.

In addition, the dielectric constant and the reliability of the dielectric ceramic composition of the present invention improve by making the amount of the elements constituting the site A consisting of Pb and Ae equal to or smaller than that of the elements constituting the site B consisting of Zr and Ti. The reason for this is that if the amount of the elements constituting the site A is large, there is a possibility that excess PbO precipitates in grain boundaries upon sintering of the dielectric ceramic composition to lead to a reduction in the dielectric constant and the humidity resistance. Conversely, too small an amount of the elements constituting the site A is undesirable because the sintering temperature may exceed 1,250° C. Therefore, the molar ratio A/B of the elements constituting the site A to the elements constituting the site B is preferably 0.85 to less than 1.00, and more preferably 0.90 to less than 1.00. Note that in the dielectric ceramic composition according to the present invention, the content of oxygen in the formula described above can shift more or less from a stoichiometric ratio.

Of the dielectric ceramic compositions having the above basic composition, a dielectric ceramic composition having Ca and/or Sr, or Ba and at least one type of an element selected from the group consisting of Ca and Sr, as the Ae component in the formula, is used in the ceramic capacitor of the present invention.

In addition to the above basic composition, a dielectric ceramic composition further containing additives can also be used in the ceramic capacitor of the present invention. Practical examples of such a dielectric ceramic composition are those having compositions represented by I) to X) below.

I) A dielectric ceramic composition obtained by adding Nb in an amount of 10 mol % or less, as an amount of $Nb_2O_5$, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

II) A dielectric ceramic composition obtained by adding Cu in an amount of 0.5 wt % or less, as an amount of CuO, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

III) A dielectric ceramic composition obtained by adding 4 mol % or less of $A'(Cu_{\frac{1}{4}}W_{\frac{3}{4}})O_3$ or $A'(Cu_{\frac{1}{4}}Me_{\frac{3}{4}})O_3$ (wherein A' represents at least one type of an element selected from the group consisting of Ca, Sr, Ba, and Pb, and Me represents at least one type of an element selected from the group consisting of Nb and Ta) to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

The dielectric ceramic composition represented by each of I) to III) above is obtained by adding a proper amount of Nb or Cu to a composition in which Pb of lead zirconate titanate $Pb(Zr, Ti)O_3$ is partially substituted with the Ae elements described above.

As described above, the present inventors have found that a dielectric material obtained by optimizing the amounts of Zr and Ti of lead zirconate titanate and partially substituting Pb with Ca or the like can be suitably used in a ceramic capacitor. The present inventors also have found that a more preferable dielectric material can be obtained by adding a proper amount of Nb, Cu, or a Cu-containing perovskite compound. That is, when Nb is added, the values of the insulation resistance and dielectric constant improve not only at 25° C. but also at a high temperature of 125° C. When Cu is added, sintering at a temperature of 1,150° C. or less becomes possible, and the insulation resistance at a high temperature of 125° C. improves. In addition, by adding a perovskite compound of Cu, a decrease in dielectric constant is suppressed, low-temperature sintering becomes possible, and the insulation resistance improves.

In these dielectric ceramic compositions, Nb as an additive component can be added in the form of an oxide, an alkoxide compound, or a hydroxide of Nb, or an organometallic compound of Nb.

The reason why the addition amount of Nb is limited to 10 mol % or less as an amount of $Nb_2O_5$ is that the dielectric constant decreases if the amount exceeds 10 mol %. Although an improvement in the insulation resistance as an effect of Nb addition appears with a small amount of addition, an amount of 0.1 mol % or more is practically preferable. This is so because the value of the insulation resistance is hard to decrease if the amount is less than 0.1 mol %. Preferably, Nb is added in a an amount at which the Curie point decreases to 100° C. or less. The reason for this is that if the Curie point exceeds 100° C., the temperature coefficient of dielectric constant is degraded. More specifically, a preferable content of this additive component is about 2 to 8 mol %, although it depends on the type or the substituted amount of the Ae component.

Cu as another additive component is added in the form of Cu, $Cu_2O$, CuO, oxalate, a hydroxide, or an organometallic compound of Cu.

Figure 2:
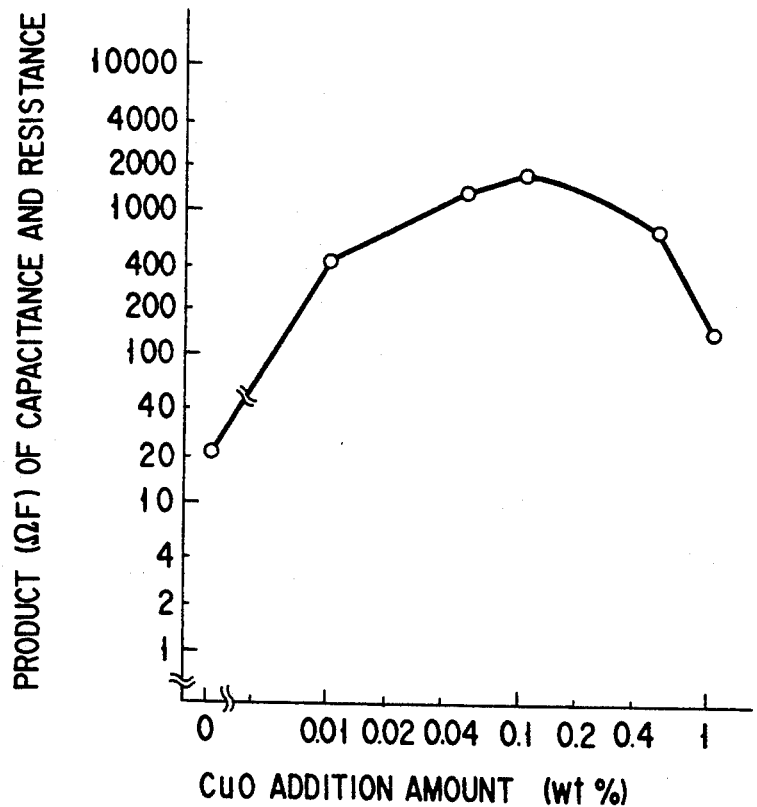
FIG. 2 is a graph showing the relationship, obtained when CuO is added to a composition represented by $(Pb_{0.61}Ba_{0.39})(Zr_{0.70}Ti_{0.30})O_3$, between the product of the capacitance and resistance of the composition at 125° C. and the CuO addition amount.

The reason why the addition amount of Cu is limited to 0.5 wt % or less as an amount of CuO is that if the amount exceeds 0.5 wt %, the mechanical strength starts to decrease, and the insulation resistance at high temperatures also decreases. FIG. 2 shows a product of the capacitance and insulation resistance obtained when the CuO amount to be added to a composition of $(Pb_{0.61}Ba_{0.39})(Zr_{0.70}Ti_{0.30})$ was changed at a high temperature (125° C.). FIG. 2 reveals that when the amount exceeds 0.5 wt %, the insulation resistance at high temperatures also decreases. The addition amount of Cu is preferably 0.01 wt % or more. This is so because if the amount is less than 0.01 wt %, it is difficult to obtain an effect of low-temperature sintering.

The addition of $A'(Cu_{\frac{1}{2}}W_{\frac{1}{2}})O_3$ or $A'(Cu_{\frac{1}{3}}Me_{\frac{2}{3}})O_3$ (wherein A' represents at least one type of an element selected from the group consisting of Ca, Sr, Ba, and Pb, and Me represents at least one type of an element selected from the group consisting of Nb and Ta) as a perovskite compound of Cu makes low-temperature sintering possible and has an effect of improving the insulation resistance at high temperatures. In addition, this Cu perovskite compound has the same perovskite structure as that of the base material. Therefore, even when the Cu perovskite compound is added, an electrical neutrality is held, and this suppresses a decrease in dielectric constant.

Figure 3:
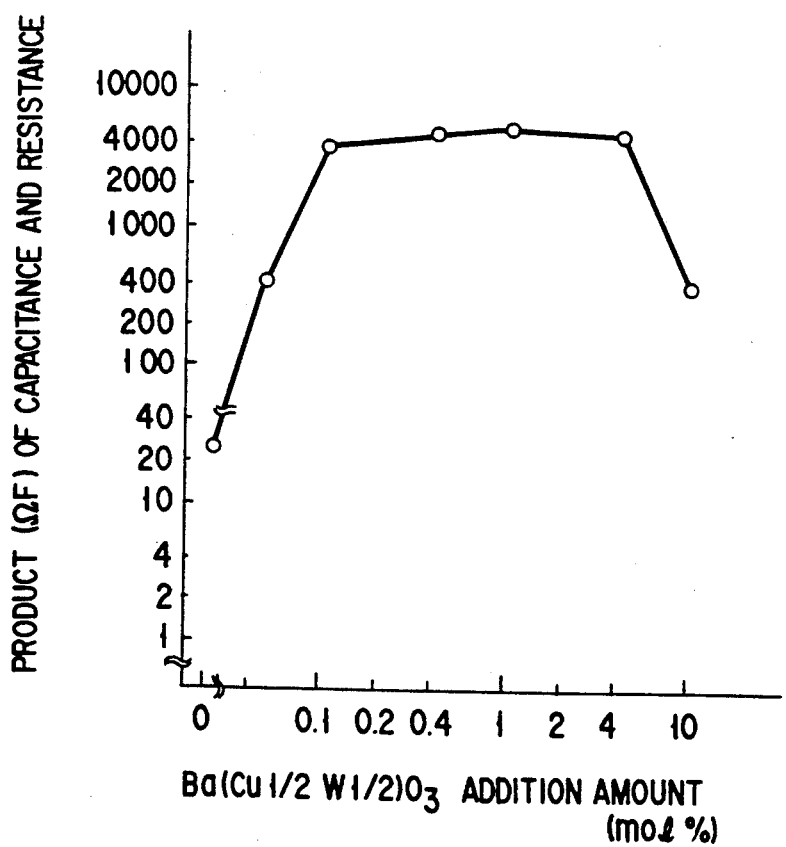
FIG. 3 is a graph showing the relationship, obtained when $Ba(Cu_{\frac{1}{3}}W_{\frac{1}{3}})O_3$ is added to a composition represented by $(Pb_{0.61}Ba_{0.39})(Zr_{0.70}Ti_{0.30})O_3$, between the product of the capacitance and resistance of the composition at 125° C. and the $Ba(Cu_{\frac{1}{3}}W_{\frac{1}{3}})O_3$ addition amount.

The addition amount of $A'(Cu_{\frac{1}{2}}W_{\frac{1}{2}})O_3$ or $A'(Cu_{\frac{1}{3}}Me_{\frac{2}{3}})O_3$ (wherein A' represents at least one type of an element selected from the group consisting of Ca, Sr, Ba, and Pb, and Me represents at least one type of an element selected from the group consisting of Nb and Ta) is limited to 4 mol % or less. The reason for this is that if the amount exceeds 4 mol %, the mechanical strength starts to decrease, and the insulation resistance at high temperatures again starts to decrease. FIG. 3 shows the product of the capacitance and insulation resistance obtained by changing the amount of $Ba(Cu_{\frac{1}{2}}W_{\frac{1}{2}})O_3$ added to a composition of $(Pb_{0.61}Ba_{0.39})(Zr_{0.70}Ti_{0.30})O_3$ at a high temperature (125° C.). FIG. 3 reveals that when the addition amount exceeds 4 mol %, the insulation resistance at high temperatures also decreases. The addition amount of this perovskite compound is preferably 0.1 mol % or more. If the amount is less than 0.1 mol %, it is difficult to obtain the low-temperature sintering effect.

By limiting the addition amount of Nb, Cu, or the Cu compound of the perovskite structure to the above range, there can be provided a dielectric ceramic composition which has a high insulation resistance even at high temperatures, a high dielectric constant, and a small temperature coefficient of dielectric constant. The composition also has a good DC bias voltage dependence of the dielectric constant, a small dielectric loss, and a small AC bias voltage dependence of the dielectric loss. The composition further has a good temperature coefficient and a high breakdown voltage and can therefore be suitably used in a ceramic capacitor. In addition, it is possible to obtain a dielectric ceramic composition which can be sintered at a low temperature of 1,150° C. or less.

The addition of Nb, Cu, or the Cu compound of the perovskite structure can be performed by adding a powder weighed to have a composition ratio falling within the above range and calcined at 800° C. to 900° C. to a composition having the above basic composition. Alternatively, upon weighing of the above basic composition, a material powder in the form of a metal oxide or a carbonate oxide may be added directly to and calcined together with the composition. The same effect can be obtained in these two cases.

IV) A dielectric ceramic composition obtained by adding Bi in an amount of 0.01 to 2 mol %, as an amount of $Bi_2O_3$, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding Bi to a composition in which Pb of lead zirconate titanate is partially substituted with the Ae component such as Ca. The present inventors have found that by adding Bi in an amount of 0.01 to 2 mol %, as an amount of $Bi_2O_3$, to the basic composition, the sintering temperature can be decreased by 100° C. to 250° C., and the insulation resistance at high temperatures can be drastically improved. If the addition amount of Bi is less than 0.01 mol % as an amount of $Bi_2O_3$, neither the low-temperature sintering effect nor the effect of improving the insulation resistance at high temperatures appear. If the amount exceeds 2 mol %, the dielectric constant undesirably decreases.

V) A dielectric ceramic composition obtained by adding 2 mol % or less of MnO and/or $Co_2O_3$ to a composition which is represented by formula $(Pb_{1-x}Ae_e)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding a proper amount of MnO and/or $Co_2O_3$ to a composition in which Pb of lead zirconate titanate is partially substituted with the Ae element such as Ca. MnO and $Co_2O_3$ as the addition components have effects of improving the T.C.C and decreasing the dielectric loss of the dielectric ceramic composition. However, if the addition amount exceeds 2 mol %, the dielectric loss increases, and the insulation resistance decreases. Therefore, the addition amount of these components is limited to 2 mol % or less. In this dielectric ceramic composition, the above effects notably appear especially when the content of these addition components is 0.1 mol % or more. A more preferable content of these added components is 0.3 to 2 mol %.

VI) A dielectric ceramic composition obtained by adding 0.2 to 2 mol % of MnO and CuO to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding a proper amount of MnO and CuO to a composition in which Pb of lead zirconate titanate is partially substituted with the Ae element such as Ca. The content of MnO and CuO as the addition components is 0.2 to 2 mol %. This is so because if the content is less than 0.2 mol %, almost no effects appear in realizing low-temperature sintering, decreasing a dielectric loss, and improving a T.C.C., high-frequency characteristics, and long-term reliability. If the content exceeds 2.0 mol %, the dielectric loss increases, and the insulation resistance decreases.

By limiting the amount of each component to the above range, there can be provided a dielectric ceramic composition which can be sintered at a low temperature of about 1,100° C. or less and in which the grain size of the sintered product is 1.5 μm or less. The composition also has a high dielectric constant and is small in a dielectric loss, a T.C.C., the AC bias voltage dependence of the dielectric loss, and the DC bias voltage dependence of the dielectric constant. In addition, the composition is excellent in high-frequency characteristics and long-term reliability and is therefore suitably used in a ceramic capacitor.

VII) A dielectric ceramic composition obtained by adding Ag in an amount of 5,000 ppm or less, as an amount of $Ag_2O$, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding a proper amount of $Ag_2O$ to a composition in which Pb of lead zirconate titanate is partially substituted with the Ae element such as Ca. $Ag_2O$ as the addition component has an effect of suppressing diffusion of Ag to a dielectric layer when a material mainly consisting of Ag is used as electrodes, thereby improving reliability such as a humidity load life performance or a breakdown voltage. The addition amount is preferably 5,000 ppm or less because if the amount exceeds 5,000 ppm, the reliability is degraded. In this dielectric ceramic composition, the above addition effect notably appears especially when the content of $Ag_2O$ is 100 ppm or more. More preferably, the content of $Ag_2O$ is 100 to 2,000 ppm.

VIII) A dielectric ceramic composition obtained by adding Si in an amount of 10,000 ppm or less, as an amount of $SiO_2$, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding a proper amount of $SiO_2$ to a composition in which Pb of lead zirconate titanate is partially substituted with the Ae element such as Ca. $SiO_2$ as the addition component has an effect of decreasing the grain size of the dielectric ceramic composition to 3 μm or less, thereby increasing the breakdown voltage. Especially when the thickness of the dielectric ceramic composition is 10 μm or less in the ceramic capacitor of the present invention, this effect of improving the breakdown voltage has a great meaning. In this dielectric ceramic composition, however, the dielectric constant decreases if the addition of $SiO_2$ is too large. Therefore, the addition amount of $SiO_2$ is preferably 10,000 ppm or less. The above addition effect is particularly notable when the content of $SiO_2$ is 100 ppm or more, and a more preferable content is 100 to 2,000 ppm. In addition, the grain size of the dielectric ceramic composition is preferably 0.1 μm or more and its thickness is preferably 0.5 μm or more in terms of dielectric constant.

By limiting the content of each component to the above range, there can be provided a dielectric ceramic composition which has a high dielectric constant and is small in the DC bias voltage dependence of the dielectric constant, a dielectric loss, and the AC bias voltage dependence of the dielectric loss. The composition is also excellent in temperature coefficients and a breakdown voltage and is therefore suitably used in a ceramic capacitor.

IX) A dielectric ceramic composition obtained by adding Ta in an amount of 0.1 mol % to 10 mol %, as an amount of $Ta_2O_5$, to a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding Ta to a composition in which Pb of lead zirconate titanate is substituted with the Ae element such as Ca. The addition amount of Ta as the addition component is limited to 10 mol % or less as an amount of $Ta_2O_5$ because if the addition amount exceeds 10 mol %, the dielectric constant decreases. Although an effect of improving the insulation resistance as the addition effect of Ta appears with a small amount of addition, addition of 0.1 mol % or more is practically preferable. Although a preferable content of Ta depends on the type or the substituted amount of the Ae component, it is about 2 to 8 mol %.

In this dielectric ceramic component, Nb is preferably added so that the Curie point decreases to 100° C. or less. The reason for this is because if the Curie point exceeds 100° C., the temperature coefficient of dielectric constant deteriorates.

By limiting the content of each component to the above range, the value of the specific resistance can be greatly improved at 125° C. as well as 25° C.

X) A dielectric ceramic composition which is represented by formula $(Pb_{1-x1-x2}Ae_{x1}Ln_{x2})(Zr_{1-y}Ti_y)O_3$ (wherein x1+x2=x, x represents 0.05 to 0.90, y represents 0 to 0.80, Ae represents at least one type of an element selected from the group consisting of Ca, Sr, and Ba, and Ln is at least one type of an element selected from the group consisting of La and Pr), and in which assuming that the total number of moles of elements constituting a site A consisting of Pb, Ae and Ln is (A) and that the total number of moles of elements constituting a site B consisting of Zr and Ti is (B), (A)/(B) is 1.00 or less.

This dielectric ceramic composition is obtained by partially substituting Pb of lead zirconate titanate with an alkaline earth metal (Ae) and a lanthanide element (Ln). Although the Ae element alone has an effect of improving the insulation resistance of lead zirconate titanate, it is possible to obtain a dielectric ceramic composition with a higher breakdown voltage by composite substitution with the Ae and Ln elements.

The ratio $x(=x1+x2)$ of the total content of the Ae and Ln elements to the content of Pb is 0.05 to 0.90. The individual range of each of x1 and x2 is preferably 0.05 to 0.90. If the ratio of the total amount of the Ae and Ln elements is less than 0.05, the temperature coefficient of dielectric constant increases to an impractical level. If the ratio exceeds 0.90, the dielectric constant undesirably, conspicuously decreases.

XI) A dielectric ceramic composition obtained by adding 20 mol % or less of at least one type of a compound selected from the group consisting of $Pb(Mg_{\frac{1}{3}}Nb_{\frac{2}{3}})O_3$, $Pb(Mg_{\frac{1}{2}}W_{\frac{1}{2}})O_3$, $Pb(Zn_{\frac{1}{3}}Nb_{\frac{2}{3}})O_3$, and $Pb(Ni_{\frac{1}{3}}Nb_{\frac{2}{3}})O_3$ to 100 mol % of a composition which is represented by formula $(Pb_{1-x}Ae_x)(Zr_{1-y}Ti_y)O_3$ (wherein x represents 0.15 to 0.90, y represents 0 to 0.80, and Ae represents at least one type of an element selected from the group consisting of Ca, Sr, and Ba), and in which assuming that the total number of moles of elements constituting a site A consisting of Pb and Ae is (A) and that the total number of moles of elements constituting a site B consisting of Zr and Ti is (B), (A)/(B) is 1.00 or less.

This dielectric ceramic composition is obtained by adding a proper amount of a lead perovskite compound selected from $Pb(Mg_{\frac{1}{3}}Nb_{\frac{2}{3}})O_3$, $Pb(Mg_{\frac{1}{2}}W_{\frac{1}{2}})O_3$, $Pb(Zn_{\frac{1}{3}}Nb_{\frac{2}{3}})O_3$, and $Pb(Ni_{\frac{1}{3}}Nb_{\frac{2}{3}})O_3$ to a composition in which Pb of lead zirconate titanate is partially substituted with the Ae element such as Ca. The addition of such lead perovskite compound makes it possible to realize low-temperature sintering and to increase the dielectric constant and insulation resistance, particularly an insulation resistance at high temperatures.

The content of at least one type of a compound selected from the above lead perovskite compounds is 20 mol % or less, and preferably 15 mol % or less with respect to 100 mol % of the composition having the above basic composition. If the content of the lead perovskite compound exceeds 20 mol %, the temperature coefficient of dielectric constant increases too large to obtain a dielectric ceramic composition in which a change in dielectric constant with temperature changes is small over a wide temperature range.

Figure 4:
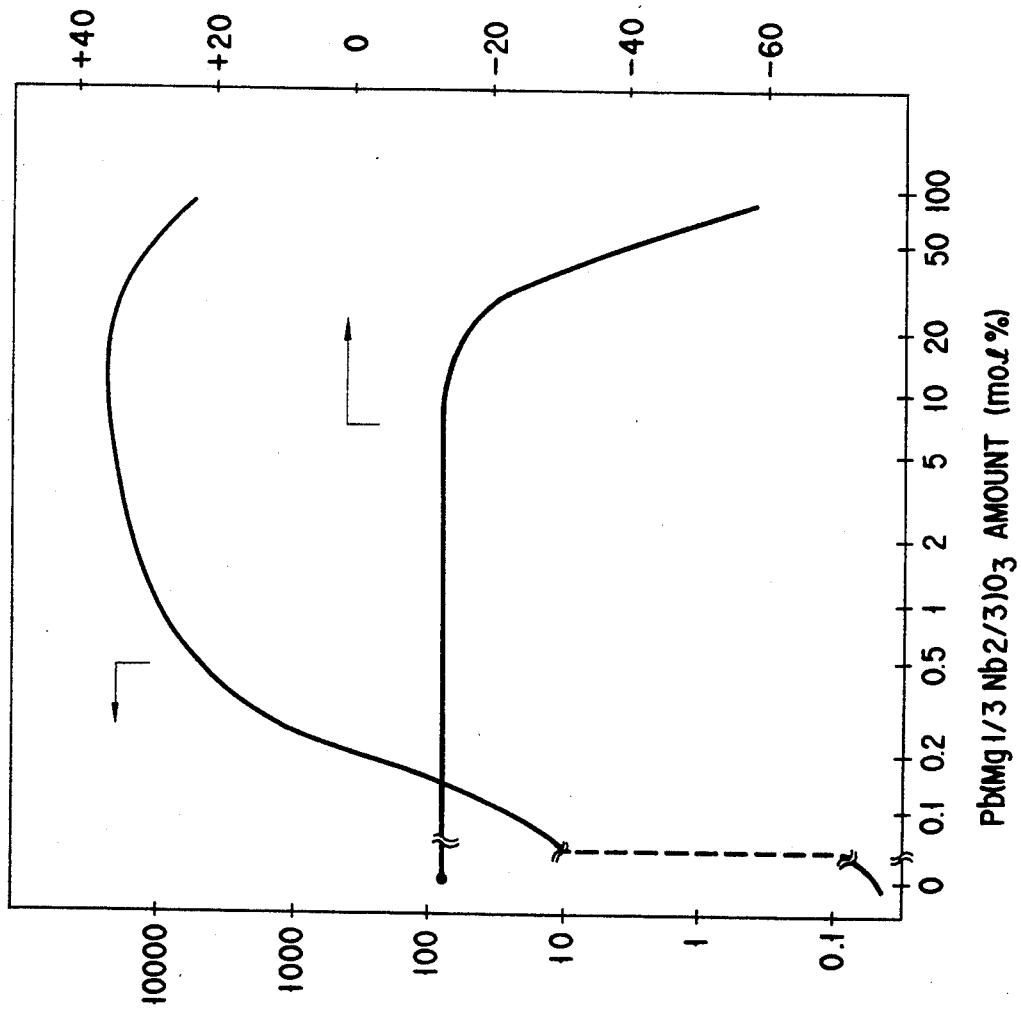
FIG. 4 is a graph showing the relationships, obtained when $Pb(Mg_{\frac{1}{3}}Nb_{\frac{2}{3}})O_3$ is added to a composition represented by $(Pb_{0.63}Ba_{0.37})(Zr_{0.7}Ti_{0.3})O_3$, between the product of the insulation resistance and capacitance of the composition and the addition amount of $Pb(Mg_{\frac{1}{3}}Nb_{\frac{2}{3}})O_3$, and between the rate of change in capacitance of the composition at 85° C. with reference to that at 25° C. and the addition amount of $Pb(Mg_{\frac{1}{3}}Nb_{\frac{2}{3}})O_3$.

As a practical example, FIG. 4 shows the relationship between the product of the insulation resistance and capacitance of a ceramic composition represented by $(Pb_{0.63}Ba_{0.37})(Zr_{0.7}Ti_{0.3})O_3$ and the addition amount of $Pb(Mg_{\frac{1}{3}}Nb_{\frac{2}{3}})O_3$, and between the rate of change in capacitance at 85° C. with reference to that at 25° C. and the addition amount of $Pb(Mg_{\frac{1}{3}}Nb_{\frac{2}{3}})O_3$.

By limiting the addition amount of at least one type of a compound selected from the group consisting of the lead perovskite compounds described above, there can be provided a dielectric ceramic composition which has a high dielectric constant, a high insulation resistance even at high temperatures, and a small change in dielectric constant with temperature changes. The composition also has a good DC bias voltage dependence of the dielectric constant, a small dielectric loss, and a small AC bias voltage dependence of the dielectric loss. The composition further has a good temperature coefficient and a high insulation resistance and is therefore suitably used in a ceramic capacitor.

The addition of the lead perovskite compounds can be performed by adding a powder weighed to have a desired composition ratio and calcined at 800° C. to 900° C. to the composition having the above basic composition. Alternatively, upon weighing of the composition having the above basic composition, a material powder in the form of a metal oxide or a carbonate may be added directly to and calcined together with the composition.

The present inventors have further found that the breakdown voltage of the dielectric ceramic composition having the composition as described above is conspicuously improved by controlling the average grain size of the composition to 3 μm or less. Especially when the thickness of the dielectric ceramic composition is 10 μm or less in the ceramic capacitor of the present invention, this effect of improving the breakdown voltage is notable. In addition, when the average grain size of the dielectric ceramic composition is 3 μm or less, the mechanical strength of the ceramic capacitor also improves. Note that in terms of dielectric constant, the grain size of the dielectric ceramic composition is preferably 0.1 μm or more. In the present invention, the grain size of the dielectric ceramic composition is most preferably 0.5 to 2.0 μm. The thickness of the dielectric ceramic composition is preferably 0.5 μm or more.

In the present invention, in order to control the average grain size of the dielectric ceramic composition 1 to 3 μm or less, it is preferable to use a fine powder synthesized by the hydrothermal synthesis as the starting material of the dielectric ceramic composition. More specifically, a solution containing respective constituting metal elements of the dielectric ceramic composition is prepared and treated at a high temperature and a high pressure to allow a fine powder to precipitate in the solution. According to this method, since a very fine powder can be prepared as the starting material, the average grain size of the dielectric ceramic composition can be easily controlled to 3 μm or less.

In addition, the fine powder synthesized by the hydrothermal synthesis has excellent uniformity in composition. Therefore, the composition of the resultant dielectric ceramic composition is also uniform, and this makes it possible to obtain a ceramic capacitor with very high reliability. Furthermore, since such a fine powder is very high in activity, it is possible to increase the heating rate upon sintering of the dielectric ceramic composition and realize a low sintering temperature. In this case, a preferable heating rate is 110° C./hour to 600° C./hour for reasons to be explained below. That is, if the heating rate is less than 100° C./hour, almost no low-temperature sintering effect can be obtained. If, on the other hand, the heating rate exceeds 600° C./hour, the density of the resultant dielectric composition may be reduced. The heating rate is more preferably 150° C./hour to 600° C./hour, and most preferably 200° C./hour to 600° C./hour. In the present invention, increasing the heating rate makes it possible to shorten the sintering time and to lower the sintering temperature. In addition, in the fabrication of an MLC, the increased heating rate suppresses diffusion of Ag from the inner electrodes caused upon sintering of a stacked structure, thus further improving the mechanical strength of the MLC.

The dielectric ceramic composition used in the present invention can be sintered in a low-oxygen partial pressure atmosphere. In particular, since a composition using Ca has a reduction resistance, electrodes consisting of a base metal such as Ni or Cu can be used when the composition of this type is applied to an MLC.

Note that in the present invention, the dielectric ceramic composition can further contain, e.g., impurities and additives to an extent at which the effects of the present invention are not degraded. Examples of the impurity and the additive are a lanthanide element, ZnO, $WO_3$, SrO, NiO, $Al_2O_3$, MgO, $Sb_2O_3$, and $SiO_2$. However, the content of these impurities and the additives is at most about 0.5 wt % or less. In addition, the dielectric loss can be further decreased by addition of $Co_2O_3$ and/or MnO, and the insulation resistance, particularly, an insulation resistance at high temperatures can be greatly improved by addition of $Nb_2O_5$ and $Ta_2O_5$.

Addition of various glass components such as borosilicate glass (effective upon addition in an amount of at most about 1 wt % or less, and generally 0.05 wt % or more) can further decrease the sintering temperature and the grain size and can also increase the density of the dielectric layer and improve the humidity load life performance. In addition, since reduction of the dielectric can be prevented by the addition of glass components, electrodes consisting of a base metal such as Ni or Cu can be used when the present invention is applied to an MLC. Furthermore, the grain size of the dielectric ceramic composition decreases, so that its mechanical strength improves.

Various compositions can be used as the glass components. An example of a preferable composition is one which contains, as an amount of an oxide, 5 wt % or more of $B_2O_3$ and 10 wt % or more of $SiO_2$. The composition may further contain Pb, Al, Ba, Sr, Ca, Li, Mg, and Zn. Examples of the glass constituting component represented by an amount of an oxide are as follows.

| | |
|---|---|
| $SiO_2$ | 10-60 wt % |
| $B_2O_3$ | 5-80 wt % |
| $Al_2O_3$ | 0-20 wt % |
| PbO | 0-40 wt % |
| BaO | 0-40 wt % |
| SrO | 0-20 wt % |
| CaO | 0-20 wt % |
| MgO | 0-20 wt % |
| ZnO | 0-20 wt % |
| $Li_2O$ | 0-30 wt % |

(Note that a total is 100 wt % as glass)

Another example is alumina borosilicate glass simultaneously containing lead (Pb), aluminum (Al), boron (B), and silicon (Si). In this case, the glass preferably contains, as an amount of an oxide, 5 wt % or more of boron, 10 wt % or more of silicon, 5 wt % or more of aluminum, and 5 wt % or more of lead. Preferable examples of the composition of this alumino borosilicate glass are as follows.

| | |
|---|---|
| $SiO_2$ | 10-30 wt % |
| $B_2O_9$ | 5-45 wt % |
| $Al_2O_3$ | 5-20 wt % |
| PbO | 5-40 wt % |
| BaO | 0-20 wt % |
| SrO | 0-15 wt % |
| CaO | 0-10 wt % |
| MgO | 0-15 wt % |
| ZnO | 0-15 wt % |
| $Li_2O$ | 0-20 wt % |

Figure 5:
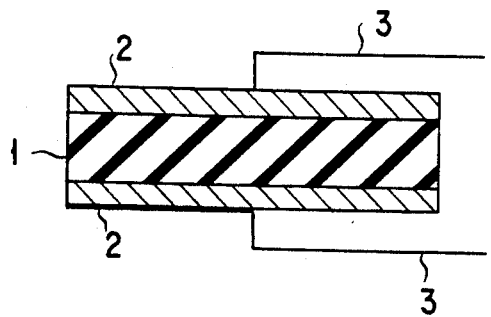
FIG. 5 is a sectional view showing a practical example of the ceramic capacitor of the present invention.

The ceramic capacitor of the present invention can be obtained by using the dielectric ceramic composition as described above as a dielectric layer and forming at least a pair of opposing electrodes via the composition. FIG. 5 is a sectional view schematically showing the form of the ceramic capacitor of the present invention.

The capacitor shown in FIG. 5 has a structure in which a pair of electrodes 2 are arranged to oppose each other via a dielectric layer 1. A terminal 3 is connected to each electrode 2. The electrodes 2 are connected to a circuit through these terminals 3.

In practice, the ceramic capacitor may be formed by molding or coating a resin or an insulating varnish on a capacitor element main body constituted by a dielectric and electrodes, or by holding the main body in an insulating oil. That is, the ceramic capacitor can be used in any form known in this field of art.

Figure 6:
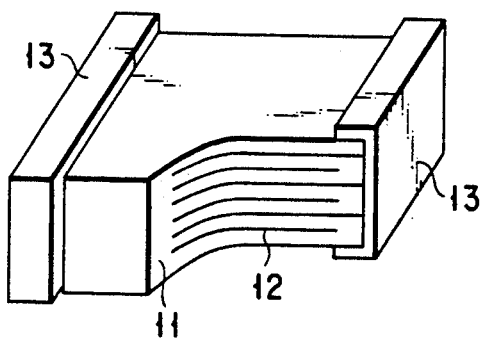
FIG. 6 is a partially cutaway perspective view showing another aspect of the ceramic capacitor of the present invention.

FIG. 6 is a partially cutaway perspective view showing a practical example in which the present invention is applied to an MLC. In this MLC, as is apparent from FIG. 6, a plurality of inner electrodes 12 are arranged to oppose each other via a dielectric layer 11 and are independently connected to outer electrodes 13.

The MLC can be fabricated by adding, e.g., a binder and a solvent to the material powder described above, forming green sheets from the resultant slurry, printing inner electrodes on these green sheet, stacking a predetermined number of these sheets under pressure, and burning out binder and sintering the sheets. At this time, since the composition used in the present invention can be sintered at a low temperature of about 1,200° C. to 1,250° C., it is possible to use a comparatively inexpensive low-melting metal material such as Ag/Pd=45/55 (wt % ratio) as the inner electrode material. In addition, in the present invention, the fine powder synthesized by the hydrothermal synthesis as described above is used as the starting material, so that the sintering temperature can be decreased to about 1,050° C. to 1,100° C. Note that when the dielectric ceramic composition is a system containing additives such as $Co_2O_3$ and $Nb_2O_5$ as described above, these additives are treated similar to Pb, Ca, Zr, and Ti. That is, it is preferable to use a fine powder synthesized by the hydrothermal synthesis and containing additives such as Co and Nb as the starting material. In the present invention, the starting material synthesizing method is not particularly limited to the hydrothermal synthesis but may be a chemical synthesizing method such as a coprecipitation method or a metal alkoxide.

The dielectric ceramic composition according to the present invention as described above has a high dielectric constant, a flat temperature coefficient of dielectric constant, and a large product of the capacitance and resistance. This product of the capacitance and resistance exhibits a sufficiently high value even at high temperatures, indicating that the composition is reliable. In addition, since the DC bias voltage dependence of the dielectric constant is good, the rate of reduction in capacitance is low even under a high electric field strength, and this makes it possible to effectively use the composition as a material for high voltages. Furthermore, a high breakdown voltage allows reduction in the thickness of the dielectric layer in MLCs. Therefore, the composition of the present invention can be suitably used to realize a small-size, large-capacity ceramic capacitor. In addition, since the composition is small in both the dielectric loss and the AC bias voltage dependence of the dielectric loss, it can be effectively used as materials for an alternating current and high frequencies. The ceramic capacitor of the present invention is also effective as a dielectric for a thick-film capacitor printed and sintered on, e.g., a circuit board.

EXAMPLE 1

Oxides of, e.g., Pb, Ca, Zr, and Ti as the starting materials were blended so as to obtain various composition ratios listed in TABLE 1 below, mixed by, e.g., a ball mill, and calcined at 900° C. The resultant calcined products were milled by, e.g., a ball mill, dried, added with polyvinyl alcohol as a binder, and granulated. The resultant powders were pressed to form disks each having a diameter of 17 mm and a thickness of about 2 mm as sample Nos. 1 to 15. After the binder was burned out from the disks, each disk was sintered in the air at 1,150° C. to 1,250° C. and formed to have a thickness of 1 mm. Silver electrodes were baked on both the major surfaces of each disk, and the electrical characteristics of the disks were measured. The results are shown in TABLE 1 below. Note that TABLE 1 also shows the results of similar measurements performed for a sample using Sr alone in place of Ca and those using combinations of Ca and Ba, Ca and Sr, and Ba and Sr in place of Ca. In TABLE 1, the ratio of the total number of moles of Pb and the substituent elements (Ca, Ba, and Sr) to the total number of moles of Zr and Ti is 1.00 in all samples.

reference to a dielectric constant at 20° C. in the case of the temperature range of $-25°$ C. to 85° C. and a dielectric constant at 25° C. in the case of the temperature range of $-55°$ C. to 125° C. The product of the capacitance and resistance (CR value) was obtained from (a capacitance at 1 kHz)×(an insulation resistance) at each of 25° C. and 125° C. The insulation resistance IR was calculated from a value measured using an insulation resistance meter after a voltage of 250 V wa applied for two minutes. The dielectric constant and the DC bias voltage electric field dependence of the dielectric constant are represented by the rates of changes in capacitance and dielectric loss measured upon application of a voltage of up to 400 V by a DC bias voltage by using a 0.1 mm thick sample. The AC bias voltage dependence of the dielectric loss was obtained by measuring the rate of change by applying 1 V to 20 V using the same sample. The aging rate (AR) was obtained by measuring the change in dielectric constant of a 1 mm thick sample held at 25° C. after it was held at 180° C. for 15 minutes. More specifically, with reference to a capacitance $C_1$ obtained when the sample was held at 25° C. for one hour, the AR was obtained from the rate of change in a

TABLE 1

| Sample No. | Substituent element | x (mol) | y (mol) | Dielectric constant K 25° C. | Dielectric loss DF (%) | Maximum T.C.C. (%) $-25°$ C. to 85° C. | Maximum T.C.C. (%) $-55°$ C. to 125° C. |
|---|---|---|---|---|---|---|---|
| 1 | Ca | 0.20 | 0.03 | 260 | 0.05 | $-2.8$ | $-6.0$ |
| 2 | Ca | 0.22 | 0.80 | 1400 | 1.08 | $-7.0$ | $-18.0$ |
| 3 | Ca | 0.45 | 0.47 | 1400 | 0.81 | $+4.0$ | $-22.0$ |
| 4 | Ca | 0.58 | 0.70 | 580 | 0.88 | $-9.0$ | $-22.0$ |
| 5 | Ca | 0.25 | 0.65 | 950 | 1.12 | $+20.0$ | $+40.0$ |
| 6 | Ca | 0.55 | 0.25 | 400 | 0.08 | $-4.8$ | $-8.8$ |
| 7 | Ca | 0.80 | 0.65 | 410 | 0.09 | $-5.0$ | $-9.0$ |
| 8 | Ca | 0.80 | 0.15 | 270 | 0.09 | $-2.1$ | $-5.5$ |
| 9 | Ca | 0.85 | 0.55 | 320 | 0.05 | $-2.0$ | $-5.7$ |
| 10 | Sr | 0.82 | 0.82 | 2000 | 0.82 | $-16.0$ | $-24.0$ |
| 11 | Sr | 0.65 | 0.35 | 1150 | 0.15 | $-8.0$ | $-15.0$ |
| 12 | Sr | 0.85 | 0.37 | 870 | 0.02 | $-5.0$ | $-10.0$ |
| 13 | Ca Ba | 0.15 0.10 | 0.80 | 2300 | 1.05 | $-8.0$ | $-19.0$ |
| 14 | Ca Sr | 0.16 0.09 | 0.30 | 1700 | 1.07 | $-8.0$ | $-18.0$ |
| 15 | Ba Sr | 0.25 0.10 | 0.30 | 3900 | 0.79 | $-11.0$ | $-22.0$ |

| Sample No. | DC bias voltage dependence (%) of dielectric constant | AC bias voltage dependence (%) of dielectric loss | Product of capacitance and resistance, CR value (ΩF) 25° C. | Product of capacitance and resistance, CR value (ΩF) 125° C. | Aging rate AR (%) | Breakdown voltage (KV/mm) |
|---|---|---|---|---|---|---|
| 1 | $-7$ | 1.81 | 1100 | 4 | 2.5 | 14.8 |
| 2 | $-10$ | 1.23 | 770 | 5 | 2.1 | 15.8 |
| 3 | $-12$ | 1.21 | 400 | 5 | 2.3 | 14.2 |
| 4 | $-12$ | 1.21 | 430 | 7 | 2.0 | 15.5 |
| 5 | $-9$ | 1.80 | 510 | 6 | 2.0 | 14.9 |
| 6 | $-8$ | 1.25 | 450 | 4 | 1.8 | 17.4 |
| 7 | $-9$ | 1.38 | 410 | 5 | 1.8 | 17.3 |
| 8 | $-8$ | 1.31 | 420 | 3 | 1.7 | 18.1 |
| 9 | $-7$ | 1.28 | 480 | 5 | 1.6 | 18.2 |
| 10 | $-10$ | 1.35 | 1700 | 4 | 2.2 | 11.0 |
| 11 | $-9$ | 1.31 | 1200 | 5 | 0.58 | 12.1 |
| 12 | $-8$ | 1.28 | 850 | 4 | 0.1 | 13.1 |
| 13 | $-8$ | 1.10 | 1100 | 7 | 1.0 | 13.1 |
| 14 | $-7$ | 1.12 | 1050 | 7 | 1.7 | 13.0 |
| 15 | $-8$ | 2.10 | 1500 | 6 | 1.2 | 12.1 |

In TABLE 1, the capacitance and the dielectric loss tanδ are measurement values obtained under the conditions of 1 kHz and 1 Vrms by a digital LCR meter, and the relative dielectric constant K was calculated from these values and the dimensions. The temperature coefficient T.C.C. of dielectric constant is represented by the maximum value among changes of dielectric constant over a temperature range of $-25°$ C. to 85° C. and over a temperature range of $-55°$ C. to 125° C. with capacitance $C_{100}$ at the time when the sample was held at this temperature for 100 hours as follows:

$$100\times(C_1-C_{100})/C_1$$

As is apparent from TABLE 1, the dielectric ceramic composition constituting the capacitor of the present invention has a superior temperature coefficient of dielectric constant and is excellent in various electrical characteristics, such as the DC bias voltage dependence of the dielectric constant, the AC bias voltage dependence of the dielectric loss, the insulation resistance, and the aging rate.

As compared with the case (sample Nos. 1 to 9) in which Ca was singly used, in the case (sample Nos. 13 and 14) in which composite substitution was performed using Ca and Ba or Sr, the dielectric constant increased, and the temperature coefficient satisfied the B characteristic and the X7S specification. In addition, the CR value and the AR at 25° C. also improved.

In the composite substitution of Ba and Sr (sample No. 15), although the dielectric constant decreased, the temperature coefficient improved to satisfy the X7S specification.

The optimal ranges of the composition ratios more or less depend on the type of Ae element. However, the ranges of $x=0.15$ to $0.50$ and $y=0.20$ to $0.70$ are preferable in the case of Ca from overall judgement on, e.g., the dielectric constant and the dielectric loss.

EXAMPLE 2

Disks, were formed following the same procedures as in Example 1 by adding glass components to the high-dielectric constant ceramic composition of sample No. 2 formed in Example 1, and were sintered to obtain sample Nos. 16 to 20. The electrical characteristics of the resultant sintered products were measured following the same procedures as in Example 1. Note that five types of compositions shown in TABLE 2 below were used as the glass components. The results are listed in TABLE 3 below.

A sintered product with a thickness of 400 μm was applied with 700V at a high temperature of 85° C. and a high humidity of 95% RH, thus performing a humidity load life test. As a result, the percentage of rejects after 1,000 hours was as good as about 0.1%. In addition, a high-temperature humidity load life test was conducted at 150° C. and 700V, and the percentage of rejects in this case was also as very good as about 0.1%.

EXAMPLE 3

An MLC was fabricated by using the same dielectric ceramic composition as sample No. 2 in Example 1 following the procedures described below.

First, a calcined powder and a glass component of 500 ppm were mixed together, and an organic solvent and a binder were added to the mixture. A 38 μm thick green sheet was formed from the resultant slurry by using a doctor blade type caster. An electrode paste of 55Ag/45Pd was used to print a predetermined pattern on the green sheet, and six such green sheets each having this electrode pattern were stacked under pressure. Thereafter, the resultant structure was cut into a predetermined shape, and after the binder was burned out therefrom, the cut material was sintered at 1,200° C. After the sintering, a silver paste was baked at 800° C. as outer electrodes, thus completing the MLC.

The size of the obtained device was 4.5×3.2 mm, the thickness of a single layer after the sintering was about 24 μm, and the capacitance was 11 nF. The temperature coefficient of the capacitance was within a range of ±10% over the range of −25° C. to 85° C., i.e., satisfied the B characteristic of the EIAJ specifications, and was within a range of ±22% over the range of −55° C. to 125° C., i.e., satisfied the X7S of the EIA specifications.

TABLE 2

| No. | B$_2$O$_3$ | SiO$_2$ | PbO | Al$_2$O$_3$ | BaO | SrO | CaO | MgO | ZnO | Li$_2$O |
|---|---|---|---|---|---|---|---|---|---|---|
| 1 | 34 | 21 | 10 | 11 | 18 | — | — | 6 | — | — |
| 2 | 80 | 10 | — | 5 | 5 | — | — | — | — | — |
| 3 | 40 | 10 | — | 16 | 16 | 9 | — | 5 | — | — |
| 4 | 60 | 19 | — | 11 | 11 | — | — | 10 | — | — |
| 5 | 37 | 10 | 40 | — | — | — | — | — | 13 | — |

TABLE 3

| Sample No. | x (mol) | y (mol) | Dielectric constant K 25° C. | Dielectric loss DF (%) | Maximum T.C.C. (%) −25° C. to 85° C. | Maximum T.C.C. (%) −55° C. to 125° C. |
|---|---|---|---|---|---|---|
| 1 | 0.22 | 0.3 | 1350 | 1.08 | −7 | −18 |
| 2 | 0.22 | 0.3 | 1350 | 1.08 | −7 | −18 |
| 3 | 0.22 | 0.3 | 1350 | 1.08 | −7 | −18 |
| 4 | 0.22 | 0.3 | 1300 | 1.08 | −7 | −18 |
| 5 | 0.22 | 0.3 | 1300 | 1.08 | −7 | −18 |

| Sample No. | Bias voltage electric field dependence (%) Dielectric constant | Bias voltage electric field dependence (%) Dielectric loss | Product of capacitance and resistance, CR value (ΩF) 25° C. | Product of capacitance and resistance, CR value (ΩF) 125° C. | Aging rate AR (%) | Glass Type | Glass Addition amount (ppm) |
|---|---|---|---|---|---|---|---|
| 1 | −10 | 1.28 | 770 | 5 | 2.1 | 1 | 500 |
| 2 | −10 | 1.28 | 770 | 5 | 2.1 | 2 | 500 |
| 3 | −10 | 1.28 | 770 | 5 | 2.1 | 3 | 500 |
| 4 | −10 | 1.28 | 770 | 5 | 2.1 | 4 | 1000 |
| 5 | −10 | 1.28 | 770 | 5 | 2.1 | 5 | 1000 |

As shown in TABLE 3, almost no change was found in the characteristics regardless of the type of glass component; that is, the sintering temperature could be decreased by 50° C. to 100° C., and the other characteristics were also good.

The rate of change in capacitance upon application of a bias voltage of 50V was −11%. The dielectric loss was 1.47%, and the aging rate was 2.1%.

Figure 7:
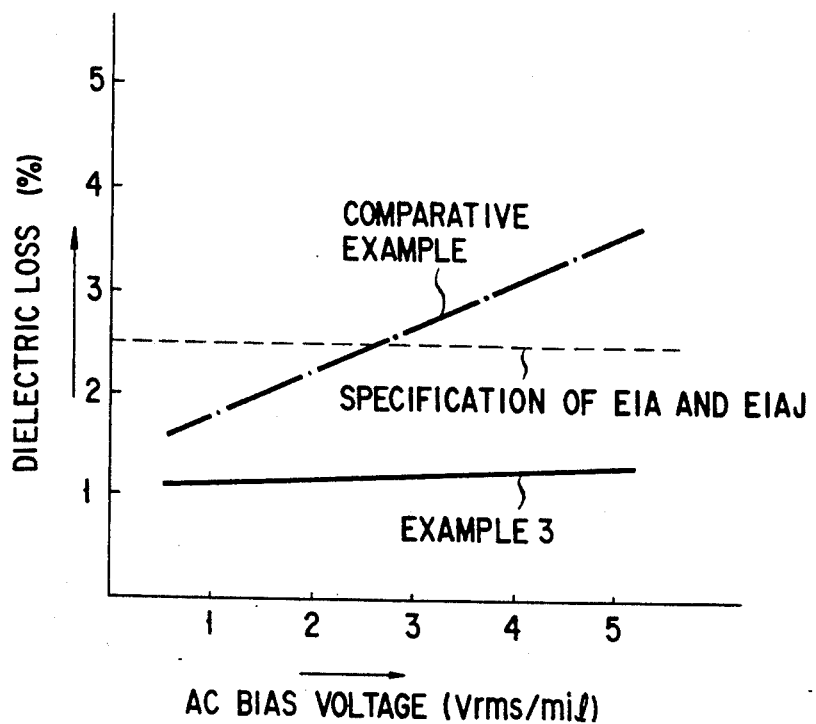
FIG. 7 is a graph showing the AC bias voltage dependence of the dielectric loss of an MLC fabricated in Example 3 of the present invention together with the AC bias voltage dependence of a commercially available MLC using a $BaTiO_3$-based dielectric as a comparative example.

FIG. 7 shows the AC bias voltage dependence of the dielectric loss of this MLC. As a comparative example, the AC bias voltage dependence of a commercially available MLC using a BaTiO$_3$-based dielectric is also shown in FIG. 7. In the present invention, the dielectric loss was about $-1\%$ even when 5 Vrms was applied per 1 mil, i.e., per 24.5 μm of the thickness of the dielectric layer. In the comparative example, however, the dielectric loss exceeded 2.5%, which is the spec of the EIA and the EIAJ, upon application of 3 Vrms/mil. As can been seen from FIG. 7, the product of the present invention is by far superior to the BaTiO$_3$-based dielectric.

The present invention, therefore, is also useful in, for example, fabricating a capacitor or a stacked ceramic capacitor, which consists of dielectric films each with a thickness of a few micromillimeters or less, by using a technique such as a sol-gel technique. In addition, the present invention can be applied to a high-dielectric constant film for a semiconductor memory, which has been examined as a substitute for SiO$_2$.

Figure 8:
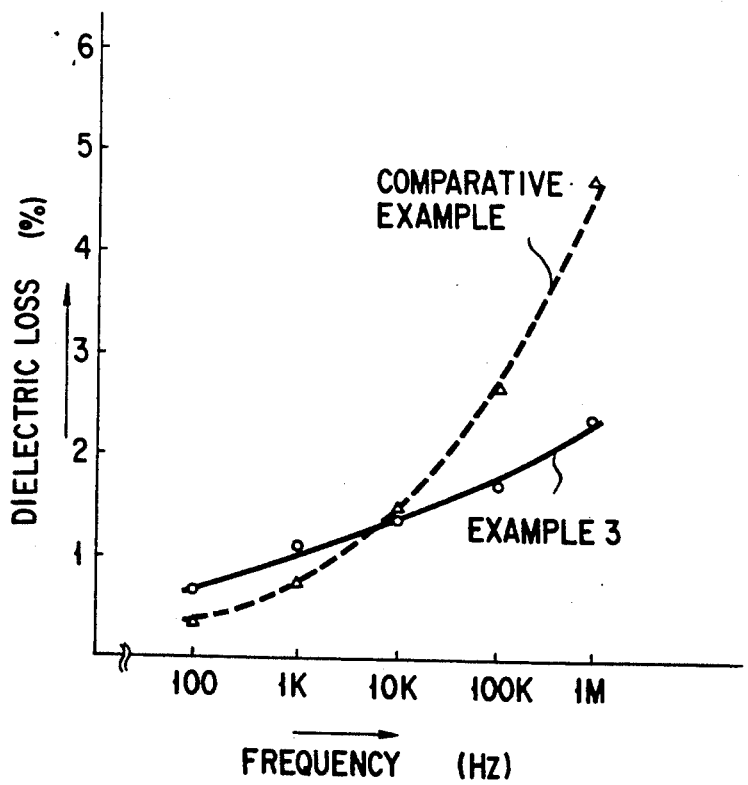
FIG. 8 is a graph showing the frequency characteristic of an MLC using sample No. 18 prepared in Example 1 of the present invention as a dielectric material together with the frequency characteristic of an MLC using a commercially available PLZT-based dielectric using La, in place of Ca, as a substituent element in a basic composition.

FIG. 8 shows the frequency dependence of an MLC using the dielectric ceramic composition having the composition of sample No. 18 prepared in Example 1, and that of an MLC using a commercially available PLZT-based dielectric substituted with La in place of Ca. FIG. 8 reveals that no appreciable difference was found at 10 kHz or less but the product of the present invention exhibited by far excellent characteristics at 100 kHz or more.

EXAMPLE 4

Oxides and carbonates of, e.g., Pb, Ca, Sr, Ba, Zr, Ti, and Nb as the starting materials were blended so as to obtain various composition ratios as shown in TABLE 4 below, mixed by, e.g., a ball mill, and calcined at 900° C. After the resultant calcined products were milled and mixed, polyvinyl alcohol as a binder was added and the mixture was granulated. The resultant powders were pressed to form disks each having a diameter of 17 mm and a thickness of about 2 mm. After the binder was removed from the disks, the disks were sintered in the air at 1,200° C. to 1,250° C., thereby obtaining sample Nos. 1 to 9 having the compositions listed in TABLE 4.

The characteristics of these samples were measured following the procedures below. That is, after the sintered product was formed to have a thickness of 1 mm, silver electrodes were baked on both the surfaces of the product, and the electrical characteristics were measured. The capacitance and the dielectric loss (tan δ) were measured at temperatures of 25° C. and 125° C. under the conditions of 1 kHz and 1 Vrms by using a digital LCR meter. The dielectric constant K was calculated from these values and the outer dimensions. The insulation resistance (IR) was calculated from the value measured using an insulation resistance meter after a voltage of 250V was applied for two minutes. The temperature coefficient T.C.C. of dielectric constant is represented by the maximum value of a change width over a temperature range of $-25°$ C. to 85° C. and over a temperature range of $-55°$ C. to 125° C. with reference to a dielectric constant at 20° C. in the case of the temperature range of $-25°$ C. to 85° C. and a dielectric constant at 25° C. in the case of the temperature range of $-55°$ C. to 125° C. These results are listed in TABLE 4.

TABLE 4

| Sample No. | Ae | x (mol) | y (mol) | Additive | Addition amount (mol %) | Dielectric loss DF 25° C. (%) | Dielectric constant K 25° C. | Insulation resistance (MΩ) 25° C. | Insulation resistance (MΩ) 125° C. | Temperature coefficient of dielectric constant $-25°$ C. to 85° C. | Temperature coefficient of dielectric constant $-55°$ C. to 125° C. |
|---|---|---|---|---|---|---|---|---|---|---|---|
| 1 | Ca | 0.25 | 0.3 | Nb$_2$O$_5$ | 1 | 0.84 | 1090 | $2 \times 10^7$ | $1 \times 10^4$ | $-14$ | $-21$ |
| 2 | Ca | 0.25 | 0.3 | Nb$_2$O$_5$ | 2 | 1.58 | 1230 | $1 \times 10^7$ | $8 \times 10^5$ | $-8$ | $-16$ |
| 3 | Ca | 0.25 | 0.3 | Nb$_2$O$_5$ | 3 | 1.59 | 1360 | $1 \times 10^7$ | $2 \times 10^6$ | $-8$ | $-18$ |
| 4 | Ca | 0.25 | 0.3 | Nb$_2$O$_5$ | 4 | 1.68 | 1420 | $1 \times 10^7$ | $3 \times 10^6$ | $-8$ | $-20$ |
| 5 | Ba | 0.60 | 0.25 | Nb$_2$O$_5$ | 2 | 0.25 | 2630 | $8 \times 10^6$ | $1 \times 10^6$ | $-10$ | $-17$ |
| 6 | Ba | 0.60 | 0.25 | Nb$_2$O$_5$ | 4 | 0.31 | 2810 | $1 \times 10^7$ | $2 \times 10^6$ | $-12$ | $-19$ |
| 7 | Ba | 0.60 | 0.25 | Nb$_2$O$_5$ | 6 | 0.43 | 3000 | $2 \times 10^7$ | $3 \times 10^6$ | $-14$ | $-23$ |
| 8 | Ba | 0.60 | 0.25 | Nb$_2$O$_5$ | 8 | 0.50 | 3100 | $2 \times 10^7$ | $6 \times 10^6$ | $-18$ | $-25$ |
| 9 | Ba | 0.60 | 0.25 | Nb$_2$O$_5$ | 10 | 0.81 | 3150 | $2 \times 10^7$ | $9 \times 10^6$ | $-22$ | $-33$ |
| Reference 1 | Ca | 0.25 | 0.3 | | 0 | 0.34 | 1050 | $3 \times 10^6$ | $1 \times 10^3$ | $-14$ | $-23$ |
| Reference 2 | Ba | 0.60 | 0.25 | | 0 | 0.21 | 2500 | $7 \times 10^6$ | $7 \times 10^4$ | $-8$ | $-15$ |
| Reference 3 | Ba | 0.60 | 0.25 | Nb$_2$O$_5$ | 15 | 1.50 | 2700 | $3 \times 10^6$ | $2 \times 10^5$ | $-28$ | $-40$ |
| Reference 4 | Ba | 0.60 | 0.25 | Nb$_2$O$_5$ | 20 | 3.2 | 2000 | $1 \times 10^5$ | $1 \times 10^4$ | $-38$ | $-50$ |

As shown in TABLE 4. each of the obtained dielectric ceramic compositions had a small T.C.C, i.e., had excellent temperature coefficients. In addition, the value of the dielectric constant improved, and various electrical characteristics such as the insulation resistance were good.

As is also apparent from TABLE 4, the use of Ba as a substituent element can improve the dielectric constant as compared with the case of Ca substitution.

COMPARATIVE EXAMPLE 1

Dielectric ceramic compositions not containing Nb as an additive and dielectric ceramic compositions containing 10 mol% or more of Nb$_2$O$_5$ were formed as reference sample Nos. 1 to 4, and various characteristics of these samples were measured following the same procedures as in Example 4. The results are also listed in TABLE 4 above. It is clear from TABLE 4 that the reference samples have a low insulation resistance especially at high temperatures and a low dielectric constant.

EXAMPLE 5

5,000 ppm of glass components were added to the dielectric material of sample No. 4 prepared in Example 4 to form disks following the sam procedures as in Example 4. These disks were then sintered to obtain dielectric ceramic compositions according to the present invention. Note that the five types of compositions listed in TABLE 2 above were added as the glass components. The characteristics of these dielectric ceramic compositions were measured following the same procedures as in Example 4. As a result, regardless of the types of glass components added, the characteristics of the obtained dielectric ceramic compositions were almost as good as those of the dielectric ceramic composition of sample No. 4. In addition, it was possible to decrease the sintering temperature by about 50° C. to 100° C.

EXAMPLE 6

An MLC was fabricated following the procedures described below by using a dielectric material having the same composition as sample No. 2 prepared in Example 4.

First, an organic solvent and a binder were added to a calcined powder of a dielectric material prepared following the same procedures as for sample No. 2. A 38 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the resultant structure was cut into a predetermined shape, and the binder was removed therefrom. The resultant material was sintered at 1,200° C., and an Ag paste as outer electrodes was baked at 800° C., thus fabricating an MLC with outer dimensions of 4.5×3.2 mm and a thickness per single dielectric layer after the sintering of about 24 μm. Note that the thickness of the dielectric layer was obtained by measurement using an SEM photograph showing a section of the MLC.

In the obtained MLC, the capacitance was 11 nF, and the temperature coefficient of the capacitance was within a range of ±10% over the range of −25° C. to 85° C., i.e., satisfied the B characteristic of the EIAJ specifications, and was −15% or more over the range of −55° C. to 125° C., i.e., satisfied the X7S characteristic of the EIA specifications.

The dielectric ceramic composition used in this example, therefore, is effective in, for example, fabricating a ceramic capacitor or an MLC, which consists of dielectric layers each with a thickness of a few micrometers or less, by using a technique such as a sol-gel technique. In addition, this dielectric ceramic composition can be applied to a material with high dielectric constant for a capacitor of a semiconductor memory, which has been recently examined as a substitute for $SiO_2$.

EXAMPLE 7

Oxides and carbonates of, e.g., Pb, Ca, Sr, Ba, Zr, Ti, and Cu as the starting materials were blended so as to obtain various composition ratios as shown in TABLE 5 below, mixed by, e.g., a ball mill, and calcined at 900° C. After the resultant calcined products were milled and mixed, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,050° C. to 1,150° C., thereby obtaining sample Nos. 10 to 22.

The characteristics of these samples were measured following the procedures below.

That is, the breakdown voltage was measured at an increasing rate of 200V/sec up depositing silver by evaporation on both the surfaces of a disk-like sample obtained by forming the sintered product to have a thickness of 0.4 mm. The other electrical characteristics were measured by forming the sintered product to have a thickness of 1 mm and baking silver electrodes on both the surfaces of the resultant material. The capacitance and the dielectric loss tanδ were measured under the conditions of 1 kHz and 1 Vrms by using a digital LCR meter. The dielectric constant K was calculated from these values and the outer dimensions. The temperature coefficient T.C.C. of dielectric constant is represented by the maximum value among changes of dielectric constant over a temperature range of 85° C. and over a temperature range of −55° C. to 125° C. with reference to a dielectric constant at 20° C. in the case of the temperature range of −25° C. to 85° C. and a dielectric constant at 25° C. in the case of the temperature range of −55° C. to 125° C. The insulation resistance (IR) was calculated from the value measured using an insulation resistance meter after a voltage of 250V was applied for two minutes. The product of the capacitance and resistance (CR value) was obtained from (a capacitance at 1 kHz)×(an insulation resistance upon voltage application for 2 minutes) at each of 25° C. and 125° C. The dielectric constant and the DC bias voltage dependence of the dielectric constant were obtained from the capacitance and the rates of changes in capacitance measured upon application of a voltage of up to 400V by a DC bias voltage by using a 0.1 mm thick sample. The AC bias voltage dependence of the dielectric loss is represented by the value of a dielectric loss obtained when AC 10V was applied to the same sample as used in the measurements of the dielectric constant and the DC bias voltage dependence of the dielectric constant. These results are listed in TABLE 5.

TABLE 5

| Sample No. | Ae | x (mol) | y (mol) | Additive | Addition amount (mol %) | Dielectric loss DF 25° C. (%) | Dielectric constant K 25° C. |
|---|---|---|---|---|---|---|---|
| 10 | Ca | 0.22 | 0.30 | CuO | 0.1 | 0.72 | 1400 |
| 11 | Ca | 0.55 | 0.25 | CuO | 0.1 | 0.11 | 430 |
| 12 | Ca | 0.80 | 0.15 | CuO | 0.1 | 0.04 | 300 |
| 13 | Ba | 0.39 | 0.30 | CuO | 0.01 | 0.45 | 3600 |
| 14 | Ba | 0.39 | 0.30 | CuO | 0.05 | 0.38 | 3600 |
| 15 | Ba | 0.39 | 0.30 | CuO | 0.1 | 0.32 | 3550 |
| 16 | Ba | 0.39 | 0.30 | CuO | 0.5 | 0.39 | 3300 |
| 17 | Ba | 0.60 | 0.72 | CuO | 0.1 | 0.73 | 5600 |
| 18 | Sr | 0.65 | 0.35 | CuO | 0.1 | 0.15 | 1120 |
| 19 | Ba | 0.39 | 0.30 | Cu | 0.1 | 0.35 | 3500 |
| 20 | Ba Sr | 0.25 0.10 | 0.80 | CuO | 0.1 | 0.73 | 4100 |
| 21 | Ca Ba | 0.15 0.10 | 0.30 | CuO $Cu_2O$ | 0.05 0.05 | 0.91 | 2400 |
| 22 | Sr | 0.65 | 0.35 | CuO Cu | 0.05 0.05 | 0.18 | 1140 |
| Reference 5 | Ca | 0.55 | 0.25 | — | — | 0.08 | 400 |

DC bias voltage dependence (%) of    AC bias voltage dependence (%) of    Product (ΩF) of capacitance    Breakdown TABLE 5-continued

| Sample No. | Maximum T.C.C. (%) −25° C. to 85° C. | Maximum T.C.C. (%) −55° C. to 125° C. | dielectric Constant | dielectric loss | and resistance 25° C. | and resistance 125° C. | voltage (KV/mm) |
| --- | --- | --- | --- | --- | --- | --- | --- |
| 10 | −6.7 | −14.2 | −8 | 1.08 | 2300 | 1400 | 15.7 |
| 11 | −5.1 | −9.2 | −3 | 0.21 | 1200 | 550 | 17.5 |
| 12 | −2.3 | −5.8 | −2 | 0.10 | 1800 | 830 | 17.2 |
| 13 | −13.9 | −25.0 | −15 | 0.78 | 3500 | 570 | 12.5 |
| 14 | −13.7 | −24.0 | −15 | 0.71 | 4800 | 1700 | 13.3 |
| 15 | −13.2 | −26.5 | −13 | 0.56 | 5800 | 2200 | 13.8 |
| 16 | −14.1 | −27.5 | −17 | 0.72 | 4500 | 900 | 12.1 |
| 17 | −12.5 | −27.1 | −45 | 1.47 | 5500 | 2800 | 14.1 |
| 18 | −7.8 | −12.3 | −5 | 0.37 | 2200 | 1340 | 14.3 |
| 19 | −13.2 | −26.5 | −19 | 0.63 | 5500 | 2200 | 14.9 |
| 20 | −12.2 | −24.7 | −38 | 1.62 | 2700 | 570 | 12.4 |
| 21 | −7.5 | −17.3 | −9 | 1.15 | 1900 | 720 | 14.8 |
| 22 | −8.3 | −12.8 | −7 | 0.32 | 2500 | 1400 | 13.7 |
| Reference 5 | −4.8 | −8.8 | −8 | 0.25 | 450 | 4 | 17.4 |

As shown in TABLE 5, the obtained dielectric ceramic compositions had a small T.C.C, i.e., had excellent temperature coefficients. The compositions were also good in the electrical characteristics such as the DC bias voltage dependence of the dielectric constant, the AC bias voltage dependence of the dielectric loss, and the insulation resistance.

COMPARATIVE EXAMPLE 2

Various characteristics of a dielectric ceramic composition (reference sample No. 5) not containing Cu as an additive were measured following the same procedures as for sample Nos. 10 to 22 prepared in Example 7. The results are also listed in TABLE 5 above. It is clear from TABLE 5 that the dielectric ceramic composition according to the present invention is superior to this reference sample in an insulation resistance and a product of the capacitance and resistance especially at high temperatures.

EXAMPLE 8

Glass components were added to the dielectric ceramic composition of sample No. 3 prepared in Example 7 to form disks following the same procedures as in Example 7. These disks were then sintered to obtain sample Nos. 23 to 27. Note that the five types of compositions listed in TABLE 2 above were added as the glass components at the respective mixing ratios shown in TABLE 6. The characteristics of these dielectric ceramic compositions were measured following the same procedures as in Example 7. The results are listed in TABLE 6.

high temperature of 85° C. and a high humidity of 95% RH, thereby performing a humidity load life test. As a result, the percentage of rejects after 500 hours was 0, indicating that the dielectric ceramic compositions of the present invention were very excellent. When a high-temperature load life test was conducted by using 20 samples having the same thickness at 250° C. and 700V for 24 hours, the percentage of rejects was also 0.

EXAMPLE 9

An MLC was fabricated following the procedures described below by using a dielectric material having the same composition as sample No. 3 prepared in Example 7.

First, an organic solvent and a binder were added to a calcined powder of a dielectric material prepared following the same procedures as for sample No. 13 prepared in Example 7. A 38 μm thick green sheet formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the resultant structure was cut into a predetermined shape, and the binder was burned out therefrom. The resultant material was sintered at 1,100° C. and an Ag paste as outer electrodes was baked at 800° C., thus completing an MLC with outer dimensions of 4.5×3.2 mm and a thickness per single dielectric layer after the sintering of about 24 μm. Note that the thickness of the dielectric layer was obtained by measurement using an SEM photograph showing a section of the MLC.

TABLE 6

| Sample No. | Dielectric loss DF 25° C. (%) | Dielectric constant K 25° C. | Maximum T.C.C. (%) −25° C. to 85° C. | Maximum T.C.C. (%) −55° C. to 125° C. | DC bias voltage dependence (%) of dielectric constant | AC bias voltage dependence (%) of dielectric loss | Product (ΩF) of capacitance and resistance 25° C. | Product (ΩF) of capacitance and resistance 125° C. | Added glass Sample No. | Added glass Addition amount (ppm) |
| --- | --- | --- | --- | --- | --- | --- | --- | --- | --- | --- |
| 23 | 0.86 | 1370 | −6.5 | −14.5 | −9 | 0.98 | 2400 | 1500 | 1 | 500 |
| 24 | 0.85 | 1380 | −6.5 | −14.3 | −9 | 0.96 | 2500 | 1600 | 2 | 500 |
| 25 | 0.88 | 1370 | −7 | −14 | −8 | 0.99 | 2400 | 1600 | 3 | 500 |
| 26 | 0.85 | 1360 | −7 | −14.7 | −8 | 0.96 | 2400 | 1300 | 4 | 1000 |
| 27 | 0.85 | 1350 | −7 | −14.5 | −9 | 0.96 | 2300 | 1300 | 5 | 1000 |

As can be seen from TABLE 6, regardless of the types of glass components added, the characteristics of the obtained dielectric ceramic compositions were almost as good as those of the dielectric ceramic compositions of Example 7. In addition, it was possible to decrease the sintering temperature by 50° C. to 100° C. 20 samples obtained by changing the thickness of the sintered product to 400 μm were applied with 700V at a In the obtained MLC, the capacitance was 11 nF, and the temperature coefficient of the capacitance was within a range of ±10% over the range of −25° C. to 85° C., i.e., satisfied the B characteristic of the EIAJ specifications, and was within a range of ±15% over range of −55° C. to 125° C., i.e., satisfied the X7R characteristic of the EIA specifications. The rate of change in capacitance upon application of a bias voltage voltage of 50V was about −1%.

Figure 19:
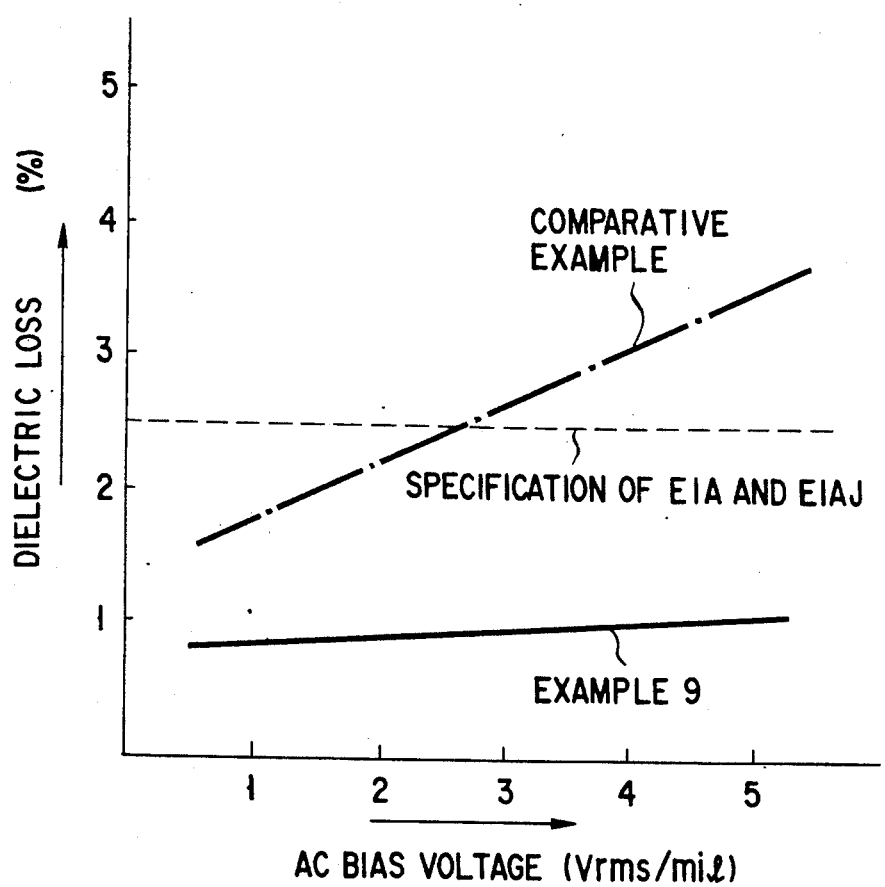
FIG. 19 is a graph showing the AC bias voltage dependence of the dielectric loss of an MLC fabricated in Example 9 of the present invention together with the AC bias voltage dependence of a commercially available X7R specification MLC using a $BaTiO_3$-based dielectric as a comparative example.

The AC bias voltage dependence of the dielectric loss of this MLC is shown in FIG. 19. As a comparative example, the AC bias voltage dependence of a commercially available MLC with X7R specification using a $BaTiO_3$-based dielectric is also shown in FIG. 19. In the MLC according to the present invention, the dielectric loss was about 0.9% even when 5 Vrms was applied per 1 mil, i.e., per 24.5 μm of the thickness of the dielectric layer (5 Vrms/mil). In the comparative example, however, the dielectric loss exceeded 2.5%, which is the spec of the EIA and the EIAJ, upon application of 3 Vrms/mil. As can been seen from FIG. 19, the MLC of the present invention is by far superior to the MLC using $BaTiO_3$-based dielectric.

The dielectric ceramic composition used in the example, therefore, is effective in, for example, fabricating a ceramic capacitor or an MLC, which consists of dielectric layers each with a thickness of a few micrometers or less, by using a technique such as a sol-gel technique. In addition, this dielectric ceramic composition can be applied to a material with high dielectric constant for a capacitor of a semiconductor memory, which has been recently examined as a substitute for $SiO_2$.

EXAMPLE 10

Oxides and carbonates of, e.g., Pb, Ca, Zr, Ti, Cu, and W as the starting materials were blended so as to obtain various composition ratios as shown in TABLE 7 below, mixed by, e.g., a ball mill, and calcined at 900° C. After the resultant calcined products were milled and mixed, polyvinyl alcohol as a binder was added and the mixture was granulated. The resultant powders were pressed to form disks each having a diameter of 17 mm and a thickness of about 2 mm, as sample Nos. 28 to 40. After the binder was burned out from the disks, the disks were sintered in the air at 1,050° C. to 1,150° C., thereby obtaining dielectric ceramic compositions according to the present invention.

The characteristics of these dielectric ceramic compositions measured following the procedures below.

That is, the breakdown voltage was measured at an increasing rate of 200 V/sec upon depositing silver by evaporation on both the surfaces of a disk-like sample obtained by forming the sintered product to have a thickness of 0.4 mm. The other electrical characteristics were measured by forming the sintered product to have a thickness of 1 mm and baking silver electrodes on both the surfaces of the resultant structure. The capacitance and the dielectric loss tank were measured under the conditions of 1 kHz and 1 Vrms by using a digital LCR meter. The dielectric constant K was calculated from these values and the outer dimensions. The insulation resistance (IR) was calculated from the value measured using an insulation resistance meter after a voltage of 250 V was applied for two minutes. The product of the capacitance and resistance (CR value) was obtained from (a capacitance at 1 kHz) × (an insulation resistance upon voltage application for 2 minutes) at each of 25° C. and 125° C. The temperature coefficient T.C.C. of dielectric constant is represented by the maximum value among changes of dielectric constant over a temperature range of −25° C. to 85° C. and over a temperature range of −55° C. to 125° C. with reference to a dielectric constant at 20° C. in the case of the temperature range of −25° C. to 85° C. and a dielectric constant at 25° C. in the case of the temperature range of −55° C. to 125° C. The dielectric constant and the DC bias voltage dependence of the dielectric constant were obtained from capacitance and the rates of changes in capacitance measured upon application of a voltage of up to 400 V by a DC bias voltage by using a 0.1 mm thick sample. The AC bias voltage dependence of the dielectric loss is represented by the value of a dielectric loss obtained when AC 10 V was applied to the same sample as used in the measurements of the dielectric constant and the DC bias voltage dependence of the dielectric constant.

The measurement results are listed in TABLE 7.

TABLE 7

| Sample No. | Ae | x (mol) | y (mol) | Additive | Addition amount (mol %) | Dielectric constant K 25° C. | Dielectric loss DF 25° C. (%) |
|---|---|---|---|---|---|---|---|
| 28 | Ca | 0.22 | 0.30 | $Ba(Cu_{\frac{1}{3}}W_{\frac{1}{3}})O_3$ | 1 | 1400 | 0.71 |
| 29 | Ca | 0.55 | 0.25 | $Sr(Cu_{\frac{1}{3}}W_{\frac{1}{3}})O_3$ | 1 | 420 | 0.09 |
| 30 | Ca | 0.80 | 0.15 | $Sr(Cu_{\frac{1}{3}}Nb_{\frac{2}{3}})O_3$ | 1 | 290 | 0.04 |
| 31 | Ba | 0.39 | 0.30 | $Ba(Cu_{\frac{1}{3}}W_{\frac{1}{3}})O_3$ | 0.1 | 3700 | 0.42 |
| 32 | Ba | 0.39 | 0.30 | $Ba(Cu_{\frac{1}{3}}W_{\frac{1}{3}})O_3$ | 0.4 | 3600 | 0.35 |
| 33 | Ba | 0.39 | 0.30 | $Ba(Cu_{\frac{1}{3}}W_{\frac{1}{3}})O_3$ | 1 | 3550 | 0.30 |
| 34 | Ba | 0.39 | 0.30 | $Ba(Cu_{\frac{1}{3}}W_{\frac{1}{3}})O_3$ | 4 | 3500 | 0.35 |
| 35 | Ba | 0.60 | 0.72 | $Sr(Cu_{\frac{1}{3}}W_{\frac{1}{3}})O_3$ | 1 | 5500 | 0.72 |
| 36 | Sr | 0.65 | 0.35 | $Ca(Cu_{\frac{1}{3}}Ta_{\frac{2}{3}})O_3$ | 1 | 1000 | 0.14 |
| 37 | Ba | 0.39 | 0.30 | $Ba(Cu_{\frac{1}{3}}W_{\frac{1}{3}})O_3$ $Sr(Cu_{\frac{1}{3}}W_{\frac{1}{3}})O_3$ | 0.5 0.5 | 3600 | 0.33 |
| 38 | Ba Sr | 0.25 0.10 | 0.30 | $Ba(Cu_{\frac{1}{3}}Nb_{\frac{2}{3}})O_3$ $Ca(Cu_{\frac{1}{3}}Ta_{\frac{2}{3}})O_3$ | 0.7 0.3 | 4200 | 0.80 |
| 39 | Ca Ba | 0.15 0.10 | 0.30 | $Ba(Cu_{\frac{1}{3}}W_{\frac{1}{3}})O_3$ $Sr(Cu_{\frac{1}{3}}Nb_{\frac{2}{3}})O_3$ $Ca(Cu_{\frac{1}{3}}Ta_{\frac{2}{3}})O_3$ | 0.6 0.3 0.1 | 2500 | 0.95 |
| 40 | Sr | 0.65 | 0.35 | $Ca(Cu_{\frac{1}{3}}Ta_{\frac{2}{3}})O_3$ $Pb(Cu_{\frac{1}{3}}W_{\frac{1}{3}})O_3$ | 0.8 0.2 | 1150 | 0.20 |
| Reference 6 | Ca | 0.55 | 0.25 | — | | 400 | 0.08 |

| Sample No. | Maximum T.C.C. (%) | | DC bias voltage dependence (%) of dielectric constant | AC bias voltage dependence (%) of dielectric loss | Product (ΩF) of capacitance and resistance | | Breakdown voltage (KV/mm) |
|---|---|---|---|---|---|---|---|
| | −25° C. to 85° C. | −55° C. to 125° C. | | | 25° C. | 125° C. | |
| 28 | −6.5 | −13.9 | −8 | 0.99 | 2200 | 1500 | 14.7 |
| 29 | −5.0 | −9.0 | −3 | 0.19 | 1100 | 530 | 18.1 |
| 30 | −2.1 | −5.6 | −3 | 0.10 | 1500 | 770 | 17.8 |
| 31 | −14.0 | −27.0 | −16 | 0.76 | 3800 | 580 | 12.1 |
| 32 | −13.8 | −26.0 | −16 | 0.71 | 4700 | 1200 | 13.0 |

TABLE 7-continued

| | | | | | | | |
|---|---|---|---|---|---|---|---|
| 33 | −13.5 | −27.0 | −14 | 0.69 | 5600 | 2300 | 13.5 |
| 34 | −13.8 | −27.5 | −18 | 0.71 | 4300 | 780 | 12.2 |
| 35 | −12.3 | −26.5 | −46 | 1.55 | 5300 | 2600 | 14.2 |
| 36 | −7.9 | −12.0 | −5 | 0.62 | 1700 | 1150 | 13.8 |
| 37 | −13.4 | −26.5 | −21 | 0.59 | 5300 | 2500 | 14.5 |
| 38 | −13.0 | −26.0 | −39 | 1.95 | 2300 | 420 | 12.0 |
| 39 | −7.0 | −18.0 | −8 | 1.05 | 1700 | 680 | 14.2 |
| 40 | −8.5 | −13.0 | −7 | 0.34 | 2600 | 1400 | 12.1 |
| Reference 6 | −4.8 | −8.8 | −8 | 0.25 | 450 | 4 | 17.4 |

As is clear from TABLE 7, the high-dielectric constant ceramic composition constituting the capacitor of the present invention had a high insulation resistance and good temperature coefficient of dielectric constant.

COMPARATIVE EXAMPLE 3

Various characteristics of a dielectric ceramic composition not containing a Cu composition, which is a perovskite structure, as an additive were measured following the same procedures as for sample Nos. 28 to 40 prepared in Example 10. The obtained results are also listed in TABLE 7. As a result of the measurements, the dielectric ceramic composition according to the present invention was found to be superior to this comparative example in the insulation resistance and the product of the capacitance and resistance especially at high temperatures.

EXAMPLE 11

Glass components were added to a dielectric ceramic composition having the same composition as sample No. 28 prepared in Example 10 to form disks following the same procedures as in Example 4, and the formed disks were sintered. Note that the five types of compositions shown in TABLE 2 were used as the glass components. The results are listed in TABLE 8 below.

and six such sheets each having this electrode pattern were stacked under pressure. Subsequently, the resultant structure was cut into a predetermined shape, and the binder was removed therefrom. The resultant material was sintered at 1,100° C., and a silver paste as outer electrodes was baked at 800° C., thus fabricating an MLC. The outer dimensions of the MLC were 4.5×3.2 mm, its single dielectric layer thickness after the sintering was 24 μm, and its capacitance was 11 nF.

In the obtained device, the temperature coefficient of the capacitance was within a range of ±10% over the range of −25° C. to 85° C., i.e., satisfied the B of the EIAJ specifications, and was within a range of −22% over the range of −55° C. to 125° C., i.e., satisfied the X7S of the EIA specifications.

The dielectric ceramic composition used in this example, therefore, is effective in, for example, fabricating a capacitor or a stacked ceramic capacitor, which consists of dielectric layers each with a thickness of a few micrometers or less, by using a technique such as a sol-gel technique. In addition, this dielectric ceramic composite can be applied to a high-dielectric constant film for a capacitor of a semiconductor memory, which has been recently examined as a substitute for $SiO_2$.

EXAMPLE 13

TABLE 8

| Sample No. | Dielectric loss DF 25° C. (%) | Dielectric constant K 25° C. | Maximum T.C.C. (%) | | DC bias voltage dependence (%) of dielectric constant | AC bias voltage dependence (%) of dielectric loss | Product (ΩF) of capacitance and resistance | | Added glass | |
|---|---|---|---|---|---|---|---|---|---|---|
| | | | −25° C. to 85° C. | −55° C. to 125° C. | | | 25° C. | 125° C. | Sample No. | Addition amount (ppm) |
| 41 | 0.75 | 1350 | −6.5 | −14.2 | −9 | 0.95 | 2500 | 1500 | 1 | 500 |
| 42 | 0.75 | 1350 | −6.5 | −14.3 | −9 | 0.95 | 2500 | 1600 | 2 | 500 |
| 43 | 0.74 | 1350 | −7 | −14 | −9 | 0.96 | 2400 | 1600 | 3 | 500 |
| 44 | 0.74 | 1300 | −7 | −14.2 | −8 | 0.94 | 2400 | 1300 | 4 | 1000 |
| 45 | 0.74 | 1300 | −7 | −14.2 | −8 | 0.93 | 2300 | 1300 | 5 | 1000 |

As is apparent from TABLE 8, regardless of the types of glass components used, the sintering temperature could be decreased by 50° C. to 100° C. with almost no changes in the characteristics of the dielectric ceramic compositions. In addition, the other various characteristics were also good.

EXAMPLE 12

An MLC was fabricated following the procedures described below by using the same high-dielectric constant dielectric ceramic composition as sample No. 28 prepared in Example 10.

First, an organic solvent and a binder were added to a calcined powder, and a 38 μm thick green sheet was formed from the resultant slurry by using a doctor blade type caster. A predetermined pattern was printed on the green sheet by using an electrode paste of 70Ag/30Pd, Oxides or carbonates of, e.g., Pb, Ba, Zr, Ti, and Bi as the starting materials were blended so as to obtain various composition ratios shown in TABLE 9 below, mixed by, e.g., a ball mill, and calcined at 900° C. After the resultant calcined products were milled and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,000° C. to 1,100° C., thereby obtaining sample Nos. 1 to 37.

After each sintered product was formed to have a thickness of 1 mm, silver electrodes were baked on both the surfaces of the structure, and the electrical characteristics were measured. The results are shown in TABLE 9.

TABLE 9

| Sample No. | Substituent element | x (mol) | y (mol) | MnO/CoO (mol %) | $Bi_2O_3$ (mol %) | Dielectric constant K 25° C. | Dielectric loss DF (%) | Maximum T.C.C. (%) −25° C. to 85° C. | Maximum T.C.C. (%) −55° C. to 125° C. | DC bias voltage dependence (%) of dielectric constant | AC bias voltage dependence (%) of dielectric loss | Insulation resistance 125° C. (MΩ) |
|---|---|---|---|---|---|---|---|---|---|---|---|---|
| 1 | Ca | 0.20 | 0.72 | 0 | 0.05 | 1500 | 1.07 | −10 | −17 | +9.1 | 1.07 | $1 \times 10^6$ |
| 2 | Ca | 0.20 | 0.72 | 0 | 0.1 | 1600 | 0.78 | −12 | −19 | +8.9 | 0.79 | $1 \times 10^6$ |
| 3 | Ca | 0.20 | 0.72 | 0 | 0.2 | 1700 | 0.51 | −12 | −20 | +9.3 | 0.53 | $1 \times 10^6$ |
| 4 | Ca | 0.20 | 0.72 | 0 | 0.5 | 2000 | 1.18 | −15 | −23 | +9.5 | 1.20 | $2 \times 10^6$ |
| 5 | Ca | 0.20 | 0.72 | 0 | 1.0 | 2300 | 1.50 | −17 | −25 | +8.8 | 1.51 | $2 \times 10^6$ |
| 6 | Ca | 0.20 | 0.72 | MnO 0.3 | 0.5 | 1600 | 0.98 | −8 | −14 | +8.6 | 1.00 | $2 \times 10^6$ |
| 7 | Ca | 0.20 | 0.72 | MnO 0.5 | 0.5 | 1550 | 0.87 | −8 | −13 | +9.2 | 0.89 | $1 \times 10^6$ |
| 8 | Ca | 0.20 | 0.72 | MnO 0.75 | 0.5 | 1500 | 0.79 | −7 | −13 | +8.9 | 0.80 | $1 \times 10^6$ |
| 9 | Ca | 0.20 | 0.72 | MnO 1.0 | 0.5 | 1450 | 0.68 | −7 | −13 | +9.0 | 0.68 | $1 \times 10^6$ |
| 10 | Ca | 0.20 | 0.72 | MnO 1.5 | 0.5 | 1400 | 0.53 | −7 | −13 | +9.1 | 0.55 | $1 \times 10^6$ |
| 11 | Sr | 0.32 | 0.68 | 0 | 0.05 | 2100 | 0.73 | −18 | −26 | +25.1 | 0.74 | $2 \times 10^6$ |
| 12 | Sr | 0.32 | 0.68 | 0 | 0.1 | 2200 | 0.61 | −20 | −29 | +25.8 | 0.63 | $2 \times 10^6$ |
| 13 | Sr | 0.32 | 0.68 | CoO 0.5 | 0.2 | 2250 | 0.43 | −15 | −21 | +27.1 | 0.43 | $2 \times 10^6$ |
| 14 | Sr | 0.32 | 0.68 | CoO 0.5 | 0.5 | 2200 | 0.91 | −16 | −22 | +28.0 | 0.92 | $1 \times 10^6$ |
| 15 | Sr | 0.32 | 0.68 | CoO 0.5 | 1.0 | 2100 | 1.12 | −18 | −25 | +28.1 | 1.13 | $1 \times 10^6$ |
| 16 | Ba | 0.33 | 0.75 | 0 | 0.05 | 5000 | 0.76 | −15 | −21 | −4.6 | 1.31 | $1 \times 10^6$ |
| 17 | Ba | 0.33 | 0.75 | 0 | 0.1 | 5100 | 0.59 | −17 | −25 | −4.9 | 1.01 | $3 \times 10^6$ |
| 18 | Ba | 0.33 | 0.75 | MnO 0.4 | 0.2 | 5150 | 0.43 | −13 | −20 | −5.2 | 0.78 | $3 \times 10^6$ |
| 19 | Ba | 0.33 | 0.75 | MnO 0.4 | 0.5 | 5200 | 0.76 | −15 | −21 | −4.9 | 1.29 | $3 \times 10^6$ |
| 20 | Ba | 0.33 | 0.75 | MnO 0.4 | 1.0 | 5250 | 0.98 | −17 | −25 | −5.3 | 1.88 | $3 \times 10^6$ |
| 21 | Ba Ca | 0.20 0.10 | 0.70 | MnO 0.5 | 0.3 | 3300 | 0.88 | −9 | −14 | −1.5 | 1.51 | $2 \times 10^6$ |
| 22 | Ba Sr | 0.20 0.17 | 0.70 | MnO 0.6 | 0.3 | 3600 | 0.93 | −10 | −14 | +3.5 | 1.63 | $2 \times 10^6$ |
| 23 | Ca | 0.20 | 0.72 | 0 | 0 | 1400 | 1.21 | −8 | −16 | +9.3 | 1.31 | $2 \times 10^3$ |
| 24 | Ca | 0.20 | 0.72 | 0 | 3.0 | 1100 | 2.73 | −18 | −27 | +8.8 | 2.81 | $1 \times 10^6$ |
| 25 | Ca | 0.20 | 0.72 | MnO 3.0 | 3.0 | 1000 | 2.38 | −27 | −33 | +8.3 | 2.45 | $3 \times 10^5$ |
| 26 | Sr | 0.32 | 0.68 | 0 | 0 | 2000 | 0.89 | −17 | −33 | +28.0 | 0.89 | $4 \times 10^3$ |
| 27 | Sr | 0.32 | 0.68 | 0 | 3.0 | 1500 | 2.41 | −19 | −26 | +27.1 | 2.48 | $1 \times 10^6$ |
| 28 | Sr | 0.32 | 0.68 | CoO 3.0 | 3.0 | 1300 | 2.03 | −21 | −27 | +27.9 | 2.10 | $4 \times 10^5$ |
| 29 | Ba | 0.33 | 0.75 | 0 | 0 | 4800 | 0.85 | −14 | −29 | −5.9 | 2.15 | $3 \times 10^3$ |
| 30 | Ba | 0.33 | 0.75 | 0 | 3.0 | 4400 | 2.31 | −19 | −25 | −5.6 | 3.78 | $1 \times 10^6$ |
| 31 | Ba | 0.33 | 0.75 | MnO 3.0 | 3.0 | 4200 | 2.05 | −21 | −28 | −5.1 | 3.59 | $4 \times 10^5$ |
| 32 | Ba Ca | 0.20 0.10 | 0.70 | 0 | 0 | 3600 | 0.98 | −15 | −29 | −1.5 | 1.51 | $3 \times 10^3$ |
| 33 | Ba Ca | 0.20 0.10 | 0.70 | 0 | 3.0 | 3100 | 2.45 | −19 | −27 | −2.1 | 3.41 | $1 \times 10^6$ |
| 34 | Ba Ca | 0.20 0.10 | 0.70 | MnO 3.0 | 3.0 | 2900 | 2.19 | −21 | −30 | −1.9 | 3.29 | $2 \times 10^5$ |
| 35 | Bs Sr | 0.20 0.17 | 0.70 | 0 | 0 | 4000 | 0.88 | −11 | −20 | +3.1 | 1.43 | $5 \times 10^3$ |
| 36 | Ba Sr | 0.20 0.17 | 0.70 | 0 | 3.0 | 3400 | 2.31 | −16 | −22 | +2.7 | 3.71 | $2 \times 10^6$ |
| 37 | Ba Sr | 0.20 0.17 | 0.70 | MnO 3.0 | 3.0 | 3100 | 2.05 | −18 | −26 | +2.9 | 3.58 | $3 \times 10^5$ |

In TABLE 9, the capacitance and the dielectric loss tanδ were measured under the conditions of 1 kHz and 1 Vrms by using a digital LCR meter. The relative dielectric constant K was calculated from these values and the outer dimensions. The temperature coefficient T.C.C. of dielectric constant is represented by the maximum value of a change width over a temperature range of −25° C. to 85° C. and over a temperature range of −55° C. to 125° C. with reference to a dielectric constant at 20° C. in the case of the temperature range of −25° C. to 85° C. and a dielectric constant at 25° C. in the case of the temperature range of −55° C. to 125° C.

As is apparent from TABLE 9, this dielectric ceramic composition has a very high insulation resistance at 125° C. and an excellent temperature characteristic of dielectric constant. The composition was also excellent in various electrical characteristics such as the DC bias voltage dependence of the dielectric constant and the AC bias voltage dependence of the dielectric loss.

Figure 9:
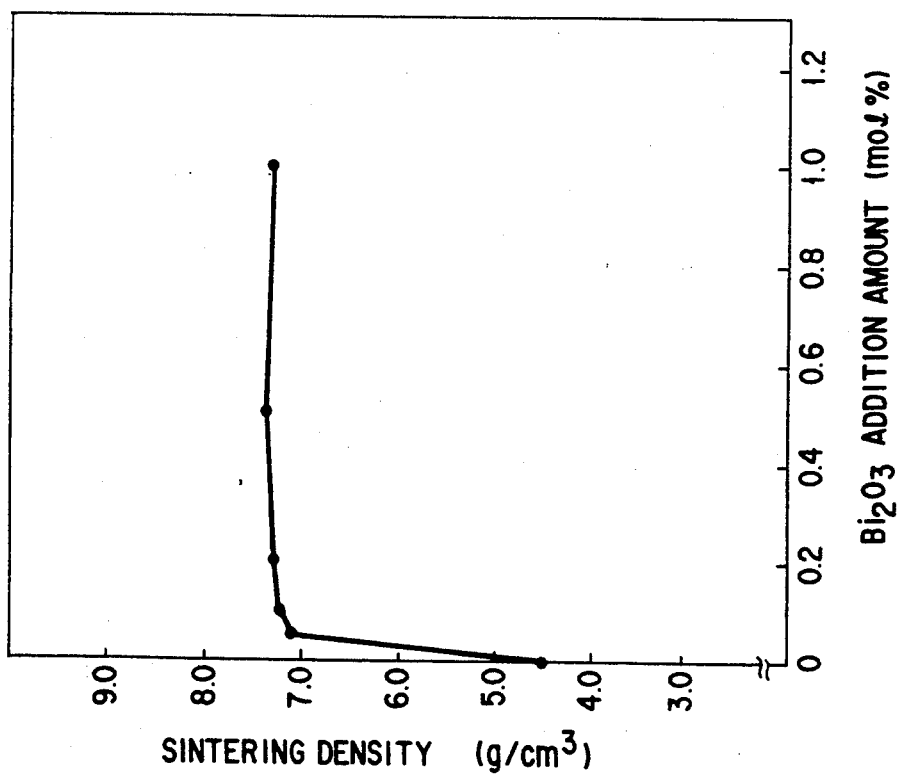
FIG. 9 is a graph showing the relationship between the sintering density and the addition amount of $Bi_2O_3$ in a dielectric ceramic composition prepared in Example 13 of the present invention.

FIG. 9 shows the density of each of sample Nos. 1 to 5 as a function of the addition amount of $Bi_2O_3$. As can be seen from FIG. 9, the sintering density is increased by addition of $Bi_2O_3$.

EXAMPLE 14

A dielectric ceramic composition having the same composition as sample No. 4 prepared in Example 13 was synthesized by the hydrothermal synthesis, thus forming a disk following the same produces as in Example 13. This disk was sintered at 950° C. for four hours, and its electrical characteristics were measured.

The use of the hydrothermal synthesis made it possible to perform sintering at a low temperature, more specifically, to decrease the sintering temperature by 50° C. to 100° C. without changing the dielectric characteristics and the electrical characteristics. In addition, since sintering could be performed at a low temperature, grain growth was suppressed to improve a breakdown voltage.

EXAMPLE 15

Various glass components were added to a dielectric ceramic composition having the same composition as sample No. 4 prepared in Example 13, thus forming disks following the same procedures as in Example 13. Subsequently, these disks were sintered at 950° C. for two hours to form sample Nos. 38 to 42. Note that in this example, inner electrodes consisting of Ag/Pd=70/30 (wt % ratio) were used. The five types of compositions listed in TABLE 2 above were used as the glass components added to the composition. The measurement results of the electrical characteristics of these samples are shown in TABLE 10.

EXAMPLE 17

Oxides and carbonates of, e.g., Pb, Ca, Zr, Ti, Mn, and Co as the starting materials were blended so as to obtain various composition ratios shown in TABLE 11 below, mixed by, e.g., a ball mill, and calcined at 500° C. to 900° C. After the resultant calcined products were

TABLE 10

| Sample No. | Glass Type | Addition amount (ppm) | Dielectric constant K 25° C. | Dielectric loss DF (%) | Maximum T.C.C. (%) −25° C. to 85° C. | DC bias voltage dependence (%) of dielectric constant | AC bias voltage dependence (%) of dielectric loss | Breakdown voltage (KV/mm) | Failure rate (%) of humidity load life test |
|---|---|---|---|---|---|---|---|---|---|
| 38 | 1 | 500 | 2000 | 1.48 | −15 | +9.5 | 1.18 | 55 | 1 |
| 39 | 2 | 500 | 2000 | 1.48 | −15 | +9.5 | 1.18 | 55 | 0 |
| 40 | 3 | 500 | 2000 | 1.48 | −15 | +9.5 | 1.18 | 55 | 0 |
| 41 | 4 | 500 | 2000 | 1.48 | −15 | +9.5 | 1.18 | 55 | 1 |
| 42 | 5 | 500 | 2000 | 1.48 | −15 | +9.5 | 1.18 | 55 | 1 |

As clearly shown in TABLE 10, regardless of the types of glass components used, each sample exhibited high reliability, and it was possible to decrease the sintering temperature by 50° C. to 100° C. with almost no changes in the dielectric characteristics and the electrical characteristics. In addition, since sintering could be performed at a low temperature, grain growth was suppressed to improve a breakdown voltage.

EXAMPLE 16

An MLC was fabricated by using the same high-dielectric constant dielectric ceramic composition as sample No. 4 prepared in Example 13.

First, an organic solvent and a binder were added to a calcined powder, and a 38 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the resultant structure was cut into a predetermined shape, and the binder was burned out therefrom. The resultant material was sintered at 1,080° C., and a silver paste as outer electrodes was baked at 800° C., thus fabricating an MLC. The outer dimensions of the MLC were 4.5×3.2 mm, its single dielectric layer thickness after the sintering was about 24 μm, and its capacitance was 15 nF.

In the obtained device, the temperature characteristic of the capacitance was within a range of ±15% over the range of −25° C. to 85° C., i.e., satisfied the C characteristic of the EIAJ specifications. When a bias voltage voltage of 50 V was applied, the change in capacitance was +3.2%. The dielectric loss was 1.21%.

The dielectric ceramic composition used in this example, therefore, is effective in, for example, fabricating a capacitor or a stacked ceramic capacitor, which consists of dielectric layers each with a thickness of a few micrometers or less, by using a technique such as a sol-gel technique. In addition, the dielectric ceramic composition can be applied to a high-dielectric constant film for a capacitor of a semiconductor memory, which has been recently examined as a substitute for $SiO_2$.

milled and mixed, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,200° C. to 1,250° C., thereby obtaining sample Nos. 1 to 27.

The characteristics of these samples were measured following the procedures below.

That is, the breakdown voltage was measured at an increasing rate of 200 V/sec by depositing silver by evaporation on both the surfaces of a disk-like sample obtained by forming the sintered product to have a thickness of 0.4 mm. The other electrical characteristics were measured by forming the sintered product to have a thickness of 1 mm and baking silver electrodes on both the surfaces of the resultant structure. The capacitance and the dielectric loss tank were measured under the conditions of 1 kHz and 1 Vrms by using a digital LCR meter. The dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value of a change width over a temperature range of −25° C. to 85° C. and over a temperature range of −55° C. to 125° C. with reference to dielectric constant at 20° C. in the case of the temperature range of −25° C. to 85° C. and a dielectric constant at 25° C. in the case of the temperature range of −55° C. to 125° C. The product of the capacitance and resistance (CR value) was obtained from (a capacitance at 1 kHz)×(an insulation resistance upon voltage application for 2 minutes) at each of 25° C. and 125° C. The DC bias voltage dependence of the dielectric constant is represented by the rate of change in capacitance measured upon application of a voltage of up to 200 V by a DC bias voltage by using a 0.1 mm thick sample. The AC bias voltage dependence of the dielectric loss is represented by the value of a dielectric loss obtained when AC 10 V was applied to the same sample as used in the measurement of the DC bias voltage dependence of the dielectric constant. These results are listed in TABLE 11.

TABLE 11

| Sample No. | Substituent element | x (mol) | y (mol) | Addition Component | Addition amount (mol %) | Dielectric constant K 25° C. | Dielectric loss DF (%) |
|---|---|---|---|---|---|---|---|

TABLE 11-continued

| | | | | | | | |
|---|---|---|---|---|---|---|---|
| 1 | Ca | 0.20 | 0.03 | MnO | 0.1 | 200 | 0.03 |
| 2 | Ca | 0.22 | 0.30 | MnO | 0.5 | 1350 | 0.85 |
| 3 | Ca | 0.45 | 0.47 | MnO | 0.5 | 1350 | 0.22 |
| 4 | Ca | 0.53 | 0.70 | MnO | 0.5 | 550 | 0.30 |
| 5 | Ca | 0.25 | 0.65 | MnO | 0.5 | 900 | 1.00 |
| 6 | Ca | 0.55 | 0.25 | MnO | 0.5 | 400 | 0.04 |
| 7 | Ca | 0.80 | 0.65 | MnO | 0.5 | 400 | 0.05 |
| 8 | Ca | 0.80 | 0.15 | MnO | 0.5 | 260 | 0.02 |
| 9 | Ca | 0.85 | 0.55 | MnO | 0.5 | 310 | 0.04 |
| 10 | Ba | 0.39 | 0.30 | MnO | 0.5 | 3500 | 0.38 |
| 11 | Ba | 0.60 | 0.72 | MnO | 0.5 | 5800 | 0.55 |
| 12 | Ba | 0.60 | 0.12 | MnO | 0.5 | 460 | 0.02 |
| 13 | Ba | 0.70 | 0.50 | MnO | 0.5 | 550 | 0.02 |
| 14 | Ba | 0.75 | 0.25 | MnO | 0.5 | 400 | 0.02 |
| 15 | Sr | 0.32 | 0.32 | MnO | 1.0 | 1900 | 0.70 |
| 16 | Sr | 0.65 | 0.35 | $Co_2O_3$ | 0.5 | 1100 | 0.10 |
| 17 | Sr | 0.65 | 0.37 | $Co_2O_3$ | 1.0 | 850 | 0.02 |
| 18 | Ca<br>Ba | 0.15<br>0.10 | 0.30 | MnO | 0.1 | 2700 | 0.95 |
| 19 | Ca<br>Sr | 0.16<br>0.09 | 0.30 | MnO<br>$Co_2O_3$ | 0.5<br>0.5 | 1650 | 0.80 |
| 20 | Ba<br>Sr | 0.25<br>0.10 | 0.30 | MnO<br>$Co_2O_3$ | 0.5<br>0.5 | 3800 | 0.80 |
| 21 | Ca | 0.20 | 0.30 | MnO | 0.1 | 1950 | 1.20 |
| 22 | Ca | 0.20 | 0.30 | MnO | 0.5 | 1900 | 0.50 |
| 23 | Ca | 0.20 | 0.30 | MnO | 1.0 | 1850 | 0.52 |
| 24 | Ca | 0.20 | 0.30 | MnO | 1.5 | 1720 | 0.90 |
| 25 | Ca | 0.20 | 0.30 | MnO | 2.0 | 1800 | 1.50 |
| 26 | Ca | 0.20 | 0.30 | — | 0 | 2000 | 1.80 |
| 27 | Ca | 0.20 | 0.30 | MnO | 3.0 | 1100 | 2.80 |

| Sample No | Maximum T.C.C. (%) | | DC bias voltage dependence (%) of dielectric constant | AC bias voltage dependence (%) of dielectric loss | Product (ΩF) of capacitance and resistance 25° C. | Breakdown voltage (KV/mm) |
|---|---|---|---|---|---|---|
| | −25° C. to 85° C. | −55° C. to 125° C. | | | | |
| 1 | −1.5 | −4.5 | −1.0 | 0.08 | 1200 | 15.2 |
| 2 | −5.0 | −14.0 | +0.2 | 0.90 | 1000 | 18.9 |
| 3 | +5.0 | −20.0 | +8.5 | 0.48 | 1050 | 14.3 |
| 4 | −6.0 | −19.0 | +8.0 | 0.59 | 1100 | 16.2 |
| 5 | +18.0 | +35.0 | +7.0 | 1.58 | 1050 | 15.1 |
| 6 | −3.5 | −7.7 | +3.0 | 0.10 | 1150 | 18.8 |
| 7 | −4.2 | −8.3 | +3.0 | 0.09 | 1200 | 18.0 |
| 8 | −2.0 | −5.0 | +2.0 | 0.06 | 950 | 19.4 |
| 9 | −1.3 | −3.0 | +3.0 | 0.09 | 950 | 18.6 |
| 10 | −11.0 | −21.0 | −6.2 | 0.49 | 1200 | 13.3 |
| 11 | −10.0 | −24.0 | +5.0 | 0.99 | 2000 | 14.0 |
| 12 | −12.1 | −25.0 | +6.0 | 0.04 | 1500 | 14.5 |
| 13 | −8.0 | −14.5 | +5.0 | 0.04 | 1800 | 14.9 |
| 14 | −4.0 | −9.0 | +3.0 | 0.05 | 1900 | 15.9 |
| 15 | −14.1 | −21.1 | +31.0 | 0.95 | 1300 | 11.8 |
| 16 | −5.0 | −11.8 | +26.0 | 0.22 | 900 | 12.6 |
| 17 | −4.1 | −5.9 | +23.0 | 0.08 | 800 | 13.5 |
| 18 | −7.2 | −13.5 | +5.0 | 1.88 | 1000 | 13.5 |
| 19 | −7.0 | −10.5 | +19.0 | 0.99 | 800 | 13.8 |
| 20 | −9.5 | −15.0 | +21.0 | 0.95 | 1100 | 14.1 |
| 21 | −11.0 | −16.9 | +9.0 | 1.80 | 1100 | 14.5 |
| 22 | −9.5 | −14.0 | +8.0 | 0.70 | 950 | 15.5 |
| 23 | −5.0 | −9.5 | +8.0 | 0.78 | 900 | 18.1 |
| 24 | −5.0 | −8.5 | +7.0 | 1.13 | 850 | 15.0 |
| 25 | −5.0 | −8.9 | +6.0 | 1.90 | 800 | 14.0 |
| 26 | −16.0 | −23.0 | +9.0 | 2.40 | 1100 | 14.0 |
| 27 | −15.0 | −23.0 | +3.0 | 3.60 | 15 | 10.0 |

As shown in TABLE 11, the obtained dielectric ceramic compositions utilized in the present invention had a small T.C.C, i.e., had excellent temperature characteristics. The compositions were also good in electrical characteristics such as the DC bias voltage dependence of the dielectric constant, the AC bias voltage dependence of the dielectric loss, and the insulation resistance.

Figure 10:
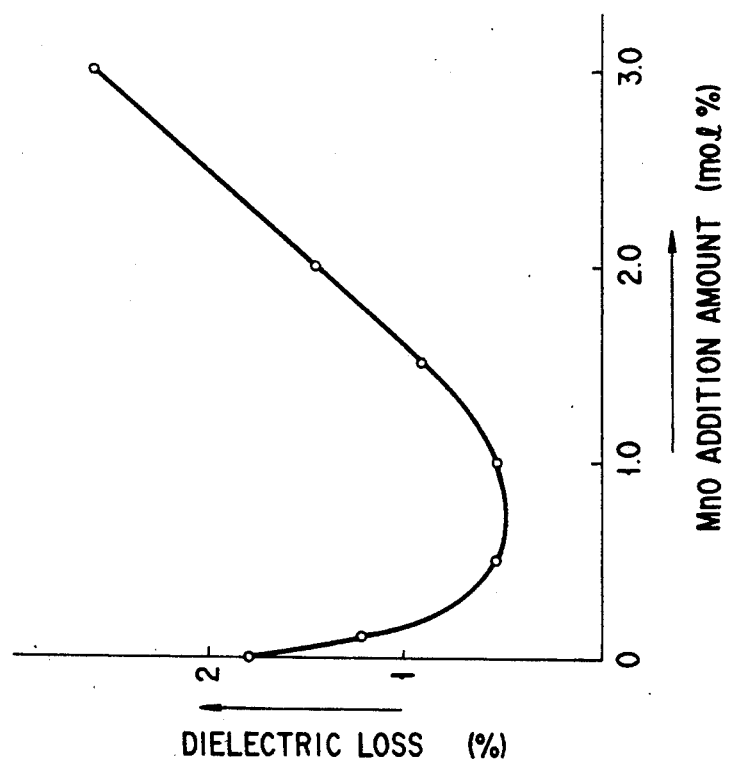
FIG. 10 is a graph showing the relationship between the dielectric loss and the MnO addition amount in a dielectric ceramic composition prepared in Example 17 of the present invention.

In particular, as can be seen by comparing the dielectric ceramic compositions of sample Nos. 21 to 27 in TABLE 11, the dielectric loss is effectively decreased by the addition of the addition component (MnO). Note that sample Nos. 26 and 27 are comparative examples in which the addition amounts of the addition component fall outside the range of the present invention. FIG. 10 is a graph showing the relationship between the addition amount of MnO and the dielectric loss. It was confirmed from FIG. 10 that when the amount of the addition component was 0.1 to 2 mol %, the dielectric loss of the resultant dielectric ceramic composition was considerably decreased. In the dielectric ceramic composition of sample No. 26 not containing the addition component, the AC bias voltage dependence of the dielectric loss is large as shown in TABLE 11.

Figure 11:
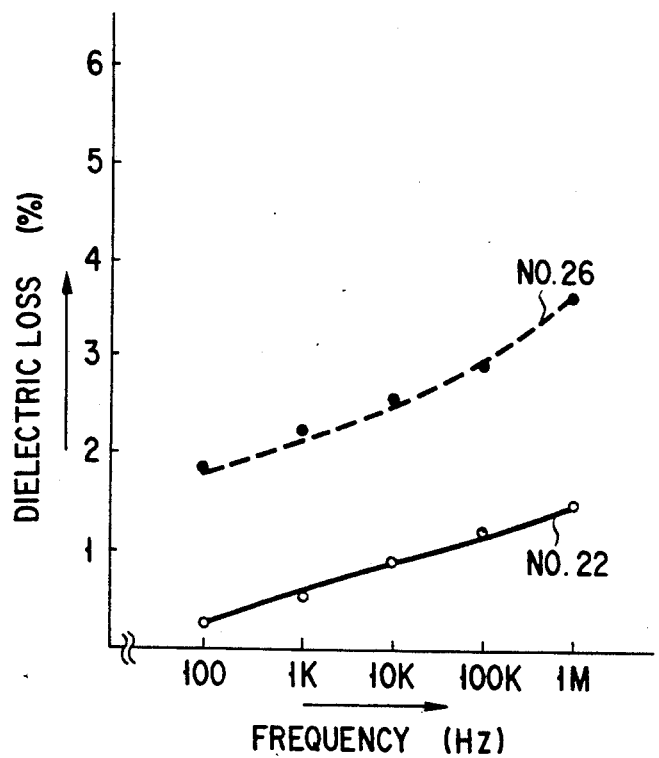
FIG. 11 is a graph showing the relationship between the dielectric loss and the frequency in the dielectric ceramic composition prepared in Example 17 of the present invention.

FIG. 11 shows the frequency characteristic of the dielectric loss of the dielectric ceramic composition of each of sample Nos. 22 and 26. As is apparent from FIG. 11, the addition of the addition component is effective particularly in decreasing a dielectric loss upon application of high frequencies of 100 kHz or more.

As shown in TABLE 11, the use of Sr and Ba as substituent elements can increase the dielectric constant as compared with the case of Ca substitution; a particularly large dielectric constant can be obtained in Ba substitution. When MnO and $Co_2O_3$ were added to the basic composition which was composite-substituted with Ca and Ba or Sr, the dielectric constant increased and the temperature coefficient improved in comparison with the single use of Ca. In addition, the CR value at 25° C. also improved in this case. Also, when MnO and $Co_2O_3$ were added to the basic composition which was composite-substituted with Ba and Sr, the temperature coefficient improved although the dielectric constant tended to slightly decrease as compared with the case wherein Ba was used singly.

EXAMPLE 18

Glass components were added to dielectric materials consisting of various compositions shown in TABLE 12, thus forming disks following the same procedures as in Example 17. Subsequently, these disk-like samples were sintered to form sample Nos. 28 to 32. The five types of compositions listed in TABLE 2 above were added as the glass components at mixing ratios listed in TABLE 12. The characteristics of these dielectric ceramic compositions were measured following the same procedures as in Example 17. The results are also shown in TABLE 12.

Ag paste as outer electrodes was baked at 800° C., thus fabricating an MLC with outer dimensions of 4.5×3.2 mm and a single dielectric layer thickness after the sintering of about 25 μm. Note that the thickness of the dielectric ceramic composition was measured from an SEM photograph showing a section of the MLC.

In the obtained MLC, the capacitance was 11 nF, and the temperature coefficient of the capacitance was within a range of ±10% over the range of −25° C. to 85° C., i.e., satisfied the B characteristic of the EIAJ specifications, and was within a range of ±15% over the range of −55° C. to 125° C., i.e., satisfied the X7R of the EIA specifications. When a DC bias voltage voltage of 50 V was applied, the rate of change in capacitance was ±9%. The dielectric loss was 0.85%, and the breakdown voltage was 1,000 V. That is, the MLC was good in all of the electrical characteristics.

Figure 12:
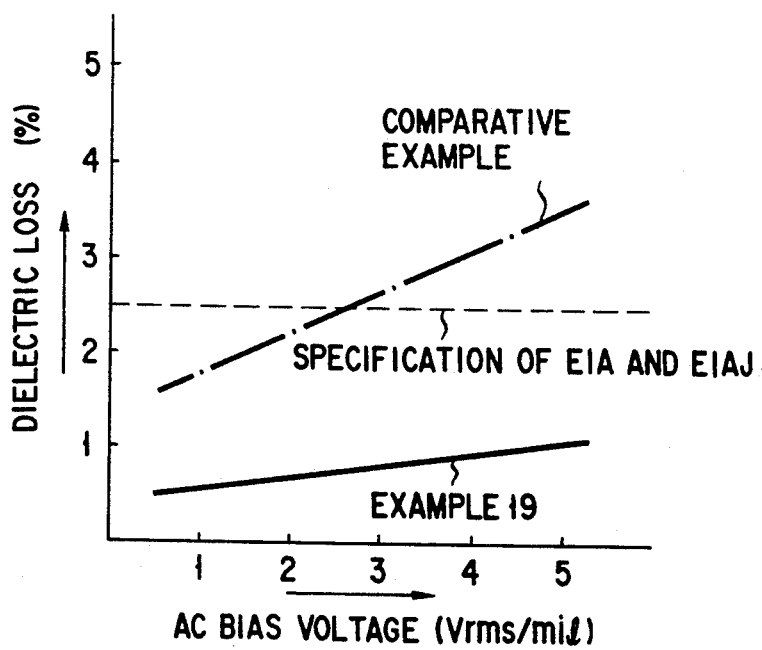
FIG. 12 is a graph showing the AC bias voltage dependence of the dielectric loss of an MLC fabricated in Example 19 of the present invention together with the AC bias voltage dependence of a commercially available MLC with X7R specification using a $BaTiO_3$-based material as a comparative example.

FIG. 12 shows the AC bias voltage dependence of the dielectric loss of this MLC. FIG. 12 also shows, as a comparative example, the AC bias voltage dependence of the dielectric loss of a commercially available X7R specification MLC (222 HFG manufactured by TAM Co.) using a $BaTiO_3$-based material. As clearly shown in FIG. 12, the dielectric loss of the MLC of the present invention was about 0.9% even when 5 Vrms was applied per 1 mil, i.e., per 25.4 μm of the thickness of the dielectric layer (5 Vrms/mil). In the comparative example, however, the dielectric loss exceeded 2.5%,

TABLE 12

| Sample No. | Substituent element | x (mol) | y (mol) | Addition component | Addition amount (mol %) | Glass type | Glass addition amount (ppm) | Dielectric constant K 25° C. | Dielectric loss DF (%) | Maximum T.C.C. (%) −25° C. to 85° C. | Maximum T.C.C. (%) −55° C. to 125° C. | DC bias voltage dependence (%) of dielectric constant | AC bias voltage dependence (%) of dielectric loss | Product of capacitance and resistance CR value (ΩF) 25° C. |
|---|---|---|---|---|---|---|---|---|---|---|---|---|---|---|
| 28 | Ca | 0.22 | 0.30 | MnO | 0.1 | 1 | 500 | 1350 | 0.9 | −6 | −14 | +9.0 | 1.00 | 1100 |
| 29 | Ca | 0.22 | 0.30 | MnO | 0.5 | 2 | 500 | 1300 | 0.4 | −5 | −8 | +8.0 | 0.60 | 950 |
| 30 | Ca | 0.22 | 0.30 | MnO | 2.0 | 3 | 500 | 1200 | 0.9 | −6 | −11 | +7.0 | 1.00 | 770 |
| 31 | Ca | 0.22 | 0.30 | $Co_2O_3$ | 0.5 | 4 | 1000 | 1300 | 0.5 | −4 | −10 | +9.0 | 0.70 | 1000 |
| 32 | Ca | 0.22 | 0.30 | MnO $Co_2O_3$ | 0.2 0.2 | 5 | 1000 | 1300 | 0.5 | −4 | −10 | +9.0 | 0.70 | 1050 |

As clearly shown in TABLE 12, regardless of the types of glass components added, the characteristics of the resultant dielectric ceramic compositions were almost as good as those of the dielectric ceramic compositions obtained in Example 17. In addition, the sintering temperature could be decreased by 50° C. to 100° C.

EXAMPLE 19

An MLC was fabricated by using a dielectric material having the same composition as sample No. 2 prepared in Example 17.

First, 0.3 wt % of the glass components of sample No. 5 shown in TABLE 2 was added to a calcined powder of a dielectric material prepared following the same procedures as for sample No. 2 of Example 17. Subsequently, an organic solvent and a binder were added to the obtained powder mixture, and a 35 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the resultant structure was cut into a predetermined shape, and the binder was burned out therefrom. The resultant material was sintered at 1,100° C., and an which is the spec of EIA and EIAJ, upon application of 3 Vrms/mil. This indicates that the MLC of the present invention is by far superior to an MLC using conventional $BaTiO_3$-based materials in the AC bias voltage dependence of a dielectric loss.

The dielectric ceramic composition used in this example, therefore, is effective in, for example, fabricating a ceramic capacitor or an MLC, which consists of dielectric layers each with a thickness of a few micrometers or less, by using a technique such as a sol-gel technique. In addition, this dielectric ceramic composition can be applied to a high-dielectric constant film for a capacitor of a semiconductor memory, which has been recently examined as a substitute for $SiO_2$.

EXAMPLE 20

Oxides and carbonates of, e.g., Pb, Ca, Zr, Ti, Mn, and Cu as the starting materials were blended so as to obtain composition ratios shown in TABLE 13 below, mixed by, e.g., a ball mill, and calcined at 900° C. After the resultant calcined products were milled by, e.g., a ball mill, and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,100° C., thereby obtaining sample Nos. 1 to 27.

The breakdown voltages and the other electrical characteristics of these samples were measured. The results are listed in TABLE 13 below.

the rate of change in dielectric loss measured upon application of a voltage of up to 200 V by a DC bias voltage by using a 0.1 mm thick sample. The AC bias voltage dependence of the dielectric loss is represented by the value of a dielectric loss obtained when AC 10 V was applied to the same sample as used in the measurements of the dielectric constant and the DC bias voltage dependence of the dielectric constant.

TABLE 13

| Sample No. | Substituent element | x (mol) | y (mol) | MnO/CoO (mol %) | CuO (mol %) | Dielectric constant K 25° C. | Dielectric loss DF (%) | Maximum T.C.C. (%) −25° C. to 85° C. | Maximum T.C.C. (%) −55° C. to 125° C. | DC bias voltage dependence (%) of dielectric constant | AC bias voltage dependence (%) of dielectric loss | Breakdown voltage (KV/mm) | Insulation resistance 125° C. (MΩ) |
|---|---|---|---|---|---|---|---|---|---|---|---|---|---|
| 1 | Ca | 0.20 | 0.72 | 0.3 | 0.5 | 1350 | 1.00 | −7 | −12 | +8.8 | 1.01 | 13.0 | $1 \times 10^6$ |
| 2 | Ca | 0.20 | 0.72 | 0.5 | 0.5 | 1300 | 0.88 | −7 | −12 | +9.0 | 0.88 | 13.0 | $1 \times 10^6$ |
| 3 | Ca | 0.20 | 0.72 | 0.75 | 0.5 | 1250 | 0.78 | −7 | −12 | +9.2 | 0.79 | 13.0 | $2 \times 10^6$ |
| 4 | Ca | 0.20 | 0.72 | 1.0 | 0.5 | 1200 | 0.71 | −7 | −12 | +8.9 | 0.72 | 13.0 | $2 \times 10^6$ |
| 5 | Ca | 0.20 | 0.72 | 0.5 | 0.75 | 1300 | 1.21 | −9 | −12 | +9.3 | 1.27 | 13.5 | $2 \times 10^6$ |
| 6 | Sr | 0.32 | 0.68 | 0.4 | 0.5 | 1850 | 0.71 | −8 | −18 | +27.0 | 0.73 | 14.0 | $2 \times 10^6$ |
| 7 | Sr | 0.32 | 0.68 | 0.4 | 0.75 | 1950 | 0.89 | −9 | −18 | +26.9 | 0.90 | 15.0 | $2 \times 10^6$ |
| 8 | Sr | 0.32 | 0.68 | 0.4 | 1.5 | 2100 | 0.99 | −10 | −18 | +29.1 | 1.02 | 16.0 | $2 \times 10^6$ |
| 9 | Sr | 0.32 | 0.68 | 0.6 | 0.5 | 1800 | 0.63 | −7 | −17 | +27.8 | 0.65 | 13.0 | $2 \times 10^6$ |
| 10 | Sr | 0.32 | 0.68 | 0.6 | 0.75 | 1950 | 0.81 | −9 | −17 | +28.1 | 0.85 | 14.5 | $2 \times 10^6$ |
| 11 | Ba | 0.33 | 0.75 | 0.3 | 0.5 | 4600 | 0.73 | −8 | −20 | −5.1 | 1.41 | 14.0 | $1 \times 10^6$ |
| 12 | Ba | 0.33 | 0.75 | 0.3 | 0.75 | 4750 | 0.89 | −8 | −20 | −4.9 | 1.75 | 15.0 | $1 \times 10^6$ |
| 13 | Ba | 0.33 | 0.75 | 0.3 | 1.0 | 4900 | 1.08 | −9 | −20 | −5.3 | 2.01 | 16.5 | $2 \times 10^6$ |
| 14 | Ba | 0.33 | 0.75 | 0.6 | 0.5 | 4400 | 0.61 | −7 | −18 | −5.5 | 1.15 | 13.0 | $2 \times 10^6$ |
| 15 | Ba | 0.33 | 0.75 | 0.6 | 0.75 | 4600 | 0.79 | −8 | −18 | −5.2 | 1.51 | 14.5 | $2 \times 10^6$ |
| 16 | Ba Ca | 0.20 0.10 | 0.72 | 0.3 | 0.5 | 3300 | 0.88 | −7 | −12 | −1.7 | 1.32 | 14.0 | $1 \times 10^6$ |
| 17 | Ba Sr | 0.20 0.17 | 0.70 | 0.5 | 0.5 | 3500 | 0.81 | −7 | −14 | +5.1 | 1.12 | 14.5 | $1 \times 10^6$ |
| 18 | Ca | 0.20 | 0.72 | 0 | 0 | 1400 | 1.21 | −8 | −16 | +9.3 | 1.31 | 10.0 | $2 \times 10^3$ |
| 19 | Ca | 0.20 | 0.72 | 2.0 | 1.5 | 1050 | 2.52 | −12 | −22 | +8.5 | 3.31 | 8.0 | $5 \times 10^5$ |
| 20 | Sr | 0.32 | 0.68 | 0 | 0 | 2000 | 0.89 | −17 | −33 | +28.0 | 0.89 | 11.0 | $4 \times 10^3$ |
| 21 | Sr | 0.32 | 0.68 | 2.0 | 2.0 | 1600 | 2.11 | −20 | −39 | +26.7 | 3.12 | 9.0 | $7 \times 10^5$ |
| 22 | Ba | 0.33 | 0.75 | 0 | 0 | 4800 | 0.85 | −14 | −29 | −5.9 | 2.15 | 12.0 | $3 \times 10^3$ |
| 23 | Ba | 0.33 | 0.75 | 2.5 | 1.75 | 3200 | 2.03 | −18 | −35 | −8.9 | 3.01 | 10.0 | $1 \times 10^6$ |
| 24 | Ba Ca | 0.20 0.10 | 0.70 | 0 | 0 | 3600 | 0.98 | −15 | −29 | −1.5 | 1.51 | 11.0 | $3 \times 10^3$ |
| 25 | Ba Ca | 0.20 0.10 | 0.70 | 2.25 | 2.0 | 2550 | 2.31 | −21 | −34 | −6.1 | 3.29 | 9.0 | $9 \times 10^5$ |
| 26 | Ba Sr | 0.20 0.17 | 0.70 | 0 | 0 | 4000 | 0.88 | −11 | −20 | +3.1 | 1.43 | 11.0 | $5 \times 10^3$ |
| 27 | Ba Sr | 0.20 0.17 | 0.70 | 2.5 | 1.75 | 2750 | 2.20 | −17 | −26 | +2.8 | 3.18 | 9.0 | $8 \times 10^5$ |

In this table, the breakdown voltage was measured at an increasing rate of 200 V/sec by depositing silver by evaporation on both the surfaces of a disk-like sample obtained by forming the sintered product to have a thickness of 0.4 mm. The other electrical characteristics were measured by forming the sintered product to have a thickness of 1 mm and baking silver electrodes on both the surfaces of the resultant structure. The capacitance and the dielectric loss tank were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of −25° C. to 85° C. and over a temperature range of −55° C. to 125° C. with reference to a dielectric constant at 20° C. in the case of the temperature range of −25° C. to 85° C. and a dielectric constant at 25° C. in the case of the temperature range of −55° C. to 125° C. The dielectric constant and the DC bias voltage electric field dependence of the dielectric constant were obtained from capacitance and As clearly shown in TABLE 13, the obtained dielectric ceramic compositions had excellent temperature characteristic of dielectric constant. The compositions were also good in various electrical characteristics such as the DC bias voltage dependence of the dielectric constant, the AC bias voltage dependence of the dielectric loss, and the insulation resistance.

The dielectric constant can be improved by using Sr or Ba in place of Ca. In the case of Ba substitution, a composition with a particularly large dielectric constant can be obtained. When MnO and CuO as the addition components were added to the basic composition which was composite-substituted with Ca and Ba or Ca and Sr, there was a tendency that the dielectric constant increased and the temperature coefficient satisfied the B characteristic of EIAJ specification and the X7R specification in comparison with the single use of Ca. In addition, the CR value also improved. When MnO and CuO as the addition components were added to the basic composition composite substituted with Ca and Sr, the temperature coefficient improved to satisfy the X7R specification although the dielectric constant tended to decrease as compared with the case wherein Ba was used singly.

EXAMPLE 21

Glass components were added to a dielectric ceramic composition having the same composition as sample No. 2 in Example 20, thus forming disk-like samples following the same procedures as in Example 20. Thereafter, these disk-like samples were sintered to form sample Nos. 28 to 32. The five types of compositions listed in TABLE 2 above were added as the glass components. The electrical characteristics of these sintered products were measured following the same procedures as in Example 20. The results are shown in TABLE 14 below.

TABLE 14

| Sample No. | Glass Type | Addition amount (ppm) | Dielectric constant K 25° C. | Dielectric loss DF (%) | voltage Maximum T.C.C. (%) −25° C. to 85° C. | −55° C. to 125° C. | DC bias coltage dependence (%) of dielectric constant | AC bias dependence (%) of dielectric loss | Failure rate Breakdown voltage (KV/mm) | (%) of humidity load life test |
|---|---|---|---|---|---|---|---|---|---|---|
| 28 | 1 | 500 | 1300 | 0.88 | −7 | −12 | +9.0 | 0.88 | 55 | 1 |
| 29 | 2 | 500 | 1300 | 0.88 | −7 | −12 | +9.0 | 0.88 | 55 | 0 |
| 30 | 3 | 500 | 1300 | 0.88 | −7 | −12 | +9.0 | 0.88 | 55 | 0 |
| 31 | 4 | 500 | 1300 | 0.88 | −7 | −12 | +9.0 | 0.88 | 55 | 1 |
| 32 | 5 | 500 | 1300 | 0.88 | −7 | −12 | +9.0 | 0.88 | 55 | 1 |

As clearly shown in TABLE 14, regardless of the types of glass components added, the sintering temperature could be decreased by 50° C. to 100° C. with almost no changes in the characteristics. In addition, the other various characteristics were also good.

EXAMPLE 22

An MLC was fabricated following the procedures described below by using a dielectric ceramic composition having the same composition as sample No. 3 prepared in Example 20.

First, 0.3 wt % of the glass components of sample No. 5 shown in TABLE 2 was added to a calcined powder. Subsequently, an organic solvent and a binder were added, and a 35 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the stacked sheet structure was cut into a predetermined shape, and the binder was burned out therefrom at 500° C. The resultant material was sintered at 1,050° C., and a silver paste as outer electrodes was baked at 800° C., thus completing an MLC. The outer dimensions of the obtained device were 4.5×3.2 mm, its single dielectric layer thickness after the sintering was about 25 μm, and its capacitance was 11 nF.

In the obtained MLC, the temperature coefficient of the capacitance was within a range of ±10% over the range of −25° C. to 85° C., i.e., satisfied the B characteristic of the EIAJ specifications, and was within a range of ±15% over the range of −55° C. to 125° C., i.e., satisfied the X7R of the EIA specifications. When a bias voltage of 10 V was applied, the rate of change in capacitance was 13.1%. In addition, the dielectric loss was 0.85%, and the average value of the breakdown voltage was 1,000 V.

Figure 13:
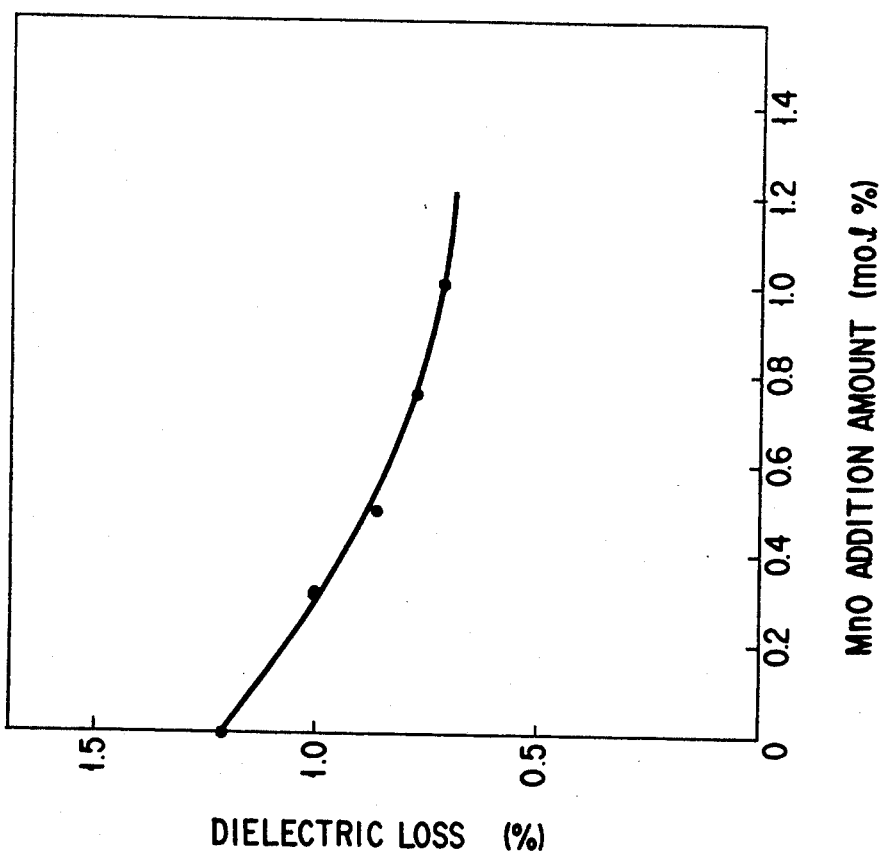
FIG. 13 is a graph showing the relationship between the dielectric loss and the addition amount of MnO in a dielectric ceramic composition prepared in each of Examples 20 to 22 of the present invention.

FIG. 13 shows the dielectric loss of the dielectric ceramic composition prepared in each of Examples 20 to 22 as a function of the MnO addition amount. It is clear from FIG. 13 that the addition of a proper amount of MnO decreases the dielectric loss.

Figure 14:
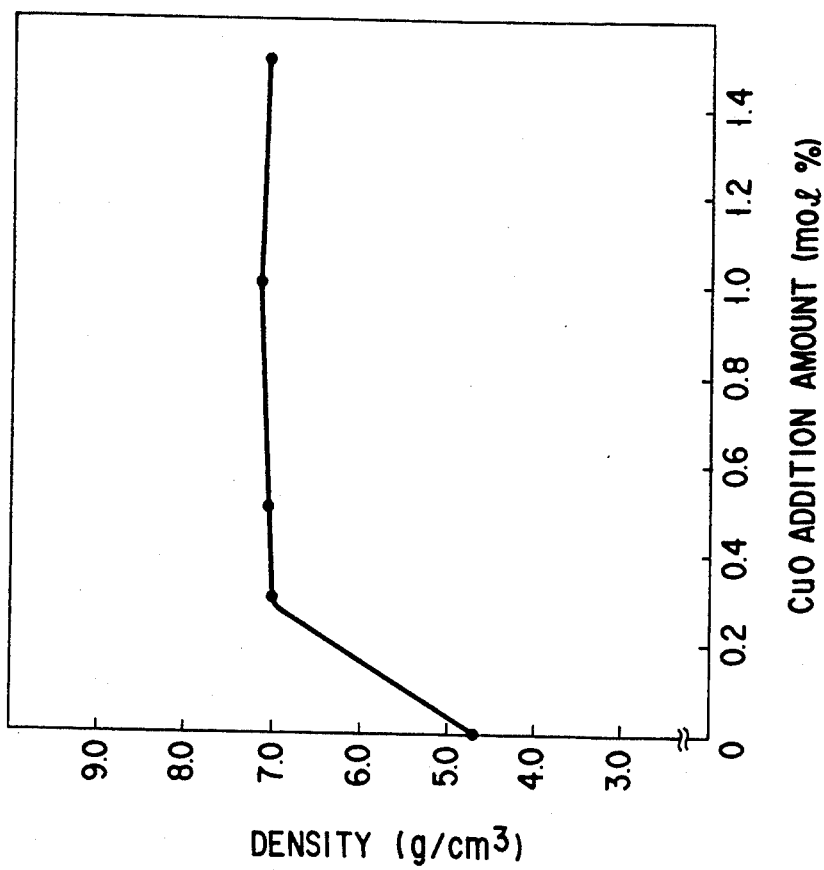
FIG. 14 is a graph showing the relationship between the sintering density and the addition amount of CuO in the dielectric ceramic composition prepared in each of Examples 20 to 22 of the present invention.

FIG. 14 shows the sintering density changing with the sintering temperature of the dielectric ceramic composition formed in each of Examples 20 to 22 as a function of the CuO addition amount. As is apparent from FIG. 14, the addition of a proper amount of CuO makes it possible to perform sintering at a low temperature.

Figure 15:
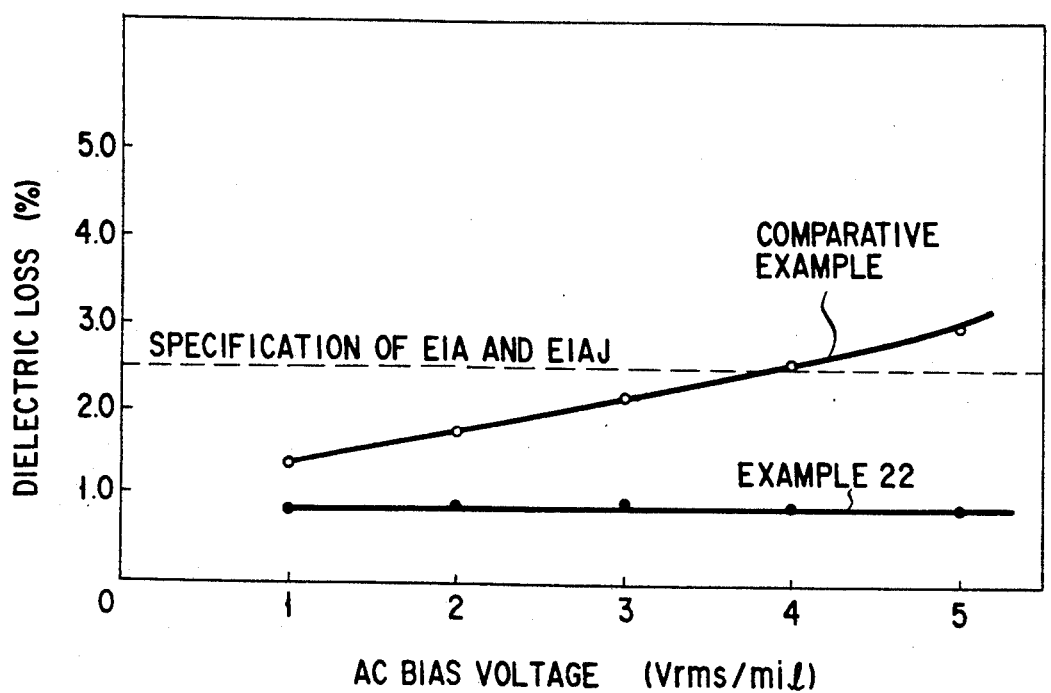
FIG. 15 is a graph showing the AC bias voltage dependence of an MLC fabricated in Example 22 of the present invention together with the AC bias voltage dependence of a commercially available MLC with X7R specification using a $BaTiO_3$-based dielectric as a comparative example.

FIG. 15 shows the AC bias voltage dependence of the dielectric loss of the MLC fabricated in Example 22. FIG. 15 also shows, as a comparative example, the AC bias voltage dependence of a commercially available X7R specification MLC using a BaTiO$_3$-based material.

As clearly shown in FIG. 15, the dielectric loss of the MLC of the present invention was about 0.9% even when 5 Vrms was applied per 1 mil, i.e., per 25.4 μm of the thickness of the dielectric layer (5 Vrms/mil). In the comparative example, however, the dielectric loss exceeded 2.5%, which is the spec of EIA and EIAJ, upon application of 4 Vrms/mil. This indicates that the MLC of the present invention was by far superior to the MLC using the BaTiO$_3$-based dielectric.

The dielectric ceramic composition used in this example, therefore, is effective in, for example, fabricating a capacitor or a stacked ceramic capacitor, which consists of dielectric layers each with a thickness of a few micrometers or less, by using a technique such as a sol-gel technique. In addition, this dielectric ceramic composition can be applied to a high-dielectric constant film for a capacitor of a semiconductor memory, which has been recently examined as a substitute for SiO$_2$.

EXAMPLE 23

Oxides and the like of, e.g., Pb, Ca, Sr, Ba, Zr, Ti, and Ag as the starting materials were blended so as to obtain composition ratios shown in TABLE 15 below, mixed by, e.g., a ball mill, and calcined at 900° C. After the resultant calcined products were milled and mixed, an organic solvent and polyvinyl alcohol as a binder were added, and a 16 μm thick green sheet was formed from the resultant slurry by using a doctor blade type caster. A predetermined pattern was printed on the green sheet by using an electrode paste consisting of 45Ag/55Pd, and 10 such sheets each having this electrode pattern were stacked under pressure. The resultant stacked structure was cut into a predetermined shape, and the binder was burned out therefrom. Thereafter, the obtained material was sintered at 1,200° C., and an Ag paste as outer electrodes was baked at 800° C., thus fabricating an MLC with outer dimensions of 4.5×3.2 mm and a single dielectric layer thickness after the sintering of about 10 μm. The thickness of the dielectric layer was measured from an SEM photograph showing a section of the MLC. Note that in the table, (A)/(B) represents the ratio of the total number of moles of Pb, Ca, Sr, and Ba to the total number of moles of Zr and Ti.

Measurements of various characteristics were performed following the procedures described below for MLCs (sample Nos. 1 to 16) having dielectric ceramic compositions containing Ag in an amount of 5,000 ppm or less as an amount of $Ag_2O$ and MLCs (sample Nos. 17 to 24) containing Ag in an amount exceeding 5,000 ppm or not containing Ag at all as comparative examples.

The capacitance and the dielectric loss tank were measured under the conditions of 1 kHz and 1 Vrms by using a digital LCR meter. The dielectric constant K was calculated from these values and the outer dimensions. The temperature coefficient T.C.C. of dielectric constant is represented by the maximum value of a change width over a temperature range of −25° C. to 85° C. with reference to a dielectric constant at 20° C. The humidity load resistance characteristic was checked by the percentage of rejects obtained after a humidity load life test was performed for 100 MLCs by applying a DC voltage of 16 V at a constant temperature of 85° C. and a constant humidity of 95% RH for 500 hours. The breakdown voltage was measured at an increasing rate of 50 V/sec and is represented by the average value of 20 MLCs. The DC bias voltage dependence of the dielectric constant is represented by the rate of change in capacitance measured upon application of a voltage of up to 20 V by a DC bias voltage. The AC bias voltage dependence of the dielectric loss is represented by the value of a dielectric loss obtained when AC 2 V was applied. The measurement results are listed in TABLE 15 below.

TABLE 15

| Sample No. | Substituent element | x (mol) | y (mol) | $Ag_2O$ addition amount (ppm) | (A)/(B) | Dielectric constant K 25° C. | Dielectric loss DF (%) |
|---|---|---|---|---|---|---|---|
| 1 | Ca | 0.21 | 0.70 | 100 | 0.98 | 1460 | 1.09 |
| 2 | Ca | 0.21 | 0.70 | 500 | 0.98 | 1500 | 1.05 |
| 3 | Ca | 0.21 | 0.70 | 2000 | 0.98 | 1550 | 1.01 |
| 4 | Ca | 0.21 | 0.70 | 5000 | 0.98 | 1420 | 0.97 |
| 5 | Sr | 0.28 | 0.75 | 100 | 0.95 | 1890 | 0.82 |
| 6 | Sr | 0.28 | 0.75 | 500 | 0.95 | 1960 | 0.78 |
| 7 | Sr | 0.28 | 0.75 | 2000 | 0.95 | 2020 | 0.75 |
| 8 | Sr | 0.28 | 0.75 | 5000 | 0.95 | 1880 | 0.71 |
| 9 | Ba | 0.58 | 0.32 | 100 | 0.90 | 4700 | 0.81 |
| 10 | Ba | 0.58 | 0.32 | 500 | 0.90 | 4770 | 0.77 |
| 11 | Ba | 0.58 | 0.32 | 2000 | 0.90 | 4850 | 0.73 |
| 12 | Ba | 0.58 | 0.32 | 5000 | 0.90 | 4660 | 0.70 |
| 13 | Ca | 0.23 | 0.68 | 100 | 1.00 | 1490 | 1.08 |
| 14 | Ca | 0.23 | 0.68 | 500 | 1.00 | 1550 | 1.03 |
| 15 | Ca | 0.23 | 0.68 | 2000 | 1.00 | 1580 | 1.00 |
| 16 | Ca | 0.23 | 0.68 | 5000 | 1.00 | 1430 | 0.97 |
| 17 | Ca | 0.21 | 0.70 | 0 | 0.98 | 1400 | 1.10 |
| 18 | Ca | 0.21 | 0.70 | 10000 | 0.98 | 1200 | 1.31 |
| 19 | Sr | 0.28 | 0.75 | 0 | 0.95 | 1850 | 0.83 |
| 20 | Sr | 0.28 | 0.75 | 10000 | 0.95 | 1700 | 1.21 |
| 21 | Ba | 0.58 | 0.32 | 0 | 0.90 | 4600 | 0.80 |
| 22 | Ba | 0.58 | 0.32 | 10000 | 0.90 | 4400 | 1.39 |
| 23 | Ca | 0.23 | 0.68 | 0 | 1.00 | 1420 | 1. |
| 24 | Ca | 0.23 | 0.68 | 10000 | 1.00 | 1210 | 1.32 |

| Sample No. | Maximum T.C.C. (%) −25° C. to 85° C. | DC bias voltage dependence (%) of dielectric constant | AC bias voltage dependence (%) of dielectric loss | Breakdown voltage (KV/mm) | Failure rate (%) of humidity load life test |
|---|---|---|---|---|---|
| 1 | −6 | +9.2 | 0.92 | 46 | 5 |
| 2 | −6 | +9.2 | 0.92 | 50 | 1 |
| 3 | −6 | +9.2 | 0.92 | 50 | 1 |
| 4 | −5 | +9.2 | 1.15 | 45 | 2 |
| 5 | −13 | +31.5 | 0.90 | 43 | 3 |
| 6 | −13 | +31.5 | 0.90 | 45 | 0 |
| 7 | −13 | +31.5 | 0.90 | 45 | 0 |
| 8 | −12 | +31.5 | 1.13 | 41 | 2 |
| 9 | −18 | −6.3 | 2.30 | 45 | 2 |
| 10 | −18 | −6.3 | 2.30 | 47 | 0 |
| 11 | −18 | −6.3 | 2.30 | 47 | 0 |
| 12 | −16 | −6.3 | 2.40 | 43 | 3 |
| 13 | −6 | +9.0 | 0.93 | 45 | 8 |
| 14 | −6 | +9.0 | 0.93 | 48 | 1 |
| 15 | −6 | +9.0 | 0.93 | 48 | 1 |
| 16 | −5 | +9.0 | 1.18 | 44 | 5 |
| 17 | −7 | +9.2 | 0.92 | 41 | 12 |
| 18 | −4 | +7.1 | 2.7 | 33 | 19 |
| 19 | −13 | +31.5 | 0.90 | 38 | 11 |
| 20 | −11 | +20.1 | 2.6 | 31 | 20 |
| 21 | −18 | −6.3 | 2.30 | 40 | 11 |
| 22 | −12 | −8.9 | 3.8 | 32 | 21 |
| 23 | −7 | +9.0 | 0.93 | 40 | 3 |
| 24 | −4 | +6.8 | 2.9 | 31 | 23 |

As clearly shown in TABLE 15, the MLC having a dielectric ceramic composition containing Ag in an amount of 5,000 ppm or less as an amount of $Ag_2O$ had excellent temperature coefficient with a small T.C.C and was also good in various electrical characteristics such as the dielectric loss. In addition, as can be seen by comparison with the MLCs of the comparative examples, the breakdown voltage and the humidity load resistance characteristic of this MLC notably improved by the addition of a proper amount of Ag.

EXAMPLE 24

Glass components were added to dielectric materials having compositions shown in TABLE 16 to fabricate MLCs as sample Nos. 25 to 29 following the same procedures as in Example 23. In this fabrication, 70Ag/30Pd was used as the material of inner electrodes, the five types of samples shown in TABLE 2 were added as the glass components at mixing ratios listed in TABLE 16, and sintering was performed at 1,075° C. for two hours. The characteristics of these MLCs were measured following the same procedures as in Example 23. The results are shown in TABLE 16.

TABLE 16

| Sample No. | Substituent element | x (mol) | y (mol) | $Ag_2O$ addition content (ppm) | (A)/(B) | Glass type | Glass addition amount (ppm) | Dielectric constant K 25° C. |
|---|---|---|---|---|---|---|---|---|
| 25 | Ca | 0.21 | 0.70 | 500 | 0.98 | 1 | 1000 | 1450 |
| 26 | Ca | 0.21 | 0.70 | 500 | 0.98 | 2 | 1000 | 1450 |
| 27 | Ca | 0.21 | 0.70 | 500 | 0.98 | 3 | 1000 | 1450 |
| 28 | Ca | 0.21 | 0.70 | 500 | 0.98 | 4 | 1000 | 1450 |
| 29 | Ca | 0.21 | 0.70 | 500 | 0.98 | 5 | 1000 | 1450 |

| Sample No. | Dielectric loss DF (%) | Maximum T.C.C. (%) −25° C. to 85° C. | DC bias voltage dependence (%) of dielectric constant | AC bias voltage dependence (%) of dielectric loss | Breakdown voltage (KV/mm) | Failure rate (%) of humidity load life test |
|---|---|---|---|---|---|---|
| 25 | 1.09 | −6 | 8.8 | 1.01 | 53 | 1 |
| 26 | 1.09 | −6 | 8.8 | 1.01 | 53 | 0 |
| 27 | 1.09 | −6 | 8.8 | 1.01 | 53 | 0 |
| 28 | 1.09 | −6 | 8.8 | 1.01 | 53 | 1 |
| 29 | 1.09 | −6 | 8.8 | 1.01 | 53 | 1 |

As is apparent from TABLE 16, the characteristics of the obtained MLCs were as good as Example 23, and low sintering temperatures were realized without deteriorating the characteristics regardless of the types of glass components added.

EXAMPLE 25

A fine powder containing Pb, Ba, Zr, Ti, and Ag at the same composition ratio as sample No. 11 in Example 23 was synthesized by the hydrothermal synthesis and used as the starting material to fabricate an MLC. Note that 80Ag/20Pd was used as the material of inner electrodes and sintering was performed with a heating rate of 300° C./hour at 1,000° C. for four hours. The characteristics of the obtained MLC were measured following the same procedures as in Example 23. As a result, the failure rate obtained by a humidity load life test was 1%, indicating high reliability of the MLC, and the breakdown voltage improved to 35 kV/mm. In addition, the other characteristics were much the same as those of sample No. 11 of Example 23. That is, using the fine powder synthesized by the hydrothermal synthesis as the starting material made it possible to improve the breakdown voltage and decrease the sintering temperature.

EXAMPLE 26

Oxides or carbonates of, e.g., Pb, Ca, Sr, Ba, Zr, Ti, and Si as the starting materials were blended so as to obtain composition ratios shown in TABLE 17 below, mixed by, e.g., a ball mill, and calcined at 900° C. After the resultant calcined products were milled and mixed, polyvinyl alcohol as a binder was added and the mixture was granulated. The resultant grains were molded to form disks each having a diameter of 17 mm and a thickness of about 2 mm. After the binder was burned out from the disks, the disks were sintered in the air at 1,200° C. to 1,250° C., thereby obtaining dielectric ceramic compositions having the compositions listed in TABLE 17 as sample Nos. 1 to 21. Note that sample Nos. 16 to 21 are comparative examples in which addition amounts of $SiO_2O$ fall outside the range of the present invention.

A straight line with a given length was drawn on an SEM photograph showing a surface of each of the obtained dielectric ceramic compositions, and the length of the line was divided by the number of grain boundaries crossed by the line. The obtained value was multiplied by 1.5 to obtain the average grain size of the dielectric ceramic composition. Subsequently, the characteristics of these dielectric ceramic compositions were measured by the following method.

That is, the breakdown voltage was measured at an increasing rate of 200 V/sec by depositing silver by evaporation on both the surfaces of a disk-like sample obtained by forming the sintered product to have a thickness of 0.4 mm. The other electrical characteristics were measured by forming the sintered product to have a thickness of 1 mm and baking silver electrodes on both the surfaces of the resultant structure. The capacitance and the dielectric loss tanδ were measured under the conditions of 1 kHz and 1 Vrms by using a digital LCR meter. The dielectric constant K was calculated from these values and the outer dimensions. The temperature coefficient T.C.C. of dielectric constant is represented by the maximum value of a change width over a temperature range of −25° C. to 85° C. with reference to a dielectric constant at 20° C.

The DC bias voltage dependence of the dielectric constant is represented by the rate of change in capacitance measured upon application of a voltage of up to 200 V by a DC bias voltage by using a 0.1 mm thick sample. The AC bias voltage dependence of the dielectric loss is represented by the value of a dielectric loss obtained when AC 10 V was applied to the same sample. The results are shown in TABLE 17.

TABLE 17

| Sample No. | Substituent element | x (mol) | y (mol) | SiO2 addition amount (ppm) | Average grain size (μm) | Dielectric constant K 25° C. | Dielectric loss DF (%) | Maximum T.C.C. (%) −25° C. to 85° C. | DC bias voltage dependence (%) of dielectric constant | AC bias voltage dependence (%) of dielectric loss | Breakdown voltage (KV/mm) |
|---|---|---|---|---|---|---|---|---|---|---|---|
| 1 | Ca | 0.20 | 0.72 | 100 | 2.7 | 1400 | 1.24 | −8 | +9.1 | 0.93 | 11.0 |
| 2 | Ca | 0.20 | 0.72 | 500 | 2.0 | 1390 | 1.25 | −8 | +9.0 | 0.94 | 12.0 |
| 3 | Ca | 0.20 | 0.72 | 2000 | 1.5 | 1380 | 1.27 | −8 | +9.2 | 0.93 | 13.0 |
| 4 | Ca | 0.20 | 0.72 | 5000 | 1.3 | 1380 | 1.31 | −9 | +9.1 | 0.92 | 14.0 |
| 5 | Ca | 0.20 | 0.72 | 10000 | 1.2 | 1300 | 1.39 | −9 | +8.9 | 0.91 | 15.0 |
| 6 | Sr | 0.32 | 0.68 | 100 | 2.4 | 2000 | 0.90 | −17 | +29.0 | 0.90 | 12.0 |
| 7 | Sr | 0.32 | 0.68 | 500 | 1.8 | 2000 | 0.91 | −17 | +29.5 | 0.89 | 13.0 |
| 8 | Sr | 0.32 | 0.68 | 2000 | 1.6 | 1900 | 0.96 | −17 | +28.5 | 0.91 | 14.0 |
| 9 | Sr | 0.32 | 0.68 | 5000 | 1.3 | 1900 | 1.01 | −18 | +30.0 | 0.88 | 15.0 |
| 10 | Sr | 0.32 | 0.68 | 10000 | 1.2 | 1850 | 1.10 | −18 | +29.0 | 0.92 | 15.5 |
| 11 | Ba | 0.35 | 0.72 | 100 | 2.4 | 4500 | 0.85 | −13 | −6.5 | 2.20 | 13.0 |
| 12 | Ba | 0.35 | 0.72 | 500 | 1.8 | 4500 | 0.88 | −13 | −6.9 | 2.18 | 14.0 |
| 13 | Ba | 0.35 | 0.72 | 2000 | 1.5 | 4400 | 0.91 | −13 | −6.1 | 2.17 | 14.5 |
| 14 | Ba | 0.35 | 0.72 | 5000 | 1.3 | 4400 | 0.95 | −14 | −6.3 | 2.21 | 15.0 |
| 15 | Ba | 0.35 | 0.72 | 10000 | 1.2 | 4350 | 1.01 | −14 | −7.0 | 2.23 | 15.5 |
| 16 | Ca | 0.20 | 0.72 | 0 | 3.8 | 1400 | 1.23 | −8 | +9.0 | 0.93 | 10.0 |
| 17 | Ca | 0.20 | 0.72 | 20000 | 0.9 | 1100 | 1.87 | −10 | −15.0 | 3.5 | 11.0 |
| 18 | Sr | 0.32 | 0.68 | 0 | 3.2 | 2000 | 0.89 | −17 | +29.5 | 0.91 | 11.0 |
| 19 | Sr | 0.32 | 0.68 | 20000 | 0.8 | 1650 | 1.31 | −20 | −16.0 | 3.7 | 12.5 |
| 20 | Ba | 0.35 | 0.72 | 0 | 3.1 | 4500 | 0.83 | −13 | −6.1 | 2.21 | 12.0 |
| 21 | Ba | 0.35 | 0.72 | 20000 | 0.8 | 3950 | 1.29 | −16 | −27.0 | 4.1 | 12.0 |

As clearly shown in TABLE 17, the obtained dielectric ceramic composition had excellent temperature characteristic with a small T.C.C. and was also good in various electrical characteristics such as the dielectric loss. In addition, it was confirmed that the breakdown voltage was considerably improved by further adding a predetermined amount of Si.

EXAMPLE 27

A fine powder containing Pb, Ca, Sr, Ba, Zr, Ti, and Si at a desired composition ratio and synthesized by a hydrothermal synthesis was used as the starting material to form dielectric ceramic compositions having the same compositions as sample Nos. 3, 8, and 13 of Example 26 following the same procedures as in Example 26. Note that the compositions were sintered with a heating rate of 300° C./hour at 1,000° C. for four hours. The average grain size and the characteristics of each of the obtained dielectric ceramic compositions were measured following the same procedures as in Example 26. The results are shown in TABLE 18 below.

EXAMPLE 28

An MLC was fabricated as follows by using a dielectric material having the same composition as sample No. 13 of Example 26.

First, an organic solvent and a binder were added to a calcined powder of the dielectric material prepared following the same procedures as sample 13 in Example 26, and a 38 μm thick green sheet was formed from the resultant slurry by using a doctor blade type caster. A predetermined pattern was printed on the green sheet by using an electrode paste of 45Ag/55Pd, and six such sheets each having this electrode pattern were stacked under pressure. Subsequently, the resultant sheet structure was cut into a predetermined shape, and the binder was burned out therefrom. The resultant material was sintered at 1,200° C., and an Ag paste as outer electrodes was baked at 800° C. The outer dimensions of the resultant MLC were 4.5×3.2 mm, and it single dielectric layer thickness after the sintering was about 24 μm. Note that the thickness of the dielectric layer was measured from an SEM photograph showing a section of the MLC.

TABLE 18

| Sample No. | Substituent element | x (mol) | y (mol) | SiO2 addition amount (ppm) | Average grain size (μm) | Dielectric constant K 25° C. | Dielectric loss DF (%) | Maximum T.C.C. (%) −25° C. to 85° C. | DC bias voltage dependence (%) of dielectric constant | AC bias voltage dependence (%) of dielectric loss | Breakdown voltage (KV/mm) |
|---|---|---|---|---|---|---|---|---|---|---|---|
| 22 | Ca | 0.20 | 0.72 | 2000 | 0.9 | 1300 | 1.32 | −8 | +9.1 | 0.91 | 16.0 |
| 23 | Sr | 0.32 | 0.68 | 2000 | 0.9 | 1800 | 1.00 | −17 | +30.0 | 0.90 | 16.5 |
| 24 | Ba | 0.35 | 0.72 | 2000 | 0.9 | 4150 | 1.01 | −13 | −6.3 | 2.20 | 16.5 |

As shown in TABLE 18, the use of the fine powder synthesized by the hydrothermal synthesis as the starting material made it possible to further decrease the grain size of the dielectric ceramic composition and increase the breakdown voltage. In addition, the sintering temperature could be decreased without deteriorating the other characteristics.

In the obtained MLC, the capacitance was 32 nF, and the temperature coefficient of the capacitance was within a range of ±13% over the range of −25° C. to 85° C., i.e., satisfied the C characteristic of the EIAJ specifications. When a DC bias voltage voltage of 50 V was applied, the rate of change in capacitance was −7%. The dielectric loss was 1.07%, and the breakdown voltage was 550 V. That is, this MLC was good in all of the electrical characteristics.

EXAMPLE 29

Oxides or carbonates of, e.g., Pb, Ca, Zr, Ti, Ta, and Nb as the starting materials were blended so as to obtain various composition ratios shown in TABLE 19 below, mixed by, e.g., a ball mill, and calcined at 900° C. After the resultant calcined products were milled by, e.g., a ball mill, and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,200° C. to 1,250° C., thereby obtaining sample Nos. 1 to 9.

Each of the obtained samples was formed to have a thickness of 1 mm, silver electrodes were baked on both the surfaces of the structure, and the electrical characteristics of the sintered product were measured. The results are listed in TABLE 19. As comparative examples, dielectric ceramic compositions not containing Ta as an additive and dielectric ceramic compositions containing $Ta_2O_5$ in an amount exceeding 10 mol % were formed following the same procedures as described above (reference sample Nos. 1 to 4), and their electrical characteristics were measured. The results are also shown in TABLE 19.

In TABLE 19, the capacitance and the dielectric loss tan$\delta$ were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of $-25°$ C. to 85° C. and over a temperature range of $-55°$ C. to 125° C. with reference to a dielectric constant at 20° C. in the case of the temperature range of $-25°$ C. to 85° C. and a dielectric constant at 25° C. in the case of the temperature range of $-55°$ C. to 125° C.

As shown in TABLE 19, the dielectric ceramic composition containing a predetermined amount of Ta had an excellent temperature coefficient of dielectric constant and a largely improved insulation resistance. The composition was also good in various electrical characteristics.

It is also clear from the above table that the dielectric constant is further improved by using Sr or Ba in place of Ca. When Pb was partially composite-substituted with Ca and Ba or Ca and Sr, there was a tendency that the dielectric constant increased and the temperature coefficient satisfied the X7R specification of EIA as compared with the case wherein substitution was performed with Ca alone. In addition, it was possible to improve the CR value and the AR at 25° C. When composite substitution was performed using Ba and Sr, the temperature coefficient improved to satisfy the X7R specification although the dielectric constant tended to decrease in comparison with the case of Ba single substitution.

It can be seen by comparison with the characteristics of the reference samples that the dielectric ceramic compositions containing a predetermined amount of Ta has a high insulation resistance especially at a high temperature and a high dielectric constant.

TABLE 19

| Sample No. | Ae | x (mol) | y (mol) | Additive | Addition amount (mol %) | Dielectric loss DF 25° C. (%) | Dielectric constant K 25° C. | Insulation resistance (MΩ) 25° C. | Insulation resistance (MΩ) 125° C. | Temperature coefficient of dielectric constant $-25°$ C. to 85° C. | Temperature coefficient of dielectric constant $-55°$ C. to 25° C. |
|---|---|---|---|---|---|---|---|---|---|---|---|
| 1 | Ca | 0.25 | 0.3 | $Ta_2O_5$ | 1 | 0.82 | 1100 | $3 \times 10^7$ | $2 \times 10^4$ | $-14$ | $-22$ |
| 2 | Ca | 0.25 | 0.3 | $Ta_2O_5$ | 2 | 1.60 | 1210 | $2 \times 10^7$ | $7 \times 10^5$ | $-8$ | $-15$ |
| 3 | Ca | 0.25 | 0.3 | $Ta_2O_5$ | 3 | 1.62 | 1350 | $2 \times 10^7$ | $3 \times 10^6$ | $-8$ | $-18$ |
| 4 | Ca | 0.25 | 0.3 | $Ta_2O_5$ | 4 | 1.68 | 1450 | $1 \times 10^7$ | $2 \times 10^6$ | $-8$ | $-20$ |
| 5 | Ba | 0.60 | 0.25 | $Ta_2O_5$ | 2 | 0.26 | 2650 | $9 \times 10^6$ | $1 \times 10^6$ | $-10$ | $-18$ |
| 6 | Ba | 0.60 | 0.25 | $Ta_2O_5$ | 4 | 0.30 | 2800 | $2 \times 10^7$ | $2 \times 10^6$ | $-12$ | $-19$ |
| 7 | Ba | 0.60 | 0.25 | $Ta_2O_5$ | 6 | 0.44 | 3100 | $3 \times 10^7$ | $3 \times 10^6$ | $-14$ | $-23$ |
| 8 | Ba | 0.60 | 0.25 | $Ta_2O_5$ | 8 | 0.52 | 3200 | $3 \times 10^7$ | $5 \times 10^6$ | $-18$ | $-26$ |
| 9 | Ba | 0.60 | 0.25 | $Ta_2O_5$ | 10 | 0.83 | 3300 | $2 \times 10^7$ | $4 \times 10^6$ | $-23$ | $-33$ |
| Reference 1 | Ca | 0.25 | 0.3 | | 0 | 0.34 | 1050 | $3 \times 10^6$ | $1 \times 10^3$ | $-14$ | $-23$ |
| Reference 2 | Ba | 0.60 | 0.25 | | 0 | 0.21 | 2500 | $7 \times 10^6$ | $7 \times 10^4$ | $-8$ | $-15$ |
| Reference 3 | Ba | 0.60 | 0.25 | $Ta_2O_5$ | 15 | 1.60 | 2600 | $1 \times 10^6$ | $1 \times 10^5$ | $-30$ | $-41$ |
| Reference 4 | Ba | 0.60 | 0.25 | $Ta_2O_5$ | 20 | 3.40 | 1900 | $9 \times 10^4$ | $8 \times 10^3$ | $-41$ | $-53$ |

EXAMPLE 30

Glass components were added to the dielectric ceramic composition of sample No. 2 prepared in Example 29, and disks were formed and sintered following the same procedures as in Example 29. The five types of compositions listed in TABLE 2 above were added as the glass components. The electrical characteristics of the obtained sintered products were measured following the same procedures as in Example 29. The results are shown in TABLE 20.

TABLE 20

| Sample No. | Dielectric loss 25° C. (%) | Dielectric constant K 25° C. | Maximum T.C.C (%) $-25°$ C. to 85° C. | Maximum T.C.C (%) $-55°$ C. to 125° C. | Insulation resistance (MΩ) 25° C. | Insulation resistance (MΩ) 125° C. | Glass Sample No. | Glass Addition amount (ppm) |
|---|---|---|---|---|---|---|---|---|
| 15 | 1.60 | 1230 | $-8$ | $-15$ | $2 \times 10^7$ | $7 \times 10^5$ | 1 | 1000 |
| 16 | 1.60 | 1230 | $-8$ | $-15$ | $2 \times 10^7$ | $7 \times 10^5$ | 2 | 1000 |
| 17 | 1.60 | 1230 | $-8$ | $-15$ | $2 \times 10^7$ | $7 \times 10^5$ | 3 | 1000 |
| 18 | 1.60 | 1230 | $-8$ | $-15$ | $2 \times 10^7$ | $7 \times 10^5$ | 4 | 1000 |
| 19 | 1.60 | 1230 | $-8$ | $-15$ | $2 \times 10^7$ | $7 \times 10^5$ | 5 | 1000 |

As clearly shown in TABLE 20, regardless of the types of glass components added, the sintering temperature could be decreased by 50° C. to 100° C. with almost no changes in the characteristics of the ceramic compositions.

EXAMPLE 31

An MLC was fabricated by using a dielectric ceramic composition having the same composition as sample No. 2 prepared in Example 29.

First, an organic solvent and a binder were added to a calcined powder, and a 38 μm thick green sheet was formed from the resultant slurry by using a doctor blade type caster. A predetermined pattern was printed on the green sheet by using an electrode paste of 55Ag/45Pd, and six such sheets each having this electrode pattern were stacked under pressure. Subsequently, the stacked sheet structure was cut into a predetermined shape, and the binder was burned out therefrom. The resultant material was sintered at 1,200° C., and a silver paste as outer electrodes was baked at 800° C., thus fabricating an MLC. The outer dimensions of this capacitor were 4.5×3.2 mm, its single dielectric layer thickness after the sintering was about 24 μm, and its capacitance was 9.5 nF.

In the obtained MLC, the temperature coefficient of the capacitance of the obtained capacitor was within a range of ±10% over the range of −25° C. to 85° C., i.e., satisfied the B characteristic of the EIAJ specifications, and was within a range of ±15% over the range of −55° C. to 125° C., i.e., satisfied the X7R of the EIA specifications.

EXAMPLE 32

A powder containing oxides or carbonates of, e.g., Pb, Ca, Zr, Ti, and Nb at desired composition ratios was heat-treated at 500° C. to 900° C. to obtain a powder having a desired specific surface area, and polyvinyl alcohol as a binder was added and the mixture was granulated. The resultant grains were molded to form disks each having a diameter of 17 mm and a thickness of about 2 mm. After the binder was removed from the disks, the disks were sintered in the air at 1,000° C. to 1,300° C., thereby forming six types of dielectric ceramic compositions. Note that in sintering at a low temperature, glass components were added to the powder heat-treated at 500° C. to 900° C.

Figure 16:
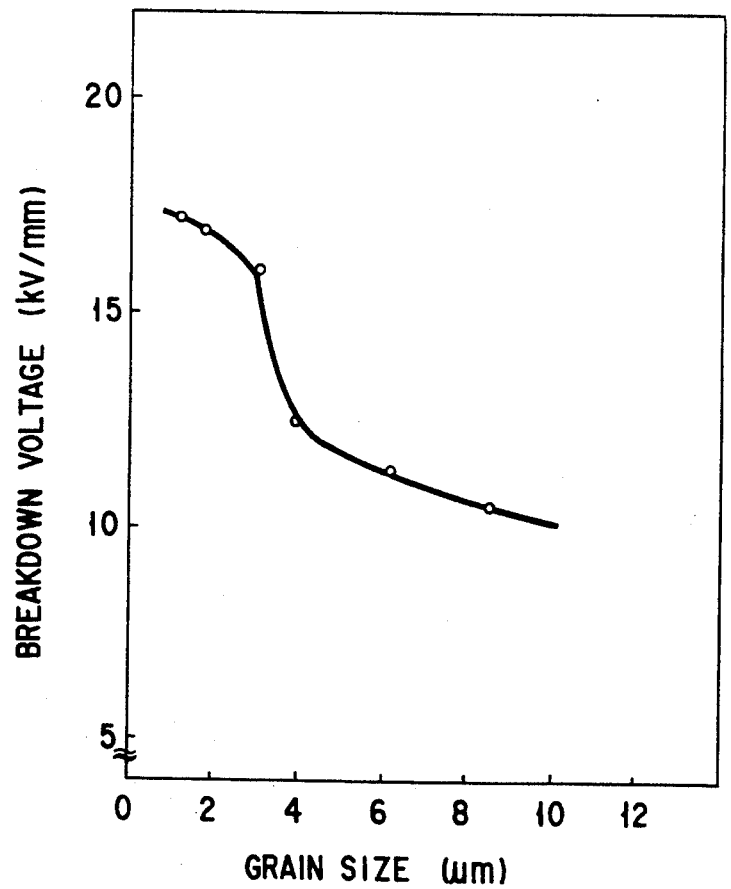
FIG. 16 is a graph showing the relationship between the breakdown voltage and the grain size in a dielectric ceramic composition of the present invention.

The grain size and the breakdown voltage of each dielectric ceramic composition were measured, and the measurement values were plotted, as shown in FIG. 16, to check the relationship between the grain size and the breakdown voltage. Note that the grain size was obtained by drawing a straight line with a given length on an SEM photograph, dividing the length of the line by the number of grain boundaries crossed by the line, and multiplying the quotient by 1.5. The breakdown voltage characteristic was measured at an increasing rate of 200 V/sec upon depositing silver by evaporation on both the surfaces of a disk-like sample obtained by forming the sintered product to have a thickness of 0.4 mm.

As is apparent from FIG. 16, the breakdown voltage could be improved by controlling the grain size of the dielectric ceramic composition after the sintering to 3 μm or less.

EXAMPLE 33

A powder obtained by a hydrothermal synthesis and having Pb, Ca, Zr, Ti, Nb, and Ta at composition ratios shown in TABLE 21 was added with polyvinyl alcohol as a binder and the mixture was granulated. The resultant grains were molded to form disks each having a diameter of 17 mm and a thickness of about 2 mm. After the binder was removed from the disks, the disks were sintered in the air at 1,000° C. to 1,200° C. while the heating rate was changed from 50° C./hour to 700° C./hour, thus obtaining sample Nos. 1 to 14 and reference sample Nos. 1 to 4.

After the sintering, the density was measured by an Archimedes method. In this measurement, the density of a sintered product with a low density was obtained by measuring the outer dimensions of the product.

The electrical characteristics of each sample were measured by forming the sintered product to have a thickness of 1 mm and baking silver electrodes on both the surfaces of the structure. The results are listed in TABLE 21.

TABLE 21

| Sample No. | Substituent element | x (mol) | y (mol) | Added element | Addition amount (mol) | Sintering temperature (°C.) | Heating rate (°C./hr) | Relative density (%) |
|---|---|---|---|---|---|---|---|---|
| 1 | Ca | 0.25 | 0.7 | Nb | 2 | 1000 | 110 | 98.0 |
| 2 | Ca | 0.25 | 0.7 | Nb | 2 | 1000 | 150 | 98.3 |
| 3 | Ca | 0.25 | 0.7 | Nb | 2 | 1000 | 200 | 98.9 |
| 4 | Ca | 0.25 | 0.7 | Nb | 2 | 1000 | 300 | 99.2 |
| 5 | Ca | 0.25 | 0.7 | Nb | 2 | 1000 | 600 | 98.5 |
| 6 | Ca | 0.25 | 0.7 | Ta | 2 | 1000 | 110 | 97.9 |
| 7 | Ca | 0.25 | 0.7 | Ta | 2 | 1000 | 150 | 98.3 |
| 8 | Ca | 0.25 | 0.7 | Ta | 2 | 1000 | 200 | 98.9 |
| 9 | Ca | 0.25 | 0.7 | Ta | 2 | 1000 | 300 | 99.1 |
| 10 | Ca | 0.25 | 0.7 | Ta | 2 | 1000 | 600 | 98.7 |
| 11 | Sr | 0.34 | 0.75 | Nb | 3 | 1000 | 150 | 99.0 |
| 12 | Sr | 0.34 | 0.75 | Ta | 3 | 1000 | 300 | 99.1 |
| 13 | Ba | 0.39 | 0.75 | Nb | 3 | 1000 | 150 | 99.0 |
| 14 | Ba | 0.39 | 0.75 | Ta | 3 | 1000 | 300 | 98.9 |
| Reference 1 | Ca | 0.25 | 0.7 | Nb | 2 | 1250 | 50 | 97.5 |
| Reference 2 | Ca | 0.25 | 0.7 | Nb | 2 | 1250 | 700 | 94.8 |
| Reference 3 | Ca | 0.25 | 0.7 | Ta | 2 | 1250 | 50 | 97.6 |
| Reference 4 | Ca | 0.25 | 0.7 | Ta | 2 | 1250 | 700 | 94.6 |

| Sample No. | Grain size (μm) | Dielectric constant K 25° C. | Dielectric loss DF 25° C. | Breakdown voltage (KV/mm) | Maximum T.C.C. (%) −25° C. to 85° C. |
|---|---|---|---|---|---|
| 1 | 1.1 | 1170 | 1.55 | 17.0 | −6 |
| 2 | 1.3 | 1200 | 1.54 | 17.5 | −6 |
| 3 | 1.4 | 1250 | 1.58 | 17.5 | −6 |
| 4 | 1.4 | 1230 | 1.56 | 17.5 | −6 |
| 5 | 1.2 | 1200 | 1.57 | 17.0 | −6 |

TABLE 21-continued

| | | | | | |
|---|---|---|---|---|---|
| 6 | 1.1 | 1180 | 1.56 | 17.0 | −6 |
| 7 | 1.2 | 1190 | 1.56 | 17.5 | −6 |
| 8 | 1.4 | 1220 | 1.58 | 17.5 | −6 |
| 9 | 1.4 | 1240 | 1.58 | 17.5 | −6 |
| 10 | 1.2 | 1200 | 1.57 | 17.0 | −6 |
| 11 | 1.3 | 1900 | 0.71 | 17.0 | −10 |
| 12 | 1.3 | 1900 | 0.70 | 17.5 | −10 |
| 13 | 1.3 | 3900 | 1.61 | 17.0 | −12 |
| 14 | 1.3 | 3900 | 1.60 | 17.0 | −12 |
| Reference 1 | 3.4 | 1280 | 1.58 | 13.5 | −6 |
| Reference 2 | 0.8 | 1130 | 1.61 | 11.5 | −6 |
| Reference 3 | 3.7 | 1250 | 1.57 | 13.0 | −6 |
| Reference 4 | 0.9 | 1110 | 1.63 | 11.5 | −6 |

The capacitance and the dielectric loss tank were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of −25° C. to 85° C. with reference to a dielectric constant at 20° C.

The dielectric constant and the DC bias voltage dependence of the dielectric constant were obtained from the rate of change in capacitance measured upon application of a voltage of up to 200 V by using a sample with a thickness of about 0.1 mm. The AC bias voltage dependence of the dielectric loss is represented by the rate of change of dielectric loss obtained when a voltage of 10 V was applied to the same sample.

As is apparent from TABLE 21, the sintering temperature could drastically decreased by sintering the dielectric having a perovskite structure synthesized by the hydrothermal synthesis and mainly consisting of lead at a heating rate of 110° C./hour to 600° C./hour. In addition, it was possible to bring the grain size of the dielectric ceramic composition to 3 μm or less.

EXAMPLE 34

A dielectric ceramic composition having the same composition as sample No. 3 of Example 33 except that glass components were further added to the composition was prepared following the same procedures as in Example 33, and measurements were similarly performed. The results are shown in TABLE 22. Note that the five types of the compositions shown in TABLE 2 were used as the glass components added.

TABLE 22

| Sample No. | Dielectric loss 25° C. (%) | Dielectric constant K 25° C. | Breakdown voltage (KV/mm) | Maximum T.C.C. (%) | Glass Sample No. | Glass Addition amount (ppm) |
|---|---|---|---|---|---|---|
| 15 | 1.58 | 1250 | 18.0 | −6 | 1 | 1000 |
| 16 | 1.58 | 1250 | 18.0 | −6 | 2 | 1000 |
| 17 | 1.58 | 1250 | 18.0 | −6 | 3 | 1000 |
| 18 | 1.58 | 1250 | 18.0 | −6 | 4 | 1000 |
| 19 | 1.58 | 1250 | 18.0 | −6 | 5 | 1000 |

As can be seen from TABLE 22, regardless of the types of glass components used, sintered products were obtained. In addition, the grain size of the dielectric layer was further decreased to about 1 μm upon addition of the glass components. Thus, as can be seen from TABLE 22, the breakdown voltage of the dielectric ceramic composition was improved, and the sintering temperature could be further decreased by 50° C. to 100° C. without changing the other characteristics of the dielectric ceramic composition.

EXAMPLE 35

An MLC was fabricated as follows by using a dielectric ceramic composition which was prepared from a powder obtained by the hydrothermal synthesis and had the same composition as sample No. 3 in Example 33.

First, an organic solvent and a binder were added to the hydrothermally synthesized powder heat-treated at 500° C. to 900° C., and a 38 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the stacked sheet structure was cut into a predetermined shape, and the binder was removed therefrom. The resultant material was sintered with a heating rate of 200° C./hour at 1,075° C. for two hours. After the sintering, a silver paste as outer electrodes was baked at 800° C., thus obtaining an MLC. The outer dimensions of the resultant MLC were 4.5×3.2 mm, its single dielectric layer thickness after the sintering was about 24 μm, and its capacitance was 11 nF. Note that the thickness of the dielectric layer was measured from an SEM photograph showing a section of the MLC.

The temperature coefficient of the capacitance of the obtained device was within a range of ±10% over the range of −25° C. to 85° C., i.e., satisfied the B characteristic of the EIAJ specifications. When a bias voltage of 50 V was applied, the rate of change in capacitance was +9.2%. The dielectric loss was 1.47%. In addition, the grain size of the dielectric layer was as small as 1.5 μm.

EXAMPLE 36

Oxides of, e.g., Pb, Ca, Pr, Zr, and Ti as the starting materials were blended so as to obtain composition ratios shown in TABLE 23 below, mixed by, e.g., a ball mill, and calcined at 900° C. After the resultant calcined products were milled by, e.g., a ball mill, and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,200° C. to 1,250° C., thereby obtaining sample Nos. 1 to 9. These samples were formed to have a thickness of 1 mm, silver electrodes were baked on both the surfaces of each of the sample structures, and their electrical characteristics were measured. The results are listed in TABLE 23 below.

The five types of compositions listed in TABLE 2 above were added as the glass components. The mea-

TABLE 23

| Sample No. | Substituent element and substitution amount x = x1 + x2 | | | | x (mol) | y (mol) | Dielectric constant K 25° C. | Dielectric loss DF 25° C. | Maximum T.C.C. (%) | | DC bias voltage dependence (%) of dielectric constant | AC bias voltage dependence (%) of dielectric loss |
|---|---|---|---|---|---|---|---|---|---|---|---|---|
| | Alkaline earth metal | x1 (mol) | Lanthanide element | x2 (mol) | | | | | −25 to 85° C. | −55 to 125° C. | | |
| 1 | Ca | 0.1 | La | 0.06 | 0.16 | 0.25 | 2700 | 0.85 | −10 | −14 | +9 | 1.05 |
| 2 | Ba | 0.2 | Pr | 0.11 | 0.31 | 0.25 | 3050 | 1.31 | −15 | −20 | −6 | 1.91 |
| 3 | Sr | 0.15 | La | 0.07 | 0.22 | 0.25 | 2800 | 0.81 | −10 | −15 | +19 | 1.05 |
| 4 | Ca | 0.15 | Pr | 0.10 | 0.25 | 0.45 | 2200 | 0.81 | −9 | −14 | +7 | 1.01 |
| 5 | Ba | 0.34 | La | 0.02 | 0.36 | 0.45 | 3500 | 0.93 | −15 | −19 | −5 | 1.39 |
| 6 | Sr | 0.40 | Pr | 0.03 | 0.43 | 0.45 | 2300 | 0.77 | −12 | −18 | +15 | 0.91 |
| 7 | Ca | 0.11 | La | 0.10 | 0.21 | 0.65 | 3000 | 1.15 | −9 | −14 | +8 | 1.31 |
| 8 | Ba | 0.45 | Pr | 0.003 | 0.48 | 0.65 | 3900 | 1.05 | −18 | −27 | −6 | 1.55 |
| 9 | Sr | 0.25 | La | 0.8 | 0.33 | 0.65 | 2900 | 0.98 | −8 | −14 | +17 | 1.15 |

In the above table, the capacitance and the dielectric surement results are listed in TABLE 24.

TABLE 24

| Sample No. | Dielectric loss 25° C. (%) | Dielectric constant K 25° C. | Maximum T.C.C. (%) | | DC bias voltage dependence of dielectric constant (%) | AC bias voltage dependence of dielectric loss (%) | Glass | |
|---|---|---|---|---|---|---|---|---|
| | | | −25° C. to 85° C. | −55° C. to 125° C. | | | Sample No. | Addition amount (ppm) |
| 10 | 1.31 | 3050 | −15 | −19 | −6 | 1.90 | 1 | 1000 |
| 11 | 1.31 | 3050 | −15 | −19 | −6 | 1.90 | 2 | 1000 |
| 12 | 1.31 | 3050 | −15 | −19 | −6 | 1.90 | 3 | 1000 |
| 13 | 1.31 | 3050 | −15 | −19 | −6 | 1.90 | 4 | 1000 |
| 14 | 1.31 | 3050 | −15 | −19 | −6 | 1.90 | 5 | 1000 | loss tanδ were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of −25° C. to 85° C. and over a temperature range of −55° C. to 125° C. with reference to a dielectric constant at 20° C. in the case of the temperature range of −25° C. to 85° C. and a dielectric constant at 25° C. in the case of the temperature range of −55° C. to 125° C. The dielectric constant and the DC bias voltage voltage dependence of the dielectric constant were obtained from the rates of changes in capacitance and dielectric loss measured upon application of a voltage of up to 200 V by a DC bias voltage by using a 0.1 mm thick sample. The AC bias voltage dependence of the dielectric loss was obtained from the rate of change measured when AC 10 V was applied to the same sample as used in the measurement of the dielectric constant.

As shown in TABLE 23, the dielectric ceramic composition used in the ceramic capacitor of the present invention had an excellent temperature coefficient of dielectric constant and also had a low bias voltage dependence of the dielectric constant and a low AC bias voltage dependence of the dielectric loss.

EXAMPLE 37

Glass components were added to the composition of sample No. 2 prepared in Example 36, and disks were formed following the same procedures as in Example 36. Thereafter, the electrical characteristics were measured following the same procedures as in Example 36.

As clearly shown in TABLE 24, regardless of the types of glass components added, the sintering temperature could be decreased by 50° C. to 100° C. while almost not changing but maintaining the good characteristics of the compositions.

EXAMPLE 38

An MLC was fabricated by the following procedures using a dielectric ceramic composition having the same composition as sample No. 1 prepared in Example 36.

First, an organic solvent and a binder were added to a calcined powder, and a 38 μm thick green sheet was formed from the resultant slurry by using a doctor blade type caster. A predetermined pattern was printed on the green sheet by using an electrode paste of 55Ag/45Pd, and six such sheets each having this electrode pattern were stacked under pressure. Subsequently, the stacked sheet structure was cut into a predetermined shape, and the binder was burned out therefrom. The resultant material was sintered at 1,200° C., and a silver paste as outer electrodes was baked at 800° C., thus fabricating an MLC. The outer dimensions of this MLC were 4.5×3.2 mm, its single dielectric layer thickness after the sintering was about 24 μm, and its capacitance was 21 nF.

The temperature coefficient of the capacitance of the obtained capacitor was within a range of ±10% over the range of −25° C. to 85° C., i.e., satisfied the B characteristics of the EIAJ specifications, and was within a range of ±15% over the range of −55° C. to 125° C., i.e., satisfied the X7R of the EIA specifications. When a bias voltage of 50 V was applied, the rate of change in capacitance was +8%. The dielectric loss was 1.05%.

EXAMPLE 39

A fine powder having a composition ratio of $(Pd_{0.86}Ca_{0.06}La_{0.08})(Zr_{0.7}Ti_{0.3})O_3$ synthesized by the hydrothermal synthesis was heat-treated at 800° C.

An organic solvent and a binder were added to this fine powder, and a 16 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the stacked sheet structure was cut into a predetermined shape, and the binder was removed therefrom. The resultant material was sintered with a heating rate of 200° C./hour at 1,075° C. for two hours. After the sintering, a silver paste as outer electrodes was baked at 800° C., thus fabricating an MLC. The outer dimensions of the MLC were 4.5×3.2 mm, and its single layer thickness after the sintering was 10 μm. Note that the thickness of the single layer was measured from an SEM photograph showing a section of the MLC.

In the obtained MLC, the average grain size of the dielectric ceramic composition was 1.5 μm. The capacitance of this MLC was 55 nF, and the temperature characteristic of the capacitance was within a range of ±10% over the range of −25° C. to 85° C., i.e., satisfied the C characteristic of the EIAJ specifications. When a bias voltage of 16 V was applied, the rate of change in capacitance was +8.6%, and the dielectric loss was 0.7%; i.e., both the electrical characteristics were good. In addition, the average breakdown voltage of 100 MLCs was 430 V, and the yield obtained after a humidity load life test (85° C., 95% RH, applied voltage 16 V) was performed 500 hours was 98%.

EXAMPLE 40

A fine powder having a composition ratio of $(Pb_{0.80}Ba_{0.12}La_{0.08})(Zr_{0.7}Ti_{0.3})O_3$ synthesized by the hydrothermal synthesis was heat-treated at 800° C., and the resultant heat-treated fine powder was used to fabricate an MLC following the same procedures as in Example 39.

The obtained MLC had a capacitance of 65 nF and satisfied the B characteristic of the EIAJ specifications. When a bias voltage voltage of 16 V was applied, the change in capacitance was +5%. The dielectric loss was 2.1%. The yield after a humidity load life test was 95%.

COMPARATIVE EXAMPLE 4

An MLC was fabricated following the same procedures as in Example 39 except that a fine powder having a composition ratio of $(Pb_{0.64}Ba_{0.36})(Zr_{0.7}Ti_{0.3})O_3$ was used. Although the characteristics of the resultant MLC were almost the same as those of the MLC fabricated in Example 39, its breakdown voltage was 380 V.

EXAMPLE 41

Oxides or carbonates of, e.g., Pb, Ca, Zr, Ti, Mg, Nb, W, Zn, and Ni as the starting materials were blended so as to obtain composition ratios shown in TABLE 25 below, mixed by, e.g., a ball mill, and calcined at 850° C. After the resultant calcined products were milled by, e.g., a ball mill, and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,000° C. to 1,500° C., thereby obtaining sample Nos. 1 to 11 and reference sample Nos. 1 and 2 having the compositions listed in TABLE 25.

The characteristics of these samples were measured by the following methods.

That is, the breakdown voltage characteristic was measured at an increasing rate of 200 V/sec upon depositing silver by evaporation on both the surfaces of a disk-like sample obtained by forming each sintered product to have a thickness of 0.4 mm. The other electrical characteristics were measured by forming the sintered product to have a thickness of 1 mm and baking silver electrodes on both the surfaces of the structure.

The capacitance and the dielectric loss tank were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of −25° C. to 85° C. with reference to a dielectric constant at 20° C. The product of the capacitance and resistance (CR value) was obtained from (capacitance at 1 kHz)×(insulation resistance) at 25° C. and 125° C.

The DC bias voltage dependence of the dielectric constant and the AC bias voltage dependence of the dielectric loss were obtained. The DC bias voltage dependence of the dielectric constant is represented by the rates of changes in capacitance and dielectric loss measured upon application of a voltage of up to 200 V by a DC bias voltage by using a 0.1 mm thick sample. The AC bias voltage dependence of the dielectric loss is represented by the rate of change obtained when AC 10 V was applied to the same sample. The results are listed in TABLE 25.

TABLE 25

| Sample No. | Substituent element Ae | x (mol) | y (mol) | Additive | Addition amount (mol) | Dielectric constant K 25° C. | Dielectric loss 25° C. (%) |
|---|---|---|---|---|---|---|---|
| 1 | Ba | 0.20 | 0.20 | $Pb(Mg_{1/3}Nb_{2/3})O_3$ | 19 | 7900 | 0.8 |
| 2 | Ba | 0.37 | 0.30 | $Pb(Mg_{1/3}Nb_{2/3})O_3$ | 2 | 6200 | 0.5 |
| 3 | Ba | 0.55 | 0.70 | $Pb(Mg_{1/3}Nb_{2/3})O_3$ | 20 | 4800 | 0.6 |
| 4 | Ba | 0.60 | 0.30 | $Pb(Zn_{1/3}Nb_{2/3})O_3$ | 18 | 1700 | 0.3 |
| 5 | Ba | 0.65 | 0.50 | $Pb(Zn_{1/3}Nb_{2/3})O_3$ | 15 | 800 | 0.2 |
| 6 | Ba | 0.70 | 0.20 | $Pb(Zn_{1/3}Nb_{2/3})O_3$ | 20 | 620 | 0.3 |
| 7 | Ba | 0.20 | 0.20 | $Pb(Ni_{1/3}Nb_{2/3})O_3$ | 19 | 5800 | 0.9 |
| 8 | Ba | 0.37 | 0.30 | $Pb(Mg_{1/3}Nb_{2/3})O_3$ $Pb(Ni_{1/3}Nb_{2/3})O_3$ | 15 3 | 7800 | 0.9 |
| 9 | Sr | 0.31 | 0.30 | $Pb(Mg_{1/2}W_{1/2})O_3$ | 5 | 1700 | 0.4 |
| 10 | Ca | 0.23 | 0.30 | $Pb(Mg_{1/3}Nb_{2/3})O_3$ | 2 | 2800 | 0.7 |

TABLE 25-continued

| | | | | | | | |
|---|---|---|---|---|---|---|---|
| 11 | Ba | 0.25 | 0.30 | $Pb(Mg_{\frac{1}{3}}Nb_{\frac{2}{3}})O_3$ | 2 | 5900 | 0.7 |
| | Ca | 0.08 | | | | | |
| Reference 1 | Ba | 0.37 | 0.30 | — | — | 5500 | 0.6 |
| Reference 2 | Ca | 0.23 | 0.30 | — | — | 1400 | 1.1 |

| Sample No. | Maximum T.C.C. (%) −25° C. to 85° C. | DC bias voltage dependence (%) of dielectric constant | AC bias voltage dependence (%) of dielectric loss | Product (ΩF) of capacitance and resistance | | Breakdown voltage (KV/mm) |
|---|---|---|---|---|---|---|
| | | | | 25° C. | 125° C. | |
| 1 | −19 | −11 | 1.5 | 18000 | 9000 | 15.9 |
| 2 | −14 | −10 | 1.2 | 19000 | 11000 | 17.0 |
| 3 | −14 | −5 | 0.9 | 21000 | 12000 | 17.5 |
| 4 | −11 | −3 | 0.5 | 17000 | 9500 | 18.2 |
| 5 | −10 | −2 | 0.3 | 15000 | 8800 | 18.0 |
| 6 | −9 | −2 | 0.4 | 12000 | 9600 | 17.8 |
| 7 | −18 | −12 | 1.4 | 20000 | 12000 | 15.3 |
| 8 | −18 | −11 | 1.3 | 19000 | 11000 | 16.1 |
| 9 | −12 | −8 | 1.0 | 17000 | 8500 | 18.5 |
| 10 | −14 | −11 | 0.9 | 16000 | 10500 | 18.2 |
| 11 | −15 | −10 | 1.1 | 18000 | 12000 | 16.8 |
| Reference 1 | −14 | −11 | 1.7 | 3500 | 10 | 13.0 |
| Reference 2 | −7 | −10 | 0.9 | 770 | 5 | 15.0 |

As is apparent from TABLE 25, the obtained dielectric ceramic compositions had a large dielectric constant and an excellent temperature coefficient of dielectric constant. Each composition was also good in various electrical characteristics such as the DC bias voltage dependence of the dielectric constant, the AC bias voltage dependence of the dielectric loss, and the insulation resistance, indicating that the composition was a good dielectric material for a ceramic capacitor.

It was confirmed that particularly a dielectric ceramic composition containing $Pb(Mg_{\frac{1}{3}}Nb_{\frac{2}{3}})O_3$ had a by far large dielectric constant of 5,000 to 8,000 regardless of its small temperature coefficient of dielectric constant.

EXAMPLE 42

A dielectric ceramic composition having the same composition as sample No. 2 prepared in Example 41 was manufactured following the same procedures as in Example 41 except that glass components were added, and measurements of various characteristics were performed following the same procedures as in Example 41. The results are listed in TABLE 26. Note that the five types of compositions listed in TABLE 2 were used as the glass components added.

First, an organic solvent and a binder were added to a calcined powder, and a 34 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Subsequently, the stacked sheet structure was cut into a predetermined shape, and the binder was burned out therefrom. The resultant material was sintered at 1,050° C., and a silver paste as outer electrodes was baked at 800° C., thus fabricating an MLC. The outer dimensions of this MLC were 4.5×3.2 mm, its single layer thickness after the sintering was about 24 μm, and its capacitance was 60 nF.

The temperature coefficient of the capacitance of the obtained device was within a range of ±15% over the range of −25° C. to 85° C., i.e., satisfied the C characteristic of the EIAJ specifications, and was within a range of −33% to +22% over the range of −55° C. to 125° C., i.e., satisfied the X7T of the EIA specifications. When a bias voltage of 50 V was applied, the rate of change in capacitance was −11%. The dielectric loss was 0.6%.

Figure 17:
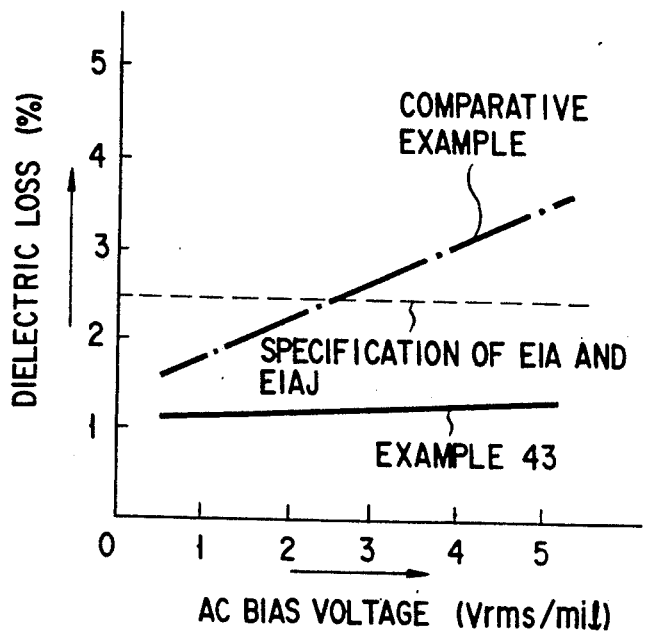
FIG. 17 is a graph showing the AC bias voltage dependence of the dielectric loss of an MLC fabricated in Example 43 of the present invention together with the AC bias voltage dependence of a commercially available MLC using a $BaTiO_3$-based dielectric as a comparative example.

FIG. 17 shows the relationship between the dielectric loss and the AC bias voltage. FIG. 17 also shows, as a

TABLE 26

| Sample No. | Dielectric constant K 25° C. | Dielectric loss 25° C. (%) | Maximum T.C.C. (%) −25° C. to 85° C. | DC bias voltage dependence of (%) dielectric constant | AC bias voltage dependence of (%) dielectric loss | Product (ΩF) of capacitance and resistance | | Added glass | |
|---|---|---|---|---|---|---|---|---|---|
| | | | | | | 25° C. | 125° C. | Sample No. | Addition amount (ppm) |
| 12 | 6100 | 0.5 | −14 | −10 | 1.2 | 18000 | 10000 | 1 | 500 |
| 13 | 6200 | 0.6 | −14 | −10 | 1.2 | 17000 | 9000 | 2 | 500 |
| 14 | 6100 | 0.5 | −14 | −10 | 1.2 | 18000 | 10000 | 3 | 500 |
| 15 | 6200 | 0.6 | −14 | −9 | 1.1 | 16000 | 9000 | 4 | 1000 |
| 16 | 6150 | 0.6 | −14 | −9 | 1.1 | 16000 | 8500 | 5 | 1000 |

As can be seen from TABLE 26, the sintering temperature could be decreased by 50° C. to 100° C. with almost no changes in the characteristics of the dielectric. In addition, the individual characteristics were also good.

EXAMPLE 43

MLC was fabricated by the following procedures using a dielectric ceramic composition having the same composition as sample No. 2 prepared in Example 41.

comparative example, the AC bias voltage dependence of a commercially available MLC using a $BaTiO_3$-based dielectric. As clearly shown in FIG. 17, the dielectric loss of the MLC of the present invention was about 1.1% even when 5 Vrms were applied per 1 mil, i.e., per 24.5 μm of the thickness of the dielectric layer (5 Vrms/mil). In the comparative example, however, the dielectric loss exceeded 2.5%, which is the spec of EIA and EIAJ, upon application of 3 Vrms/mil. This indicates that the MLC of the present invention is by far superior to an MLC using the BaTiO$_3$-based dielectric.

The dielectric ceramic capacitor used in the present invention, therefore, is effective in, for example, fabricating a capacitor or a stacked ceramic capacitor, which consists of dielectric layers each with a thickness of a few micrometers or less, by using a technique such as a sol-gel technique. In addition, this dielectric ceramic composition can be applied to a high-dielectric constant film for a capacitor of a semiconductor memory, which has been recently examined as a substitute for SiO$_2$.

EXAMPLE 44

A powder mixture containing oxides or carbonates of, e.g., Pb, Ca, Zr, and Ti at desired composition ratios was heat-treated at 500° C. to 900° C. to obtain a powder having a desired specific surface area, and polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,000° C. to 1,300° C., thereby preparing a dielectric ceramic composition having a composition of $(Pb_{0.78}Ca_{0.22})(Zr_{0.30}Ti_{0.70})O_3$. Note that a predetermined amount of glass components was added to the powder mixture, and the grain size of the dielectric ceramic composition was controlled by decreasing the sintering temperature.

Figure 18:
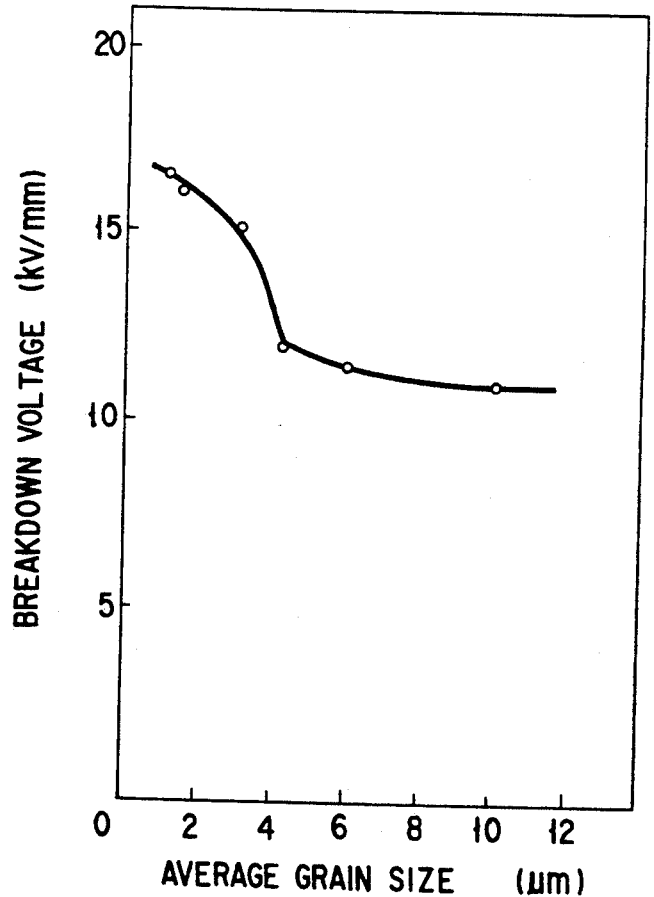
FIG. 18 is a graph showing the relationship between the grain size and the breakdown voltage in a dielectric ceramic composition represented by $(Pb_{0.78}Ca_{0.22})(Zr_{0.30}Ti_{0.70})O_3$.

The grain size and the breakdown voltage of the dielectric ceramic composition were measured. Note that the grain size was obtained by drawing a straight line with a given length on an SEM photograph, dividing the length of the line by the number of grain boundaries crossed by the line, and multiplying the quotient by 1.5. The breakdown voltage was measured at an increasing rate of 200 V/sec upon depositing silver by evaporation on both the surfaces of a disk-like sample obtained by forming the sintered product to have a thickness of 0.4 mm. FIG. 18 shows the breakdown voltage characteristic of this dielectric ceramic composition.

As is apparent from FIG. 18, the breakdown voltage could be improved by controlling the grain size of the dielectric ceramic composition after the sintering to 3 μm or less.

EXAMPLE 45

A fine powder obtained by the hydrothermal synthesis and containing, e.g., Pb, Ca, Zr, and Ti at composition ratios shown in TABLE 27 was heat-treated at 500° C. to 900° C. to obtain a powder having a desired specific surface area. Subsequently, polyvinylalcohol as a binder was added to the resultant fine powder and the mixture was granulated. The resultant powders were pressed to form seven disks each having a diameter of 17 mm and a thickness of about 2 mm. After the binder was burned out from the disks, the disks were sintered in the air at 1,000° C. to 1,200° C., thus obtaining dielectric ceramic compositions having the same composition as in Example 44 and an average grain size of 3 μm or less. Note that the heating rate upon sintering was controlled as shown in TABLE 27. After the sintering, the density was measured by an Archimedes method. In this measurement, the density of a sintered product with a low density was obtained by measuring the outer dimensions of the product.

The electrical characteristics of each sample were measured by forming the sintered product to have a thickness of 1 mm and baking silver electrodes on both the surfaces of the structure. The capacitance and the dielectric loss tank were measured under the conditions of 1 kHz and 1 Vrms by using a digital LCR meter. The dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of $-25°$ C. to 85° C. with reference to a dielectric constant at 20° C. The results are listed in TABLE 27.

TABLE 27

| Sample No. | Substituent element | x (mol) | y (mol) | Average grain size (μm) | Heating rate (°C./hr) | Sintering temperature (°C.) | Relative humidity (%) | Dielectric constant K 25° C. | Dielectric loss DF 25° C. (%) | Maximum T.C.C. (%) | Insulation resistance IR 25° C. (MΩcm) | Breakdown voltage (KV/mm) |
|---|---|---|---|---|---|---|---|---|---|---|---|---|
| 1 | Ca | 0.22 | 0.70 | 0.7 | 50  | 1250 | 96.0 | 1400 | 1.25 | −7 | $1.0 \times 10^7$ | 13.5 |
| 2 | Ca | 0.22 | 0.70 | 1.1 | 110 | 1075 | 96.1 | 1300 | 1.10 | −7 | $0.7 \times 10^7$ | 15.5 |
| 3 | Ca | 0.22 | 0.70 | 1.3 | 150 | 1075 | 97.8 | 1350 | 1.10 | −8 | $0.9 \times 10^7$ | 16.0 |
| 4 | Ca | 0.22 | 0.70 | 1.5 | 200 | 1075 | 99.0 | 1430 | 1.10 | −8 | $1.2 \times 10^7$ | 16.5 |
| 5 | Ca | 0.22 | 0.70 | 1.5 | 300 | 1075 | 99.1 | 1430 | 1.10 | −8 | $1.3 \times 10^7$ | 16.5 |
| 6 | Ca | 0.22 | 0.70 | 1.2 | 600 | 1075 | 98.6 | 1390 | 1.10 | −8 | $1.1 \times 10^7$ | 15.5 |
| 7 | Ca | 0.22 | 0.70 | 0.8 | 700 | 1075 | 85.3 | 1150 | 1.56 | −7 | $2.1 \times 10^6$ | 12.0 |

As is apparent from TABLE 27, any of the obtained dielectric ceramic compositions had excellent electrical characteristics and a high breakdown voltage. In addition, since the starting material synthesized by the hydrothermal synthesis was sintered at a heating rate of 110° C./hour to 600° C./hour, the sintering temperature was decreased without decreasing the density of the dielectric ceramic composition.

EXAMPLE 46

Glass components were added to a fine powder synthesized by a hydrothermal synthesis similar to that in Example 45, thus forming disks following the same procedures as in Example 44. Subsequently, the disks were sintered at a heating rate of 200° C./hour. The five types of compositions listed in TABLE 2 were used as the glass components added.

As a result, regardless of the types of glass components used, the sintering temperature of each of the obtained dielectric ceramic compositions could be further decreased by 50° C. to 100° C. with almost no changes in the characteristics. The compositions were also good in various characteristics. In addition, the average grain size of the dielectric ceramic composition was further decreased to about 1 μm by the addition of the glass components.

EXAMPLE 47

An MLC was fabricated as follows by using a fine powder synthesized by the hydrothermal synthesis similar to that in Example 45.

First, an organic solvent and a binder were added to the above fine powder, and a 16 μm thick green sheet was formed from the resultant slurry by using a doctor blade type caster. A predetermined pattern was printed on the green sheet by using an electrode paste of 70Ag/30Pd, and six such sheets each having this electrode pattern were stacked under pressure. Thereafter, the stacked sheet structure was cut into a predetermined shape, and the binder was burned out therefrom. The resultant material was sintered with a heating rate of 200° C./hour at 1,075° C. for two hours. After the sintering, an Ag paste as outer electrodes was baked at 800° C., thus fabricating an MLC with outer dimensions of 4.5×3.2 mm and a single layer thickness after the sintering of about 10 μm. Note that the thickness of the dielectric ceramic composition was measured from an SEM photograph showing a section of the MLC.

In the obtained MLC, the average grain size of the dielectric ceramic composition was 1.5 μm or less. The capacitance of this MLC was 26 nF, and the temperature coefficient of the capacitance was within a range of ±10% over the range of −25° C. to 85° C., i.e., satisfied the B characteristic of the EIAJ specifications. When a bias voltage of 25 V was applied, the rate of change in capacitance was +9.2%, and the dielectric loss was 0.7%; i.e., both the electrical characteristics were good.

EXAMPLE 48

Oxides or carbonates of, e.g., Pb, Ca, Sr, Ba, Zr, Ti, Mg, Nb, Cu, Mn, and Bi as the starting materials were blended so as to obtain composition ratios shown in TABLE 28 below, mixed by, e.g., a ball mill, and calcined at 850° C. After the resultant calcined products were milled by, e.g., a ball mill, and dried, polyvinyl alcohol as a binder was added and the mixture was granulated. The resultant powders were pressed to form disks each having a diameter of 17 mm and a thickness of about 2 mm. After the binder was burned out from the disks, the disks were sintered in the air at 1,000° C. to 1,500° C., thereby obtaining sample Nos. 1 to 7 and reference sample Nos. 1 and 2 having the compositions listed in TABLE 28.

The characteristics of these samples were measured by the following methods.

That is, the breakdown voltage characteristic was measured at an increasing rate of 200 V/sec upon depositing silver by evaporation on both the surfaces of a disk-like sample obtained by forming each sintered product to have a thickness of 0.4 mm. The other electrical characteristics were measured by forming the sintered product to have a thickness of 1 mm and baking silver electrodes on both the surfaces of the structure.

The capacitance and the dielectric loss tank were measured under the conditions of 1 kHz and 1 Vrms by using a digital LCR meter. The relative dielectric constant K was calculated from these values and the outer dimensions. The insulation resistance (IR) was calculated from the value measured using an insulation resistance meter after a voltage of 250 V was applied for two minutes. The temperature coefficient T.C.C. of dielectric constant is represented by the maximum value among changes of dielectric constant over a temperature range of −25° C. to 85° C. with reference to a dielectric constant at 20° C. The product of the capacitance and resistance (CR value) was obtained from (capacitance at 1 kHz)×(insulation resistance) at 25° C. and 125° C.

The DC bias voltage dependence of the dielectric constant and the AC bias voltage dependence of the dielectric loss were obtained. The DC bias voltage dependence of the dielectric constant is represented by the rates of changes in capacitance and dielectric loss measured upon application of a voltage of up to 200 V by a DC bias voltage by using a 0.1 mm thick sample. The AC bias voltage dependence of the dielectric loss is represented by the rate of change obtained when AC 10 V was applied to the same sample. The results are listed in TABLE 28.

TABLE 28

| Sample No. | Substituent element Ae | x (mol) | y (mol) | Additive | Addition Amount (mol %) | Dielectric constant K 25° C. |
|---|---|---|---|---|---|---|
| 1 | Ba | 0.37 | 0.30 | $Pb(Mg_{\frac{1}{3}}Nb_{\frac{2}{3}})O_3$ | 2 | 6100 |
|   |    |      |      | CuO | 0.5 | |
| 2 | Ba | 0.37 | 0.30 | $Pb(Mg_{\frac{1}{3}}Nb_{\frac{2}{3}})O_3$ | 2 | 5500 |
|   |    |      |      | CuO | 0.5 | |
|   |    |      |      | MnO | 0.3 | |
| 3 | Ba | 0.37 | 0.30 | $Pb(Mg_{\frac{1}{3}}Nb_{\frac{2}{3}})O_3$ | 2 | 5400 |
|   |    |      |      | MnO | 0.3 | |
|   |    |      |      | $Bi_2O_3$ | 0.2 | |
| 4 | Ba | 0.37 | 0.30 | $Pb(Mg_{\frac{1}{3}}Nb_{\frac{2}{3}})O_3$ | 2 | 5300 |
|   |    |      |      | CuO | 0.5 | |
|   |    |      |      | MnO | 0.3 | |
|   |    |      |      | $Bi_2O_3$ | 0.2 | |
| 5 | Ba | 0.35 | 0.30 | $Pb(Mg_{\frac{1}{3}}Nb_{\frac{2}{3}})O_3$ | 2 | 5400 |
|   |    |      |      | $BaCu_{\frac{1}{3}}W_{\frac{1}{3}}O_3$ | 0.3 | |
|   |    |      |      | MnO | 0.3 | |
|   |    |      |      | $Bi_2O_3$ | 0.2 | |
| 6 | Ba | 0.34 | 0.30 | $Pb(Mg_{\frac{1}{3}}Nb_{\frac{2}{3}})O_3$ | 2 | 5200 |
|   | Sr | 0.02 | 0.30 | CuO | 0.5 | |
|   |    |      |      | MnO | 0.3 | |
|   |    |      |      | $Bi_2O_3$ | 0.1 | |
| 7 | Ba | 0.37 | 0.30 | $Pb(Mg_{\frac{1}{3}}Nb_{\frac{2}{3}})O_3$ | 2 | 5300 |
|   |    |      |      | CuO | 0.5 | |
|   |    |      |      | MnO | 0.3 | |
|   |    |      |      | $Bi_2O_3$ | 0.2 | |
|   |    |      |      | Glass composition | 500 ppm | |
| Reference 1 | Ba | 0.37 | 0.30 | — | — | 5500 |

TABLE 28-continued

| Sample No. | | | | Dielectric loss DF 25° C. (%) | Maximum T.C.C. (%) −25° C. to 85° C. | DC bias voltage dependence (%) of dielectric constant | AC bias voltage dependence (%) of dielectric loss | Product (ΩF) of capacitance and resistance | | Breakdown voltage (KV/mm) |
| --- | --- | --- | --- | --- | --- | --- | --- | --- | --- | --- |
| | | | | | | | | 25° C. | 125° C. | |
| Reference 2 | Ba | 0.37 | 0.30 | Pb(Mg⅓Nb⅔)O₃ | | 2 | | 6200 | | |
| 1 | | | | 0.6 | −12 | −8 | 1.4 | 17000 | 8000 | 15.0 |
| 2 | | | | 0.4 | −8 | −8 | 1.2 | 18000 | 9000 | 16.0 |
| 3 | | | | 0.4 | −7 | −7 | 1.3 | 19000 | 9000 | 19.0 |
| 4 | | | | 0.5 | −8 | −7 | 1.2 | 20000 | 11000 | 20.0 |
| 5 | | | | 0.5 | −8 | −8 | 1.2 | 20000 | 11000 | 19.0 |
| 6 | | | | 0.4 | −8 | −6 | 1.1 | 24000 | 13000 | 18.5 |
| 7 | | | | 0.5 | −8 | −7 | 1.1 | 19000 | 11000 | 20.5 |
| Reference 1 | | | | 0.6 | −14 | −11 | 1.7 | 3500 | 10 | 13.0 |
| Reference 2 | | | | 0.5 | −14 | −10 | 1.2 | 19000 | 11000 | 17.0 |

As is apparent from TABLE 28, the obtained dielectric ceramic compositions had a large dielectric constant and an excellent temperature coefficient of dielectric constant. Each composition was also good in various electrical characteristics such as the DC bias voltage dependence of the dielectric constant, the AC bias voltage dependence of the dielectric loss, and the insulation resistance, indicating that the composition was a good dielectric material for a ceramic capacitor.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A ceramic capacitor comprising:
  at least two opposing electrodes; and
  a dielectric ceramic composition arranged between said electrodes,
  wherein said ceramic composition is represented by the following formula $(Pb_{1-x}Ae_x)(Zr_{1-y}Ti_y)O_3$ wherein x represents 0.15 to 0.90, y represents 0 to 0.80, and Ae represents at least one type of an element selected from the group consisting of Ca and Sr,
  and has a composition in which assuming that the total number of moles of elements constituting a site A consisting of Pb and Ae is (A) and that the total number of moles of elements constituting a site B consisting of Zr and Ti is (B), (A)/(B) is not more than 1.00.

2. A capacitor according to claim 1, wherein said site A consisting of Pb and Ae is further substituted with Ba.

3. A capacitor according to claim 1, wherein said ceramic composition is obtained by adding Mn in an amount of not more than 2 mol %, as an amount of MnO, and/or Co in an amount of not more than 2 mol %, as an amount of Co₂O₃ to a composition which is represented by the following formula $(Pb_{1-x}Ae_x)(Zr_{1-y}Ti_y)O_3$ wherein x represents 0.15 to 0.90, y represents 0 to 0.80, and Ae represents at least one type of an element selected from the group consisting of Ca and Sr,
  and in which assuming that the total number of moles of elements constituting a site A consisting of Pb and Ae is (A) and that the total number of moles of elements constituting a site B consisting of Zr and Ti is (B), (A)/(B) is not more than 1.00.

4. A capacitor according to claim 1, wherein said ceramic composition is obtained by adding Nb in an amount of not more than 10 mol %, as an amount of Nb₂O₅, and/or Ta in an amount of 10 mol %, as an amount of Ta₂O₅, to a composition which is represented by the following formula $(Pb_{1-x}Ae_x)(Zr_{1-y}Ti_y)O_3$ wherein x represents 0.15 to 0.90, y represents 0 to 0.80, and Ae represents at least one type of an element selected from the group consisting of Ca and Sr,
  and in which assuming that the total number of moles of elements constituting a site A consisting of Pb and Ae is (A) and that the total number of moles of elements constituting a site B consisting of Zr and Ti is (B), (A)/(B) is not more than 1.00.

5. A capacitor according to claim 1, wherein the (A)/(B) in said dielectric ceramic composition is not less than 0.85 and less than 1.

6. A capacitor according to claim 1, wherein a grain size of said dielectric ceramic composition is not more than 3 μm.

7. A capacitor according to claim 1, wherein said dielectric ceramic composition is formed by using a powder synthesized by a hydrothermal synthesis as a material.

8. A ceramic capacitor comprising:
  at least two opposing electrodes; and
  a dielectric ceramic composition arranged between said electrodes,
  wherein said ceramic composition is obtained by adding not more than 20 mol % of at least one type of a compound selected from the group consisting of
  Pb(Mg⅓Nb⅔)O₃, Pb(Mg½W½)O₃, Pb(Zn⅓Nb⅔)O₃, and Pb(Ni⅓Nb⅔)O₃
  to a composition which is represented by the following formula $(Pb_{1-x}Ae_x)(Zr_{1-y}Ti_y)O_3$ wherein x represents 0.15 to 0.90, y represents 0 to 0.80, and Ae represents at least one type of an element selected from the group consisting of Ca, Sr, and Ba, and in which assuming that the total number of moles of elements constituting a site A consisting of Pb and Ae is (A) and that the total number of moles of elements constituting a site B consisting of Zr and Ti is (B), (A)/(B) is not more than 1.00.

9. A capacitor according to claim 8, wherein Cu and/or Bi are further added to said dielectric ceramic composition.

10. A capacitor according to claim 8, wherein said dielectric ceramic composition further contains Mn in an amount of not more than 2 mol %, as an amount of MnO, and/or Co in an amount of not more than 2 mol %, as an amount of $Co_2O_3$.

11. A capacitor according to claim 8, wherein Nb in an amount of not less than 10 mol %, as an amount of $Nb_2O_5$, and/or Ta in an amount of 10 mol %, as an amount of $Ta_2O_5$, are further added to said dielectric ceramic composition.

12. A capacitor according to claim 8, wherein the (A)/(B) in said dielectric ceramic composition is not less than 0.85 and less than 1.

13. A capacitor according to claim 8, wherein a grain size of said dielectric ceramic composition is not more than 3 μm.

14. A capacitor according to claim 8, wherein said dielectric ceramic composition is formed by using a powder synthesized by a hydrothermal synthesis as a material.

15. A ceramic capacitor comprising:
at least two opposing electrodes; and
a dielectric ceramic composition arranged between said electrodes,
wherein said ceramic composition is obtained by adding Cu in an amount of not more than 0.5 wt %, as an amount of CuO, and/or Bi in an amount of 0.01 to 2 mol %, as an amount of $Bi_2O_3$, to a composition which is represented by the following formula $(Pb_{1-x}Ae_x)(Zr_{1-y}Ti_y)O_3$ wherein x represents 0.15 to 0.90, y represents 0 to 0.80, and Ae represents at least one type of an element selected from the group consisting of Ca, Sr and Ba,
and in which assuming that the total number of moles of elements constituting a site A consisting of Pb and Ae is (A) and that the total number of moles of elements constituting a site B consisting of Zr and Ti is (B), (A)/(B) is not more than 1.00.

16. A capacitor according to claim 15, wherein said dielectric ceramic composition further contains Mn in an amount of not more than 2 mol %, as an amount of MnO, and/or Co in an amount of not more than 2 mol %, as an amount of $Co_2O_3$.

17. A capacitor according to claim 15, wherein Nb in an amount of not less than 10 mol %, as an amount of $Nb_2O_5$, and/or Ta in an amount of 10 mol %, as an amount of $Ta_2O_5$, are further added to said dielectric ceramic composition.

18. A capacitor according to claim 15, wherein the (A)/(B) in said dielectric ceramic composition is not less than 0.85 and less than 1.

19. A capacitor according to claim 15, wherein a grain size of said dielectric ceramic composition is not more than 3 μm.

20. A capacitor according to claim 15, wherein said dielectric ceramic composition is formed by using a powder synthesized by a hydrothermal synthesis as a material.

* * * * *